United States Patent
Courey et al.

(10) Patent No.: US 11,149,442 B2
(45) Date of Patent: *Oct. 19, 2021

(54) TILE WITH IMITATION GROUT LINE

(71) Applicant: Quickstyle Industries Inc., Saint-Laurent (CA)

(72) Inventors: Stephen Courey, Quebec (CA); Michele Alfieri, Quebec (CA)

(73) Assignee: QUICKSTYLE INDUSTRIES INC., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,418

(22) Filed: Aug. 25, 2020

(65) Prior Publication Data
US 2020/0385998 A1 Dec. 10, 2020

Related U.S. Application Data

(63) Continuation of application No. 16/358,241, filed on Mar. 19, 2019, now abandoned, which is a (Continued)

(51) Int. Cl.
*E04F 15/02* (2006.01)
*E04F 15/10* (2006.01)
(Continued)

(52) U.S. Cl.
CPC .......... *E04F 15/02033* (2013.01); *B32B 3/06* (2013.01); *B32B 3/263* (2013.01);
(Continued)

(58) Field of Classification Search
CPC ............................. B32B 27/304; B32B 27/30
See application file for complete search history.

(56) References Cited

U.S. PATENT DOCUMENTS 6,455,113 B1 9/2002 Bilodeau
6,497,079 B1 12/2002 Pletzer et al.
(Continued)

FOREIGN PATENT DOCUMENTS

AU 2015391767 10/2015
CN 100462398 1/2007
(Continued)

*Primary Examiner* — Rodney Mintz
(74) *Attorney, Agent, or Firm* — Malloy & Malloy, PL

(57) ABSTRACT

A tile that may be used as a covering on a floor, wall, or other surface comprises a top section, a protective section, a vinyl layer, an optional core layer, and an exposed portion formed along at least one of its sides and structured to represent an imitation but highly realistic looking grout line. The exposed portion may be formed on at least a portion of the top section. The vinyl layer is generally disposed between the top section and the core layer. The vinyl layer generally comprises a solid vinyl material comprising polyvinyl chloride and stone dust. In some embodiments, the exposed portion is also formed across a middle section of the tile, and may further include an interconnecting mechanism to facilitate installation. The exposed portion may also be formed at least one a portion of the top section above the interconnecting mechanism.

20 Claims, 43 Drawing Sheets

Related U.S. Application Data continuation-in-part of application No. 16/196,974, filed on Nov. 20, 2018, now Pat. No. 10,544,595, which is a continuation-in-part of application No. 15/950,046, filed on Apr. 10, 2018, now Pat. No. 10,132,088, which is a continuation-in-part of application No. 15/454,650, filed on Mar. 9, 2017, now Pat. No. 9,938,726.

(60) Provisional application No. 62/380,122, filed on Aug. 26, 2016.

(51) Int. Cl.
  *B32B 3/06* (2006.01)
  *B32B 3/26* (2006.01)
  *B32B 27/20* (2006.01)
  *B32B 27/30* (2006.01)

(52) U.S. Cl.
  CPC ............ *B32B 27/20* (2013.01); *B32B 27/304* (2013.01); *E04F 15/02038* (2013.01); *E04F 15/107* (2013.01); *B32B 2264/10* (2013.01); *B32B 2307/412* (2013.01); *B32B 2307/72* (2013.01); *B32B 2419/04* (2013.01); *E04F 2201/0153* (2013.01); *E04F 2201/023* (2013.01); *E04F 2201/043* (2013.01)

(56) References Cited

U.S. PATENT DOCUMENTS

| | | |
|---|---|---|
| 6,536,178 B1 | 3/2003 | Palsson et al. |
| 6,647,690 B1 | 11/2003 | Martensson |
| 6,880,307 B2 | 4/2005 | Schwitte et al. |
| 7,261,947 B2 | 8/2007 | Reichwein et al. |
| 7,288,310 B2 | 10/2007 | Hardwick |
| 7,544,423 B2 | 9/2009 | Horton |
| 8,234,829 B2 | 8/2012 | Thiers et al. |
| 8,363,677 B2 | 1/2013 | Seki et al. |
| 8,689,513 B2 | 4/2014 | Windmoller |
| 8,720,144 B2 | 5/2014 | Keane |
| 8,857,127 B2 | 10/2014 | Windmoller |
| 8,875,465 B2 | 11/2014 | Martensson |
| 8,956,714 B2 | 2/2015 | Vermeulen |
| 9,127,459 B2 | 9/2015 | Litral |
| 9,156,233 B2 | 10/2015 | Dossche et al. |
| 9,193,137 B2 | 11/2015 | Dossche et al. |
| 9,200,460 B2 | 12/2015 | Cappelle |
| 9,234,357 B2 | 1/2016 | Dossche et al. |
| 9,783,996 B2 * | 10/2017 | Pervan .................. B32B 21/14 |
| 9,938,726 B2 | 4/2018 | Altieri et al. |
| 9,988,821 B2 | 6/2018 | Rose et al. |
| 10,132,088 B2 | 11/2018 | Courey et al. |
| 10,202,768 B2 | 2/2019 | Doehring |
| 10,208,490 B2 | 2/2019 | Meersseman et al. |
| 10,233,655 B2 | 3/2019 | Meersseman et al. |
| 10,233,656 B2 | 3/2019 | Courey et al. |
| 10,335,990 B2 * | 7/2019 | Dai ........................ E04F 15/107 |
| 10,343,381 B2 | 7/2019 | Troendle et al. |
| 10,407,906 B2 | 9/2019 | Quanshan et al. |
| 10,480,120 B2 * | 11/2019 | Guyot ................... D06N 7/0036 |
| 10,544,595 B2 | 1/2020 | Courey et al. |
| 10,968,640 B2 * | 4/2021 | Dai ........................ B29C 39/20 |
| 11,041,317 B2 * | 6/2021 | Tong ....................... B32B 21/02 |
| 11,060,298 B2 * | 7/2021 | Liu ...................... E04F 13/0871 |
| 2001/0041256 A1 | 11/2001 | Heilmayr |
| 2002/0139082 A1 | 10/2002 | DeFord et al. |
| 2003/0138618 A1 | 7/2003 | Courtoy et al. |
| 2004/0146695 A1 | 7/2004 | Hardwick |
| 2004/0211144 A1 | 10/2004 | Stanchfield |
| 2005/0003160 A1 | 1/2005 | Chen et al. |
| 2005/0079323 A1 | 4/2005 | Miller et al. |
| 2006/0070332 A1 | 4/2006 | Palsson et al. |
| 2006/0159891 A1 | 7/2006 | Viet et al. |
| 2006/0272252 A1 | 12/2006 | Moller, Jr. |
| 2006/0283118 A1 | 12/2006 | Moller, Jr. |
| 2007/0125021 A1 | 6/2007 | Thiers et al. |
| 2008/0115437 A1 | 5/2008 | Bordener |
| 2009/0031658 A1 | 2/2009 | Moller, Jr. |
| 2009/0038254 A1 | 2/2009 | Steele et al. |
| 2009/0107071 A1 * | 4/2009 | Starke ................... E04F 15/186 52/385 |
| 2009/0155612 A1 * | 6/2009 | Pervan .................... E04F 15/02 428/498 |
| 2010/0055420 A1 | 3/2010 | Vermeulen |
| 2010/0319294 A1 | 12/2010 | Courey |
| 2011/0067340 A1 | 3/2011 | Shapiro |
| 2011/0146189 A1 | 6/2011 | Courey |
| 2011/0167744 A1 | 7/2011 | Whispell et al. |
| 2011/0296780 A1 | 12/2011 | Windmoller |
| 2011/0300392 A1 | 12/2011 | Vermeulen |
| 2012/0240502 A1 | 9/2012 | Wilson et al. |
| 2012/0291387 A1 | 11/2012 | Keane |
| 2013/0104486 A1 | 5/2013 | Windmoller |
| 2013/0111843 A1 | 5/2013 | Litral |
| 2014/0109507 A1 | 4/2014 | Dossche et al. |
| 2014/0147641 A1 | 5/2014 | Vermeulen |
| 2014/0157695 A1 | 6/2014 | Windmoller |
| 2014/0227484 A1 | 8/2014 | Sung et al. |
| 2014/0290158 A1 | 10/2014 | Meersseman et al. |
| 2014/0329062 A1 | 11/2014 | Song |
| 2015/0072102 A1 | 3/2015 | Dossche et al. |
| 2015/0096256 A1 | 4/2015 | Lam et al. |
| 2015/0147531 A1 | 5/2015 | Anspach |
| 2015/0159379 A1 | 6/2015 | Meersseman et al. |
| 2015/0165735 A1 * | 6/2015 | Joung ..................... B32B 27/08 428/215 |
| 2015/0167320 A1 | 6/2015 | Meersseman et al. |
| 2015/0239230 A1 | 8/2015 | Vermeulen |
| 2015/0337543 A1 | 11/2015 | Dossche et al. |
| 2016/0083965 A1 | 3/2016 | Baert et al. |
| 2016/0145876 A1 | 5/2016 | Dossche |
| 2016/0153190 A1 | 6/2016 | Doehring |
| 2016/0200034 A1 | 7/2016 | Quanshan et al. |
| 2016/0207835 A1 | 7/2016 | Zheng |
| 2016/0347085 A1 | 12/2016 | Cloots et al. |
| 2016/0348368 A1 | 12/2016 | Godfrey et al. |
| 2016/0348369 A1 | 12/2016 | Godfrey et al. |
| 2016/0361891 A1 * | 12/2016 | Tang ....................... B32B 21/08 |
| 2016/0375718 A1 | 12/2016 | Van Garsse et al. |
| 2017/0009462 A1 | 1/2017 | Muehlebach |
| 2017/0021598 A1 * | 1/2017 | Chen ....................... B32B 27/18 |
| 2017/0044778 A1 | 2/2017 | Brickner et al. |
| 2017/0136674 A1 * | 5/2017 | Chen ......................... B32B 7/04 |
| 2017/0136731 A1 | 5/2017 | Rose et al. |
| 2017/0152666 A1 * | 6/2017 | Li .......................... E04F 15/107 |
| 2017/0356130 A1 * | 12/2017 | Guyot ..................... B32B 27/12 |
| 2017/0368760 A1 | 12/2017 | Troendle |
| 2018/0044925 A1 | 2/2018 | Koh et al. |
| 2018/0058077 A1 | 3/2018 | Altieri et al. |
| 2018/0106039 A1 | 4/2018 | Courey et al. |
| 2018/0142478 A1 | 5/2018 | Xu |
| 2018/0171644 A1 | 6/2018 | Zhang |
| 2018/0207918 A1 | 7/2018 | Dai |
| 2018/0298621 A1 | 10/2018 | Courey et al. |
| 2018/0298622 A1 | 10/2018 | Courey et al. |
| 2019/0001543 A1 * | 1/2019 | Dai ........................ E04F 15/107 |
| 2019/0003189 A1 | 1/2019 | Dohring |
| 2019/0085566 A1 | 3/2019 | Lingg |
| 2019/0145109 A1 | 5/2019 | Esbelin |
| 2019/0169858 A1 | 6/2019 | Courey et al. |
| 2019/0283272 A1 * | 9/2019 | Zhang ..................... B29C 67/242 |
| 2019/0283302 A1 | 9/2019 | Troendle et al. |
| 2019/0283364 A1 | 9/2019 | Ting |
| 2019/0316363 A1 * | 10/2019 | Courey ..................... B32B 9/046 |
| 2019/0316364 A1 * | 10/2019 | Wang ........................ B32B 5/18 |
| 2019/0330860 A1 * | 10/2019 | Wang .................... E04F 13/0866 |
| 2019/0352915 A1 | 11/2019 | Dai |
| 2019/0368204 A1 * | 12/2019 | Wang ..................... B32B 21/12 |

(56) References Cited

U.S. PATENT DOCUMENTS

| | | | | |
|---|---|---|---|---|
| 2020/0131783 A1* | 4/2020 | Liu | | F16B 5/008 |
| 2020/0318362 A1* | 10/2020 | Tong | | E04F 15/105 |

FOREIGN PATENT DOCUMENTS

| | | |
|---|---|---|
| CN | 1911997 | 2/2007 |
| CN | 1912313 | 2/2007 |
| CN | 201024633 | 2/2008 |
| CN | 2010024633 | 2/2008 |
| CN | 100419019 | 9/2008 |
| CN | 101365852 | 2/2009 |
| CN | 101400866 | 4/2009 |
| CN | 101698749 | 4/2010 |
| CN | 101767362 | 7/2010 |
| CN | 101955614 | 1/2011 |
| CN | 101614068 | 11/2011 |
| CN | 202324474 | 11/2011 |
| CN | 202144660 | 2/2012 |
| CN | 203961205 | 11/2014 |
| CN | 204386113 | 6/2015 |
| CN | 106193518 A | 12/2016 |
| CN | 106193520 A | 12/2016 |
| CN | 106193530 A | 12/2016 |
| CN | 106193531 A | 12/2016 |
| CN | 205990729 | 3/2017 |
| CN | 205990730 | 3/2017 |
| CN | 205990732 | 3/2017 |
| CN | 205990733 | 3/2017 |
| CN | 109808395 A | 1/2019 |
| EP | 2202056 A1 | 6/2010 |
| WO | 2013117653 A2 | 8/2013 |
| WO | 2016113378 A1 | 7/2016 |
| WO | 2016142647 A1 | 9/2016 |

* cited by examiner

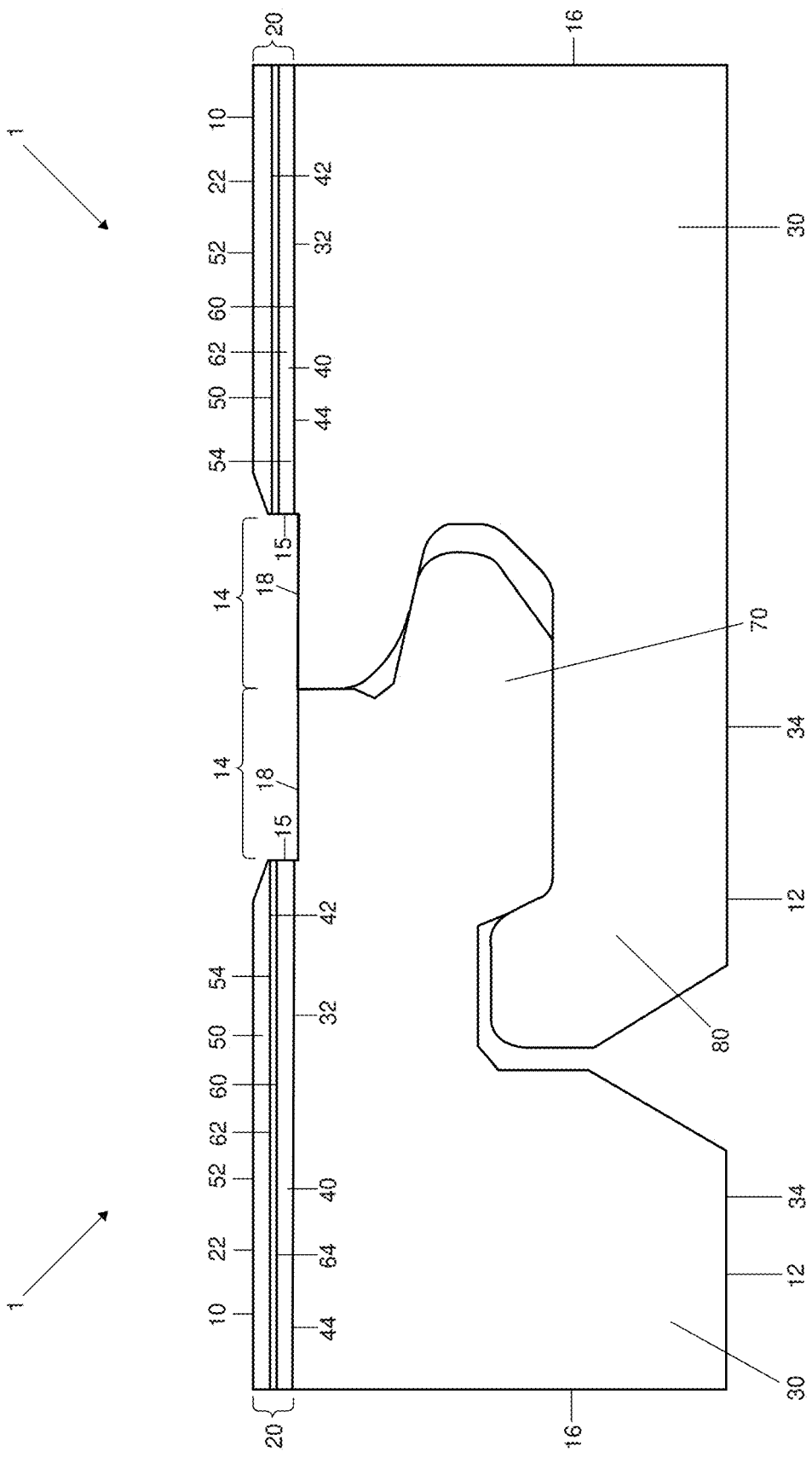

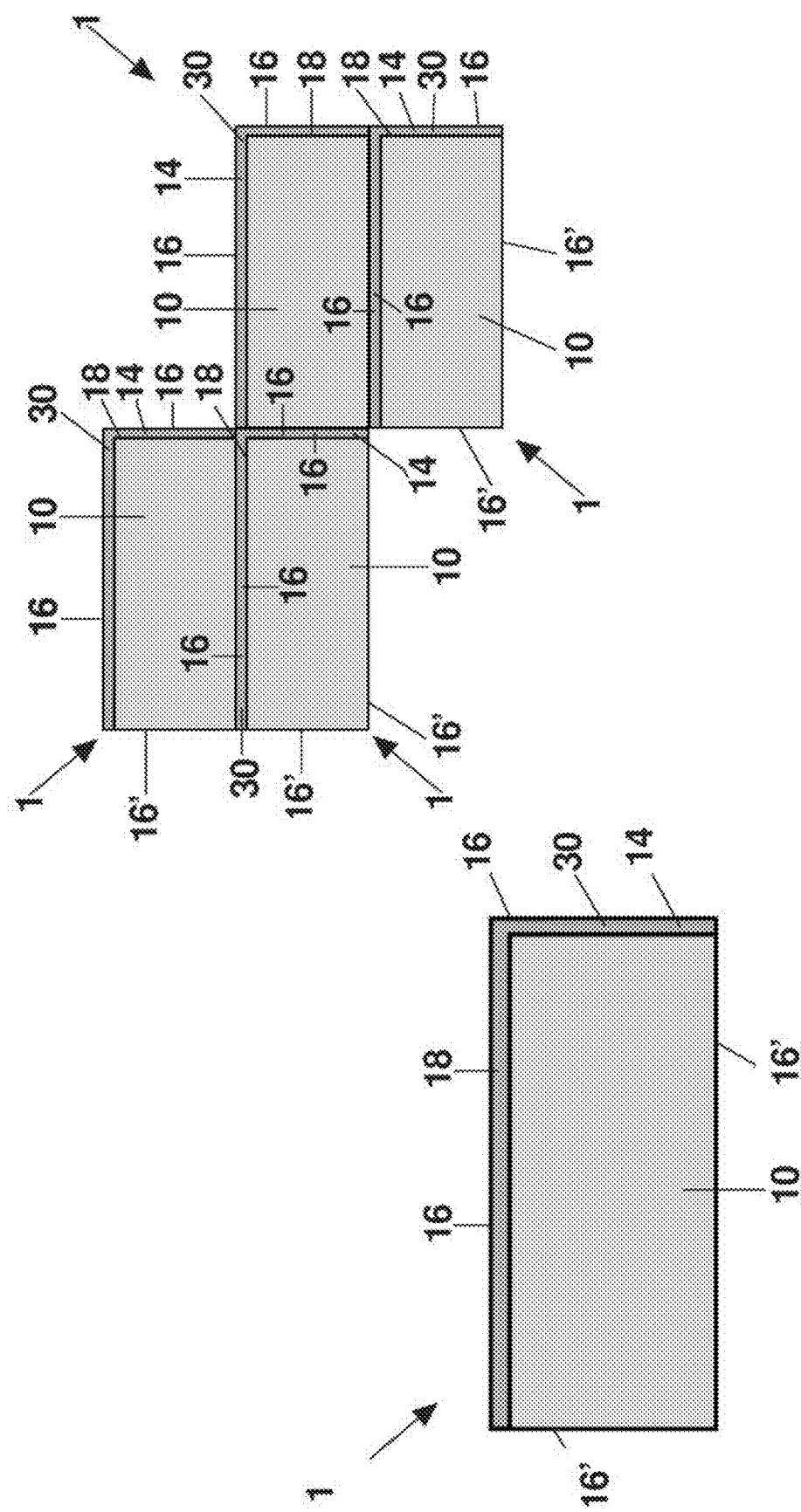

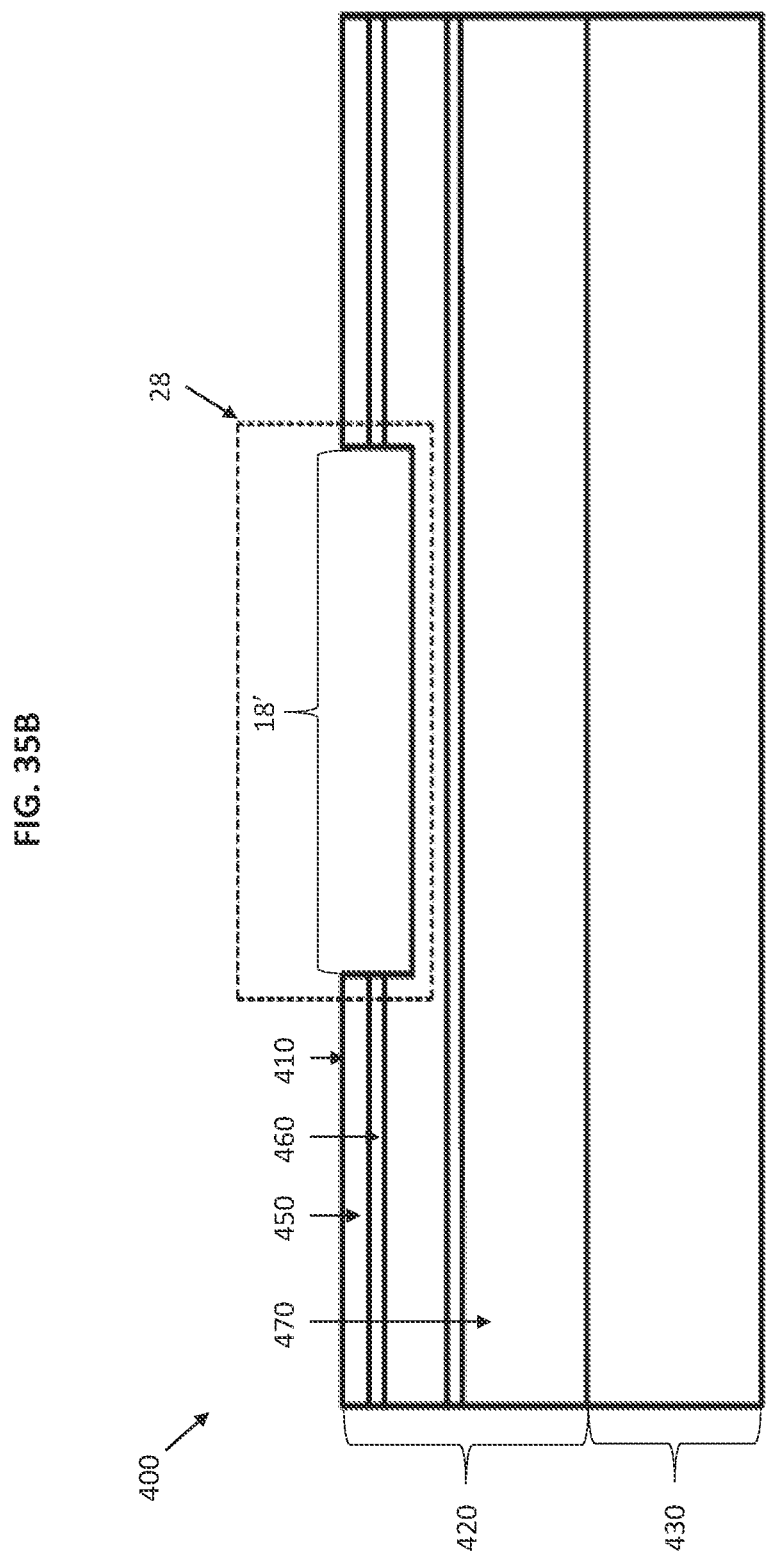

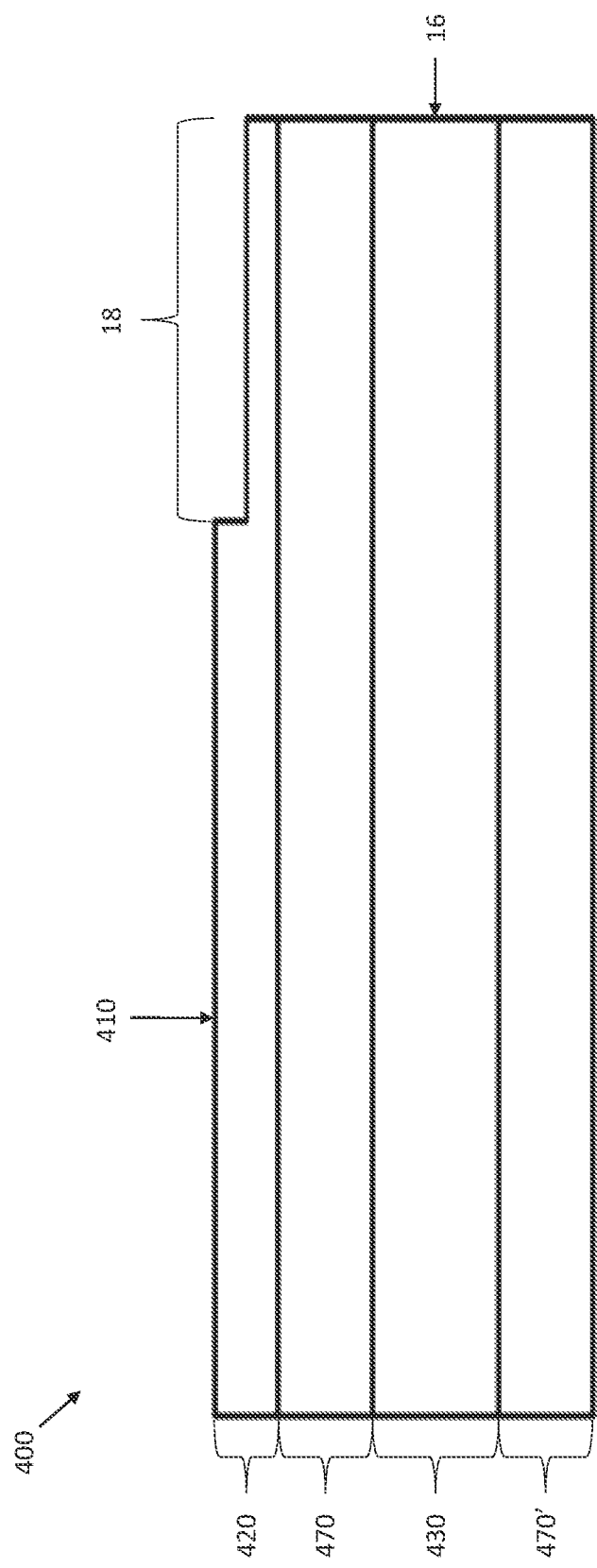

TILE WITH IMITATION GROUT LINE

CLAIM OF PRIORITY

This application is a Continuation of a currently pending patent application having Ser. No. 16/358,241 and a filing date of Mar. 19, 2019, which itself is a Continuation in Part (CIP) of a patent application having Ser. No. 16/196,974 and a filing date of Nov. 20, 2018, which claims priority to a Continuation in Part (CIP) patent application having Ser. No. 15/950,046 and a filing date of Apr. 10, 2018 and which matured into U.S. Pat. No. 10,132,088 on Nov. 20, 2018, which in turn claimed priority to a patent application having Ser. No. 15/454,650 and a filing date of Mar. 9, 2017, which matured into U.S. Pat. No. 9,938,726 on Apr. 10, 2018, which in turn claimed priority to a U.S. provisional patent application having Ser. No. 62/380,122 and a filing date of Aug. 26, 2016. In addition, the present application claims priority to a currently pending Continuation in Part (CIP) patent application having Ser. No. 15/949,979 and a filing date of Apr. 10, 2018, which is set to issue as U.S. Pat. No. 10,233,656 on Mar. 19, 2019, which also claims priority to the above-referenced patent application having Ser. No. 15/454,650 and a filing date of Mar. 9, 2017, which matured into U.S. Pat. No. 9,938,726. All of the foregoing applications and patents are incorporated herein by reference.

BACKGROUND OF THE INVENTION

Field of the Invention

The present invention is directed to a tile, such as a flooring tile, which in most embodiments is made entirely from synthetic materials and having an appearance of real marble, stone, ceramic or wood, and which offers a highly realistic looking but imitation grout line formed along the length of one or more of its sides. The inventive tile comprises at least a top layer and a core layer, and during the manufacturing process, at least a portion of the top layer is removed along at least one side thereof to define an exposed portion along the side of the tile, which extends outwardly below and away from the top surface of the tile. The exposed portion of the tile additionally comprises a textured surface to closely resemble the look and feel of an actual grout line, and may include a colorant to correspond with the overall intended color of the resulting tile. In one or more additional embodiments, the inventive tile includes a protective section structured to avoid or reduce staining of the exposed portion that closely resembles an actual grout line.

Description of the Related Art

During the construction of a home, building or other structure, there will almost always be an unfinished floor surface such as a slab of concrete, a wood sub-structure or the like, which needs to be finished to offer a more appealing and/or polished appearance. It is also true that there will almost always be an unfinished wall surface made of a wood substructure, having dry wall affixed thereto, or another substructure such as concrete or concrete block. In many cases, tiles will be used to finish either a floor surface or a wall surface, with the tiles often being made of real marble or stone, or depending on budgetary constraints, of porcelain or ceramic. Traditionally, such tiles are secured to the unfinished floor slab or wall surface using a cement-like mixture, with one or more tiles disposed closely next to each other, and leaving a small separation between the sides of adjacent tiles. Forming this separation between tiles is often tedious and requires the use of spacers to ensure uniformity and alignment of the tiles. Also, this separation will later be filled with a grout mixture as part of the installation process, which creates a "grout line" around the sides of the tiles. In general, the process of installing tile and creating the grout line involves a significant amount of time, which adds to the labor and overall cost of the project.

Over the last several years, flooring products and tiles have been made from synthetic materials and configured to imitate the look of a real tile of marble, stone or ceramic. For example, laminate and vinyl flooring products are known, including some that imitate the look of real stone, marble, or ceramic tiles. These flooring products create an optical or visual illusion so that the surface of the tile looks like real stone, marble or ceramic or even like real wood flooring. Traditionally, however, such flooring products are manufactured so as to require that the individual tiles be installed directly next to each other, often in abutting relation, although some of these products are installed with a slight separation between them to facilitate installation on uneven floor surfaces. While this slight separation may be observable and in some cases may appear as a small seam or even as a micro groove, these types of known tiles do not offer any structure to represent or closely resemble the look and feel of a real grout line. This is also true of existing imitation flooring products having an internconnecting mechanism to facilitate installation, such as correspondingly disposed "tongue" and "groove" structures formed along a side of a tile. Additionally, some laminate flooring planks are known to offer an optical illusion of having a grout line, but in reality, the seams of such flooring planks and/or tiles are completely flat and have imitation grout lines drawn and shaded on the edges by an artist to give the impression of depth. While such flooring products or tiles exist, none are believed to have ever featured a layer of polyvinyl chloride (PVC) having an optimal density so that a portion thereof can be exposed during the manufacturing process to form an imitation grout line with a highly realistic look and feel of an actual grout line. Furthermore, no such tiles or flooring products are believed to have ever featured a layer of polyvinyl chloride (PVC) combined with a colorant during the manufacturing process so as to provide a variety of colors for the imitation grout line that will match with or closely correspond to the overall color of the resulting tile.

Additionally, of the known flooring products or tiles that exist, none are believed to feature a core layer formed of a densified foam material and having optimal density ranges that is sufficiently rigid and durable for a wide variety of applications.

Also, and even though some of the existing imitation flooring products have correspondingly disposed "tongue" and "groove" structures formed along a side of a tile, there are drawbacks associated with these when it is desired to use such flooring products on a wall surface, as opposed to a floor surface. More specifically, the installation process for such products on a vertical surface, such as a wall, is cumbersome and further, remains labor intensive and therefore costly. As such, there is room for improvements in the structuring of such tiles for interconnection and installation on a vertical surface, such as a wall.

Accordingly, it would be beneficial if an improved tile or flooring product made from synthetic materials were developed, such as but not limited to one having a core layer made at least in part from a densified foam material, so as to be sufficiently rigid and durable for a wide variety of applications, and further, which is capable of being easily and quickly installed, even on a vertical surface, such as a wall. Additionally, if any such improved tile or flooring product were developed, it would also be beneficial if it could be made to include a polyvinyl chloride (PVC) material capable of being readily formed during the manufacturing process to achieve a texture on selected portions that matches the look and feel of an actual grout line.

SUMMARY OF THE INVENTION

The present invention is intended to present a solution to these and other needs which remain in this field of art, and as such, is directed to a tile, primarily but not exclusively intended for use in flooring applications, that imitates the look and feel of a real tile surface such as stone, ceramic, or marble, and the like, including the look of wood flooring, and further, which is formed from material(s) that can be made in a variety of different colors and designs. The present invention is also directed, however, to a tile that is structured to have an imitation grout line, but with a highly realistic look and feel similar to an actual grout line, formed on or substantially along at least one side or edge of the tile. Additionally, the tile of the present invention may be manufactured in different dimensions of varying length and width, and may also be produced in a variety of shapes such as, but not limited to, rectangular, square, hexagonal, or octagon, and others. As will also be described with regard to at least one embodiment, the tile of the present invention may also be manufactured so as to include a very thin veneer layer of genuine wood or stone.

As will become clear from the description which follows, the tile of the present invention comprises at least a top layer and a core layer. The top layer in most embodiments, but not all, comprises generally a layer made from a vinyl composite material, including a synthetic plastic polymer such as, but not limited to, polyvinyl chloride (PVC). However, in some embodiments described herein, particularly wherein the core layer of the inventive tile is made from a stone plastic composite (SPC), which may also be referred to at times as a stone polymer composite (SPC), a top layer or section comprising a polyvinyl chloride (PVC) material is not needed, while in one or more other embodiments, a top layer or section may be included which may comprise a decorative layer and a wear layer.

In most embodiments, but not all, the top layer of the inventive tile comprises at least one PVC layer, as described above. However, in at least one preferred embodiment, the top layer additionally comprises both a wear layer and/or a decorative layer. Also, the top layer of the tile, and particularly the wear layer in said one or more embodiments, is formed to have a selected thickness depending upon the intended use of the tile such as residential, light contract, heavy commercial, or other type of use. Moreover, the density of the polyvinyl chloride (PVC) layer material is such that the inventive tile(s) may be readily modified during the manufacturing process to achieve the desired effect of offering a highly realistic looking grout line when viewed by a person standing on or near the floor surface. Also during the manufacturing process, the top surface of the tile, defined by the top layer and specifically, by the wear layer in one or more embodiments, may be pressed or otherwise modified to achieve a variety of textured surfaces thereon, which help to provide the tile with an appearance of real marble, stone, ceramic or of a real wood surface or other natural textures. The core layer of the inventive tile comprises a rigid and waterproof material. More specifically, the core layer comprises a "densified foam" material in several embodiments. Also, the material composition and density range of the densified foam ensure that the core layer, and consequently the tile(s), is/are both relatively lightweight and yet sufficiently rigid and durable for flooring applications. In some cases, the core layer comprising a densified foam material may be referred to as a Wood Plastic Composite (WPC), but the composition of the core layer should not be construed as being limited to this. Additionally, the core layer may have a smooth texture. Further, the core layer may comprise one or more sublayers that serve as an underlayment. These sublayers may be made from other materials such as, but not limited to, laminate foil, cork, foam, or ethyl vinyl acetate.

The inventive tile also comprises an exposed portion that extends outwardly from and along the length of at least one side of the tile that is structured to simulate a grout line. The exposed portion is associated with a sidewall and defines a gap that preferably extends uniformly and substantially along the side of the tile. The exposed portion additionally comprises a textured surface structured to closely simulate the appearance of a real grout line. The exposed portion may also be formed on one or more layers of the inventive tile so as to have realistic looking dimensions and coloring. As illustrated in several of the Figures, the exposed portion is formed along at least one side of the inventive tile, but in other embodiments, may be disposed along more than one side or even along all sides of the tile. This exposed portion is preferably formed on the tile during the manufacturing process, as opposed to during installation. During the manufacturing process, a tool, such as but not limited to a knife, cutting blade(s) and the like, may be configured and used to remove a portion of the top surface of the tile uniformly along at least one selected side thereof, or even across a central or middle portion thereof, and will expose at least a portion of the top layer of the tile, and in some embodiments may expose a portion of the core layer. Additionally, the knife, cutting blade(s) or other tool may also modify the exposed portion, such as by further cutting and/or profiling of it so as to provide the textured appearance that closely simulates the look and feel of a real grout line.

In one or more additional embodiments, the present invention further includes a protective section disposed between a top section and a core layer of the tile, which includes an exposed portion formed to closely resemble a real grout line, as described herein. The protective section is structured to at least partially reduce and/or avoid staining of the exposed portion comprising the imitation grout line. The protective section comprises at least a protective layer, and in some embodiments may comprise a clear polyvinyl chloride (PVC) material that is resistant to abrasion, and that is structured to avoid or reduce staining. In a preferred embodiment, the protective section additionally comprises a decorative layer disposed under the protective layer and made of a very thin, film-like material, such as PVC, and which further includes a colorant. In one or more of these embodiments of the invention, the exposed portion may be formed directly on the protective section, and more specifically, on the protective layer.

In at least one additional embodiment, the tile according to the present invention may further include a vinyl layer joined to the top section. The vinyl layer may also be joined to a core layer below, although a core layer is not strictly required. In tiles comprising a vinyl layer, an exposed portion configured to imitate a grout line may be formed on at least a portion of the top section of the tile. In embodiments of the tile comprising a vinyl layer, the top section may comprise a first and a second wear layer, as well as a first and a second decorative layers. The first wear layer is generally coincident with the top surface of the tile. The first decorative layer is generally disposed below the first wear layer and is structured to imitate the feel of a natural material such as, but not limited to, naturally occurring stone or wood. The Second wear layer is generally disposed below the first decorative layer and comprises a substantially equivalent structure to the first wear layer. The second decorative layer is generally disposed below the second wear layer and has a color that corresponds to an intended grout color. Generally, the exposed portion structured to imitate a grout line may be defined by exposing at least a portion of the second wear layer.

Additional features of the tile of the present invention include an interconnecting mechanism formed on at least one side of the tile to facilitate installation. For example, the interconnecting mechanism may comprise a "tongue" formed along one side of a tile, and a "groove" formed along one side of a different tile, and which are cooperatively structured to be matingly interconnected so as to join two different tiles together along their correspondingly disposed sides. Additionally, the "tongue" side and/or the "groove" side may each be configured to accommodate the exposed portion defining a gap along a side or edge of the tile. In one or more other embodiments, the inventive tile includes at least an extended interconnecting mechanism to facilitate installation of the tile on a vertical surface, such as a wall, as well as on other surfaces.

Other features of the tile of the present invention include a bevel comprising a slanted edge, formed on the side(s) of the tile, and specifically, adjacent to the exposed portion of the tile and textured surface. The sidewall associated with the exposed portion may include the bevel at an upper portion thereon, and in general, the bevel helps to more closely simulate the look and feel of a real grout line. The bevel may be formed in a variety of sizes, but in one embodiment, the angle of inclination of the bevel, with respect to the top surface of the tile, will be in a range between about 30° to about 90° although in an illustrated embodiment, this angle will be closer to about 12°. In general, in embodiments having a bevel, the intended width of the resulting simulated grout line will be a factor in determining the steepness of a corresponding angle of inclination. For example, a steeper angle of inclination may correspond to a grout line having a smaller width, while a less steep angle of inclination may correspond to a grout line having a larger width. Alternatively, the bevel may have a modified structure, such as a two staged descent from the top surface of the tile to the exposed portion and textured surface simulating a grout line. In another embodiment, the bevel may comprise a "micro" bevel.

A primary object of the present invention is to provide a tile suitable for use as a flooring surface, which is made from synthetic materials and closely imitates the look of real stone, marble, ceramic or even wood flooring, but which also offers an imitation grout line with a highly realistic look and feel similar to that of an actual grout line.

Another primary object of the present invention is to provide an inventive tile made from synthetic material(s) that can be readily formed during the manufacturing process to define an exposed portion including a gap substantially or entirely along a selected side thereof and that can be readily profiled to achieve a texture surface thereon which closely matches the look and feel of an actual grout line.

Yet another primary object of the present invention is to provide a tile with a highly realistic looking and yet imitation grout line that can also be manufactured in variety of colors so as to offer a close match with and consistency of color relative to the overall color of the resulting tile, which has not been achieved before in any existing products.

An advantage of the tile of the present invention in at least some embodiments is that the material(s) used to make it is/are relatively lightweight and yet sufficiently rigid and durable for a wide variety of applications, and is/are also waterproof.

A feature of the tile of the present invention is that in at least some embodiments there is an interconnecting mechanism formed along at least one edge thereof or more that facilitates the assembly and installation process.

Another advantage of the tile of the present invention is that the materials(s) used to make it are capable of assuming a variety of different shapes, colors and/or designs.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description, as taken in connection with the accompanying drawings, in which:

FIG. 7-B is also a transverse sectional view of a tile according to the present invention in yet another embodiment comprising at least a top layer, and a core layer, along with an interconnecting mechanism, and illustrating an exposed portion having an imitation grout line formed on the core layer.

FIG. 15-B is a plan view of several tiles, each similar to the tile depicted in FIG. 15-A with an exposed portion and imitation grout line formed on all of its sides, interconnected together to create a floor or wall covering.

FIG. 16-A is a plan view of another preferred embodiment according to the present invention showing a tile comprising an exposed surface with an imitation grout line formed on two of its sides.

FIG. 16-B is a plan view of several tiles, each similar to the tile depicted in FIG. 16-A with an exposed portion and imitation grout line formed on two of its sides, interconnected together to create a floor or wall covering.

FIG. 17-B is a plan view of another preferred embodiment according to the present invention showing a plurality of interconnected tiles each comprising an imitation grout line formed on two adjacent sides.

FIG. 35B is a transverse sectional view of another embodiment of a tile according to the present invention comprising a vinyl layer, and an exposed portion formed on a second wear layer substantially across a middle section of the tile.

FIG. 39 is a transverse sectional view of yet another embodiment of a tile according to the present invention comprising two vinyl layers, and an exposed portion formed on the top section of the tile.

Like reference numerals refer to like parts throughout the several views of the drawings.

DETAILED DESCRIPTION

The present invention is directed towards a tile 1, such as a flooring tile, made from synthetic materials and so as to imitate the look and feel of real stone, marble, ceramic, wood or other materials, but which is further structured to offer a simulated grout line, with a highly realistic look and feel, on or along at least one side or edge of the tile 1. While the tile 1 of the present invention is particularly well suited for use as a flooring tile, it may also readily be used on wall surfaces or in a variety of other applications, and should not be considered as being limited only to flooring applications. As will also be described with regard to at least one embodiment, the tile 1 of the present invention may also be manufactured so as to include a very thin veneer layer of genuine wood or stone.

Figure 1:
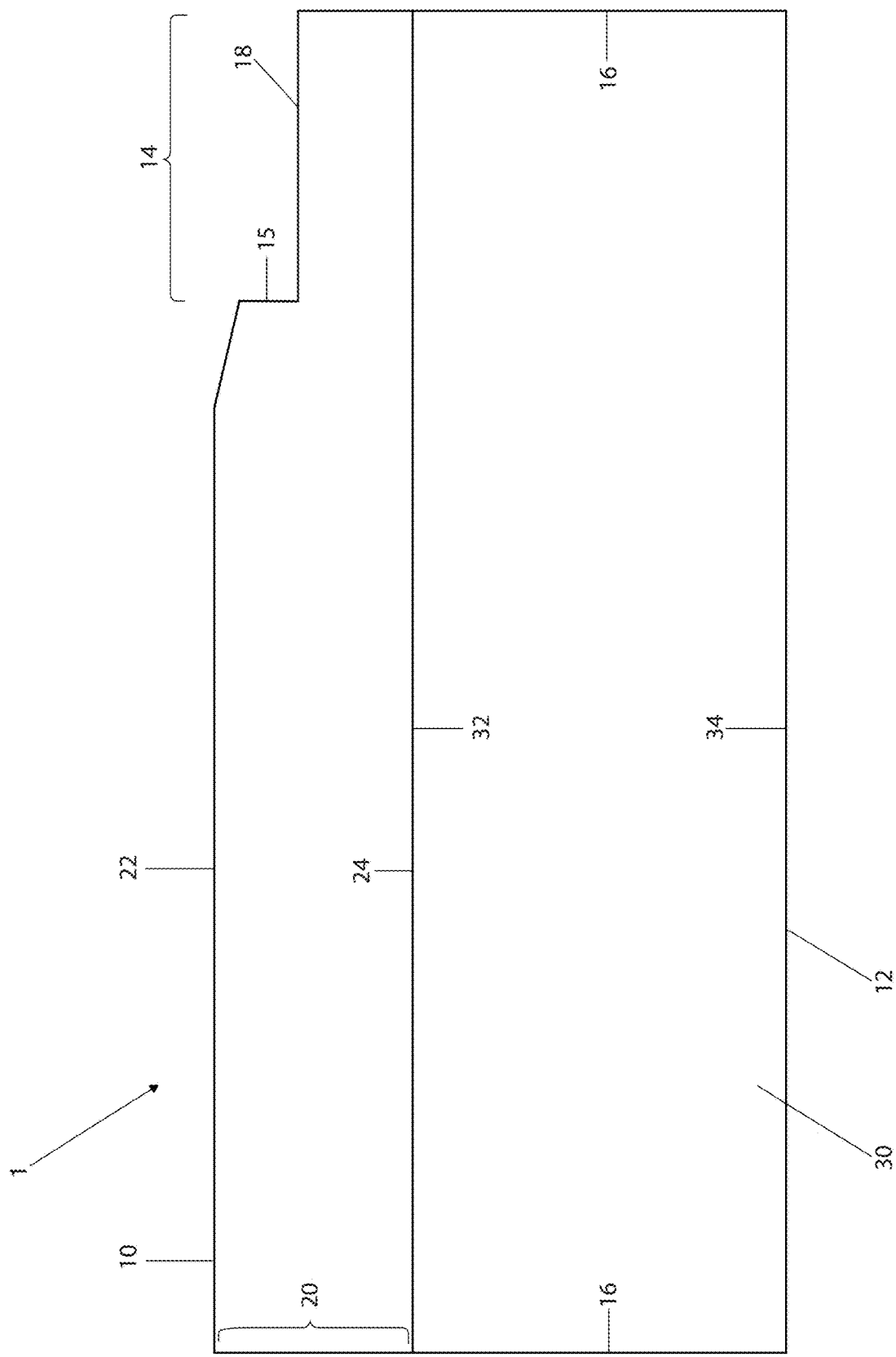
FIG. 1 is a transverse sectional view of a tile in accordance with the present invention comprising a top layer and a core layer, and illustrating an exposed portion formed in the top layer.
Figure 8:
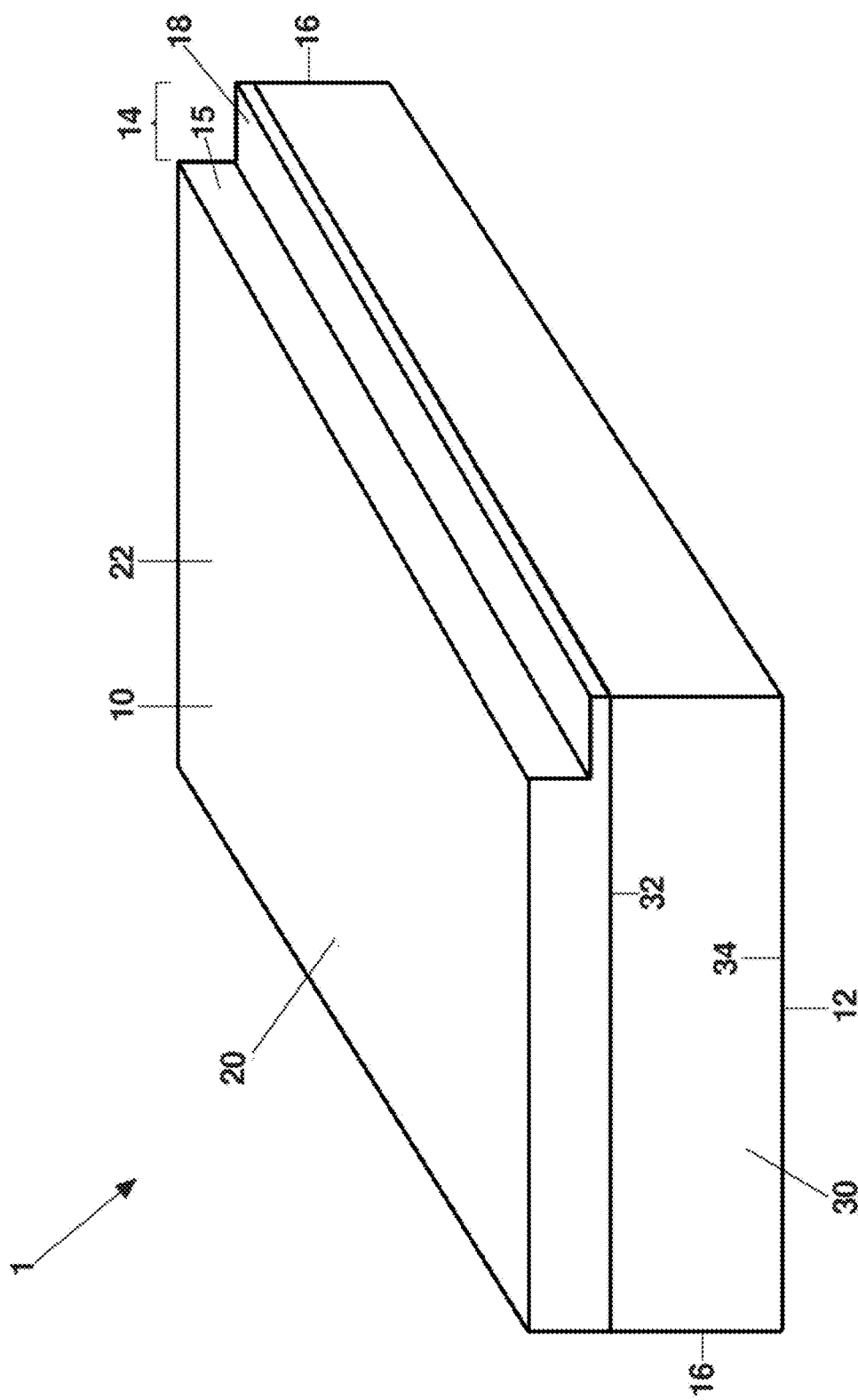
FIG. 8 is a perspective view of the embodiment of the invention shown in FIG. 1 comprising a top layer and a core layer.

In general terms, the tile 1 of the present invention comprises an upper or top section, a lower or core section, and a plurality of sides. For example, and with reference to FIGS. 1 and 8, the upper or top section may be defined by a top layer 20, and the lower or core section may be defined by a core layer 30. As shown in FIG. 1, the top layer 20 comprises a first surface 22 that at least partially defines a top surface 10 of the tile 1, as well as a lower or second surface 24. The core layer 30 comprises an upper or third surface 32 adhered to or otherwise connected to the lower or second surface 24 of the top layer 20, so as to join the top layer 20 and core layer 30 together. The core layer 30 also comprises a fourth surface 34 that generally defines the bottom surface 12 of the tile 1, which will be adhered to an unfinished slab of concrete or other floor surface in a building. In some embodiments, however, the core layer 30 can include sublayers, such as a sound proofing or other material.

The tile 1 of the present invention may be formed in part from a vinyl material or a vinyl composite material, and may be referred to as a Vinyl Composite Tile (VCT). Although the top or upper section may be formed from a variety of materials, vinyl material(s) are preferred for a number of reasons, including the ability to offer a quality product at an affordable price point. The top layer 20 comprises a vinyl composite or a synthetic plastic polymer such as polyvinyl chloride (PVC). However, in at least one alternative embodiment, the tile of the present invention may include a top section comprised of a very thin layer of genuine wood or stone. As described more in detail herein, in most embodiments the top layer 20 will include a layer of polyvinyl chloride (PVC), such as a plasticized and/or extruded PVC, having a density that allows for a realistic looking grout line to be readily and consistently formed.

Figure 2:
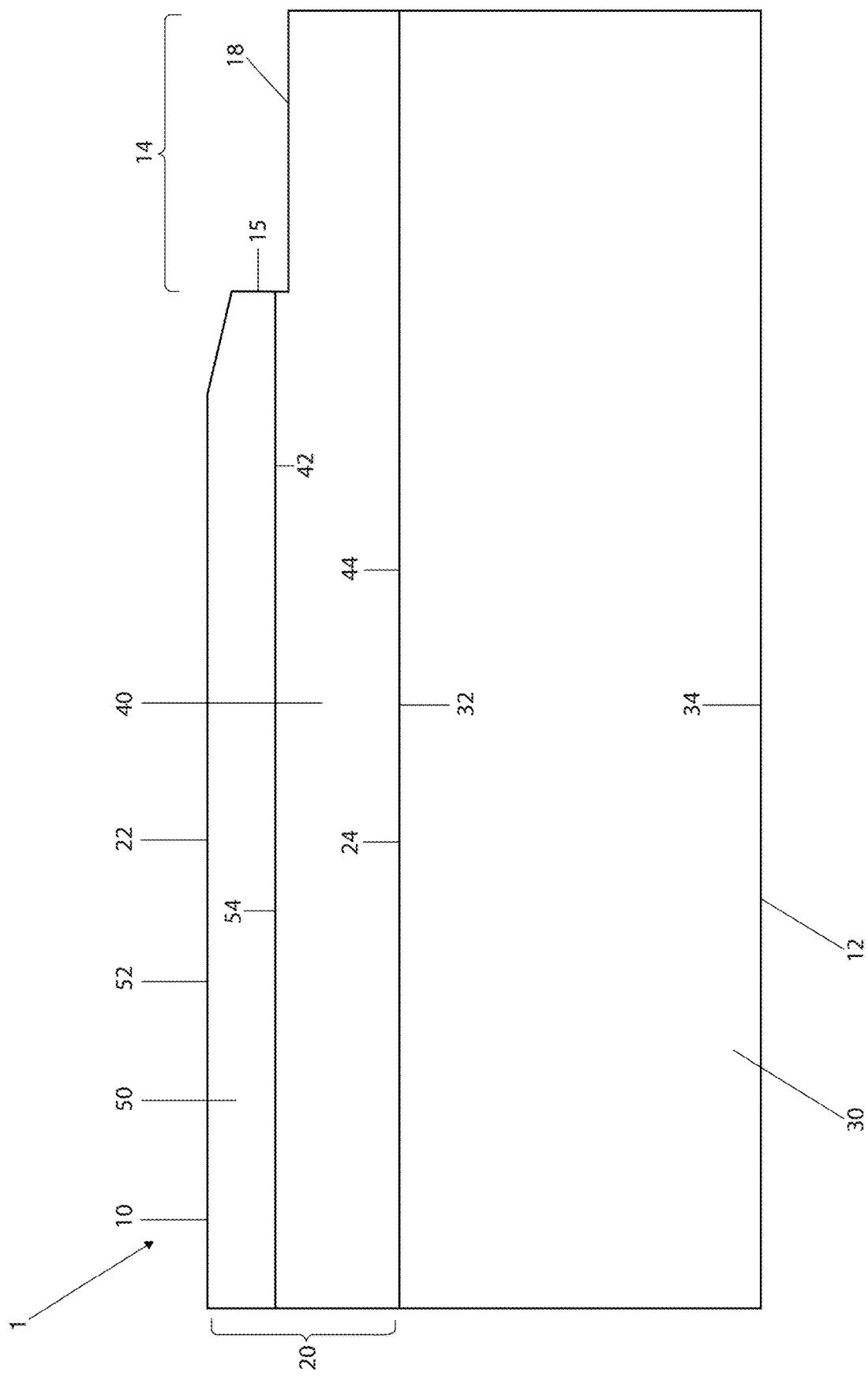
FIG. 2 is also a transverse sectional view of a tile in accordance with the present invention comprising a top layer and a core layer similar to FIG. 1, but illustrating the top layer as including both a polyvinyl chloride (PVC) layer and a wear layer.
Figure 3:
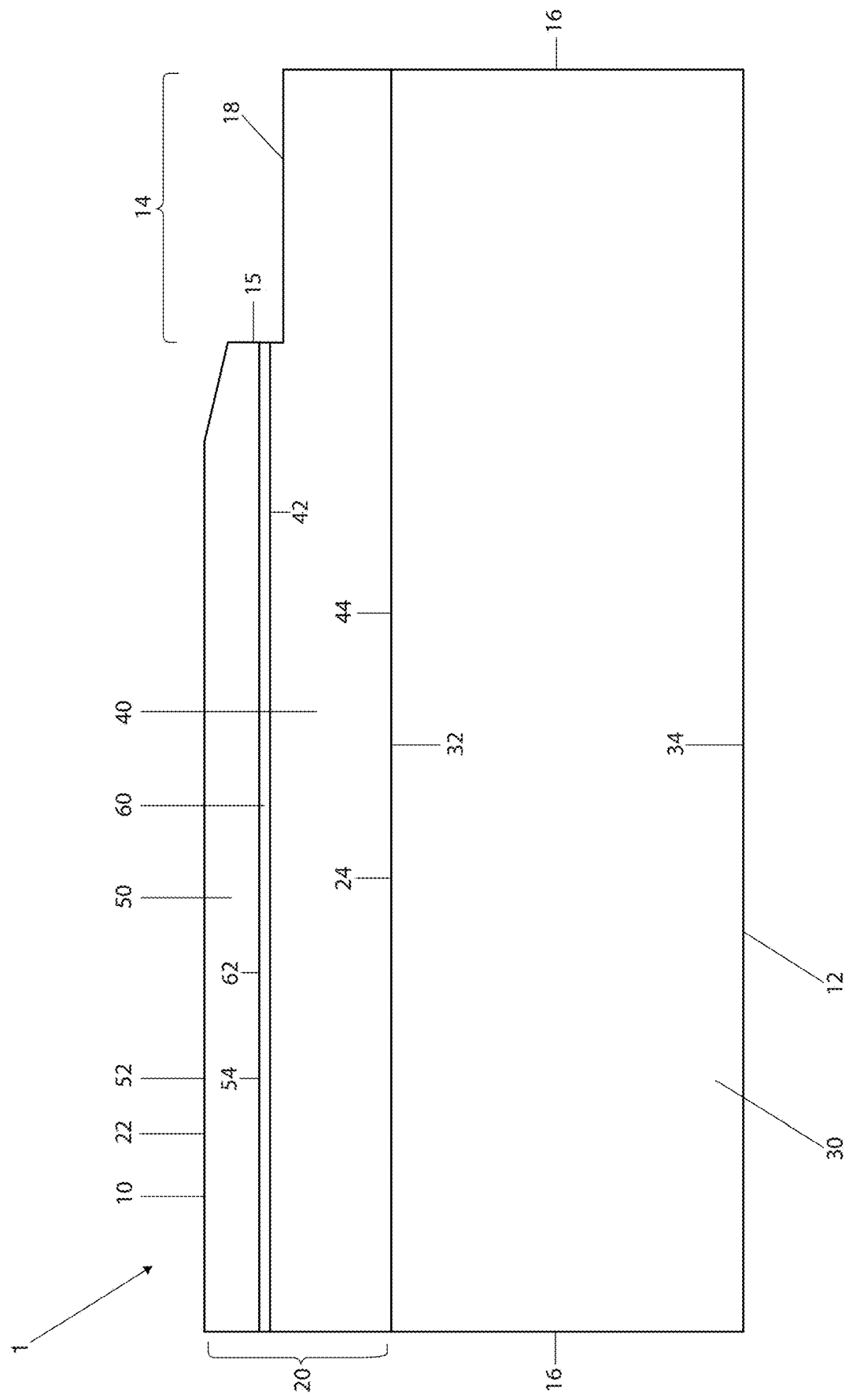
FIG. 3 is also a transverse sectional view of a tile in accordance with the present invention comprising a top layer and a core layer similar to FIG. 1, but illustrating the top layer as including a polyvinyl chloride (PVC) layer, a decorative layer and a wear layer.
Figure 4:
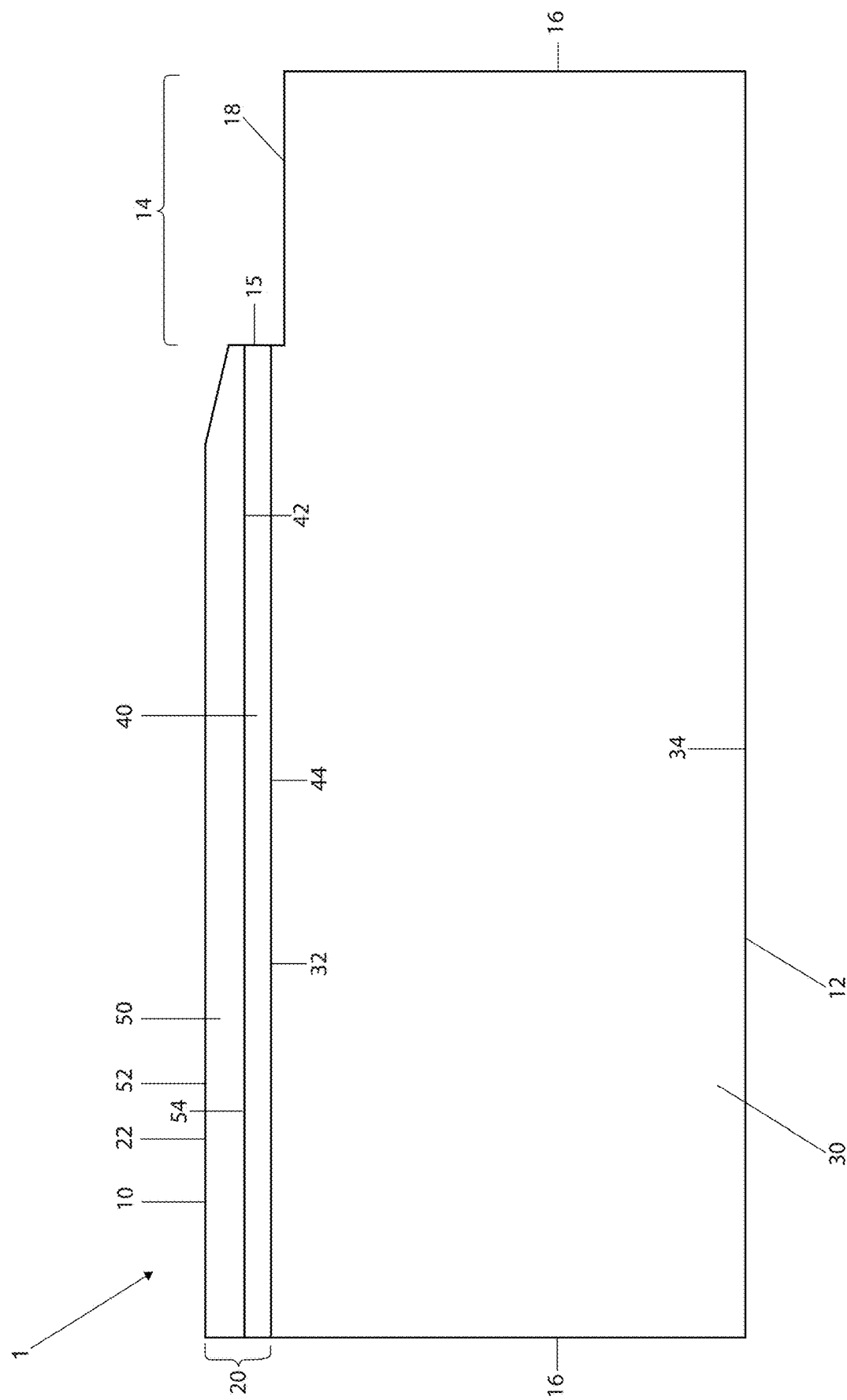
FIG. 4 is also a transverse sectional view of a tile in accordance with the present invention comprising a top layer and a core layer similar to FIG. 2, including the top layer having a polyvinyl chloride (PVC) layer and a wear layer, but illustrating the exposed portion formed on the core layer.

With reference now to FIGS. 2 through 7-B, and 9-11, in some embodiments the top layer 20 will comprise additional layers. For example, and as shown in FIGS. 2 and 4, the top layer 20 is illustrated as comprising a wear layer 50 and a polyvinyl chloride (PVC) layer 40. In these and other embodiments, the wear layer 50 includes a top surface 52 which is entirely or at least partially coincident with the top surface 10 of the tile. The wear layer 50 may vary in thickness according to its intended use such as residential, light contract, heavy commercial or other type of use. The wear layer 50 will preferably be formed during the manufacturing process so as to include one or more design features, such as a texture with some undulation to imitate the look and feel of real stone or marble or a texture that has grooves and/or other impressions to imitate the look and feel of, for example, a real piece of wood. In the embodiments shown in FIGS. 2 and 4, the polyvinyl chloride (PVC) layer 40, such as extruded PVC, is generally disposed between the wear layer 50 and the core layer 30. For example, the polyvinyl chloride (PVC) layer 40 may be connected at its upper surface 42 by way of adhesives and/or pressing to a lower surface 54 of the wear layer 50, and similarly connected at its lower surface 44 to an upper surface 32 of the core layer 30. The polyvinyl chloride (PVC) layer 40 may comprise a material of synthetic plastic polymer such as polyvinyl chloride (PVC) or may be made out of or so as to include other materials. However, since it includes polyvinyl chloride (PVC) it will be referred to herein throughout as the polyvinyl chloride (PVC) layer 40. In the preferred embodiments the polyvinyl chloride (PVC) layer 40 has a density in a range of between generally about 2,000 kg/m3 (124.856 lb/ft3) to about 2,400 kg/m3 (149.827 lb/ft3). In at least one embodiment, the density of the polyvinyl chloride (PVC) layer 40 is generally about 2,000 kg/m3 (124.856 lb/ft3). In at least one or more additional embodiments, however, the polyvinyl chloride (PVC) layer comprises another density which can be anywhere in a range from generally about 1,600 kg/m3 (about 99.884 lb/ft3) up to generally about 2,600 kg/m3 (about 162.313 lb/ft3).

Figure 9:
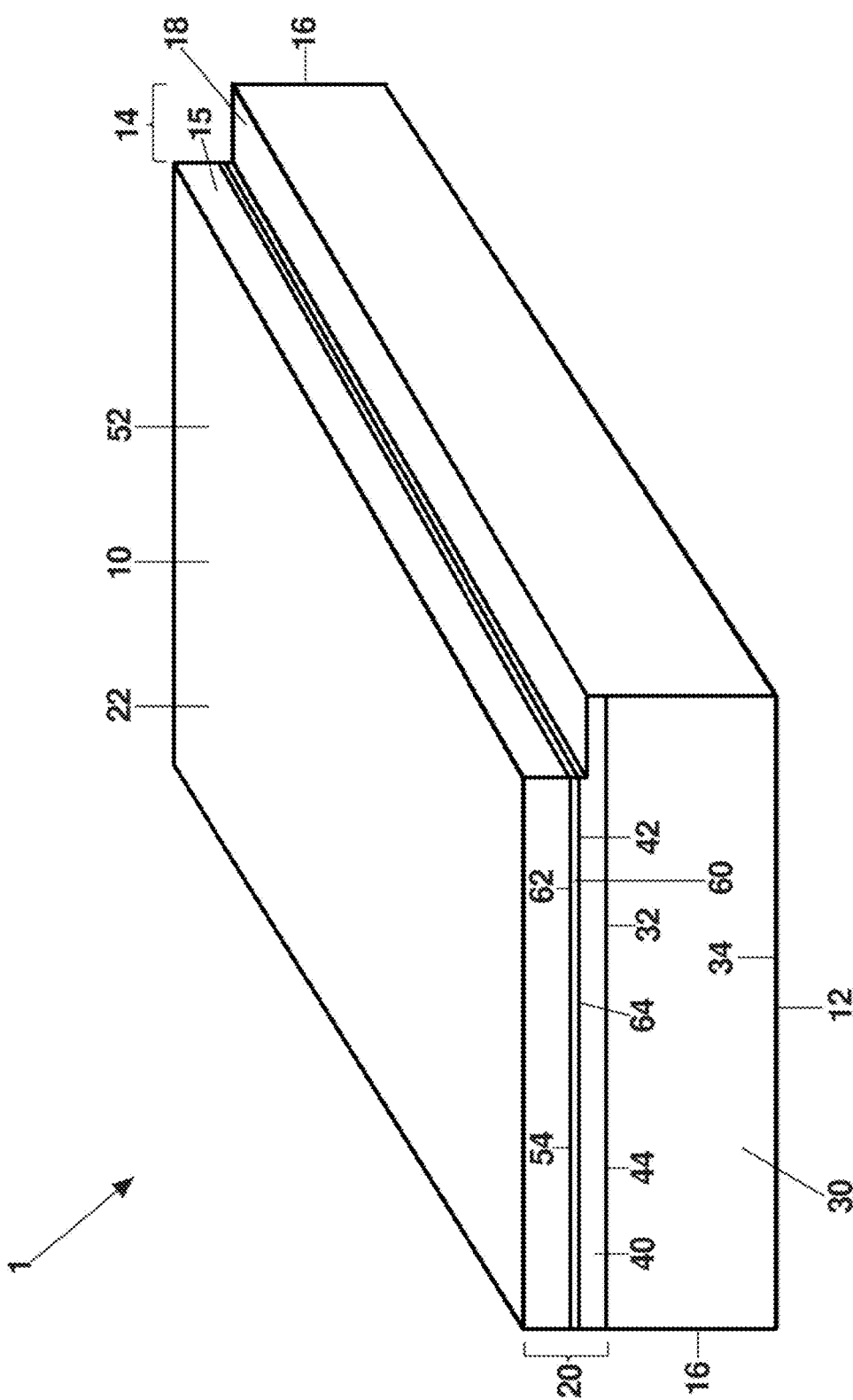
FIG. 9 is also a perspective view of the invention similar to FIG. 1 but illustrating another embodiment wherein the tile comprises and a top layer including a wear layer, a decorative layer and a polyvinyl chloride (PVC) layer, as well as a core layer, and further, showing the exposed portion formed with most of the top layer removed so as to be disposed into the PVC layer.
Figure 10:
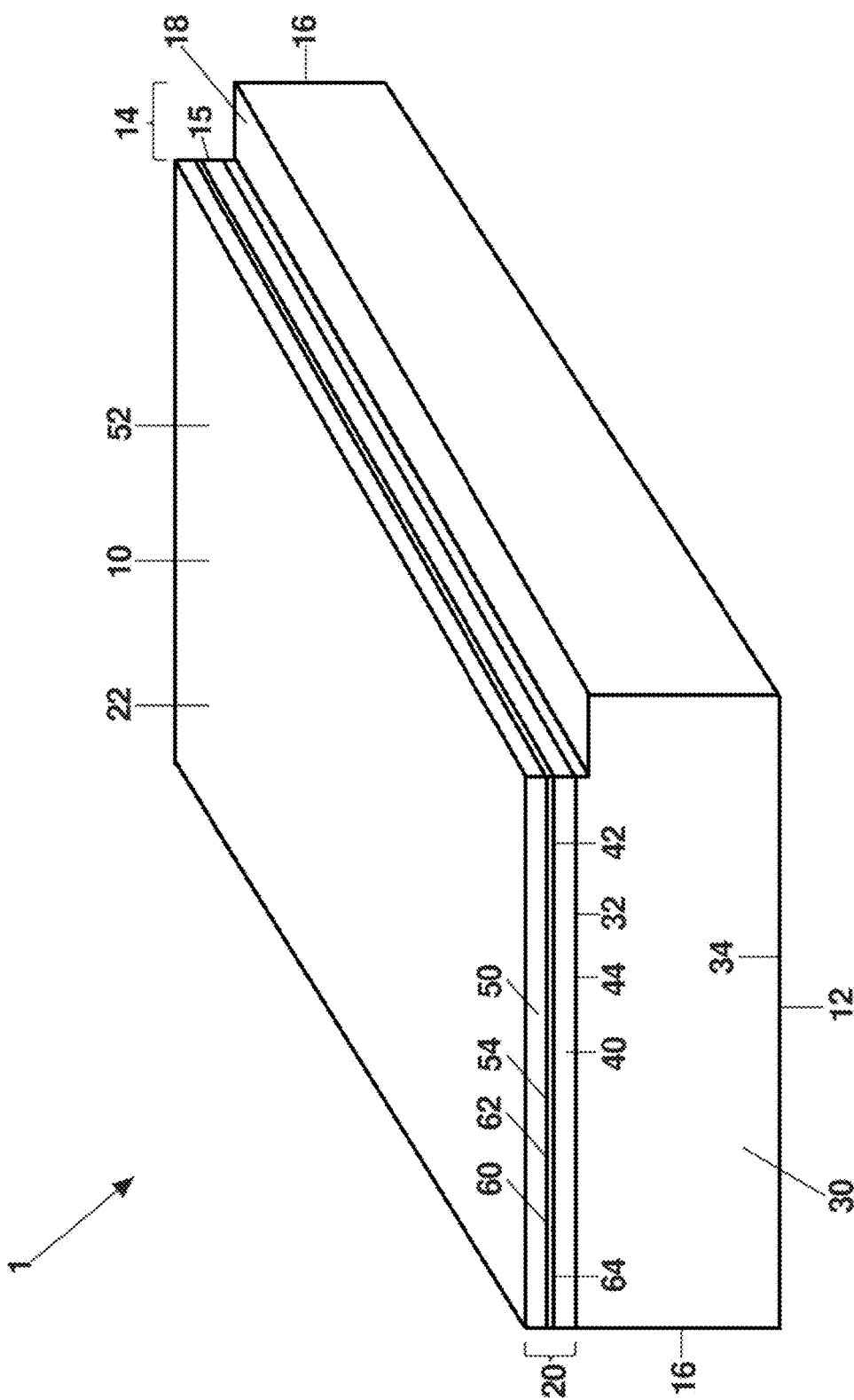
FIG. 10 is also a perspective view of the invention similar to FIG. 1 but illustrating the embodiment wherein the tile comprises a top layer including a wear layer, a decorative layer and a polyvinyl chloride (PVC) layer, and further, showing the exposed portion having an imitation grout line formed on the core layer.
Figure 11:
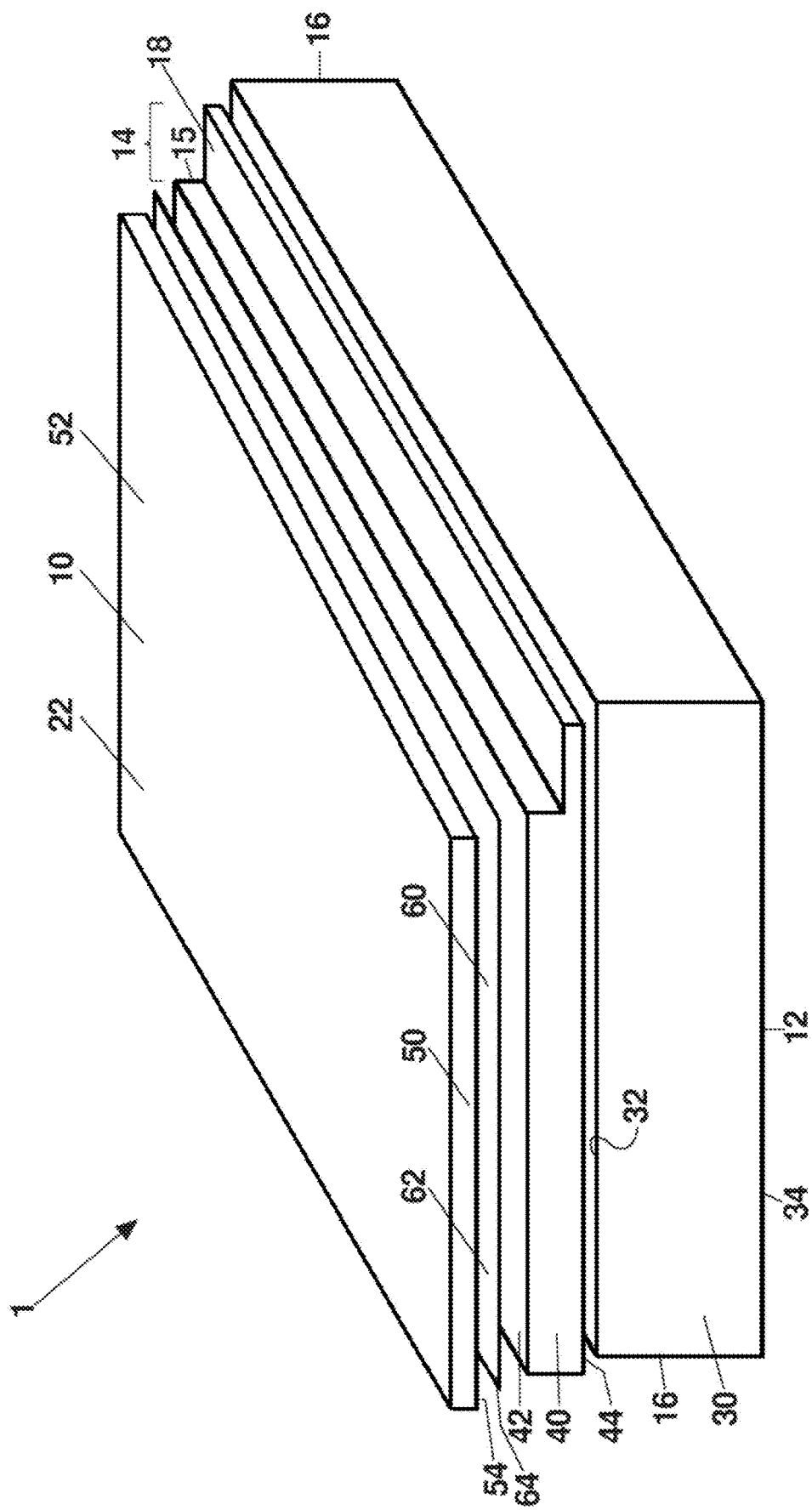
FIG. 11 is a perspective exploded view of the embodiment represented in FIG. 9.

With reference now to FIGS. 3, 5, 6, 7-A and 7-B, and FIGS. 9-11, the top layer 20 of the inventive tile 1 may comprise a wear layer 50, a polyvinyl chloride (PVC) layer 40 and also a decorative layer 60. The decorative layer 60 may comprise a film or sheet that may be made from a variety of materials such as, but not limited to, polyvinyl chloride (PVC). The decorative layer 60 will also preferably comprise one or more design features that help to provide an authentic look of a selected material, such as real stone, real marble, ceramic, wood, or another surface. For example, the decorative layer 60 may comprise a film having decorative features corresponding to the look and coloring of a natural wood grain or a wood flooring plank. In the embodiments of FIGS. 3, 5 through 7B, and 9-11, the decorative layer 60 is disposed in interconnecting relation between the wear layer 50 and the polyvinyl chloride (PVC) layer 40. These layers may be adhesively connected or interconnected by a variety of adhesives known in the art, such as but not limited to glue. For example, and as can be appreciated from FIGS. 9 and 11, the decorative layer 60 includes an upper surface 62 connected to the lower surface 54 of the wear layer 50, and also, a lower surface 64 connected to the upper surface 42 of the polyvinyl chloride (PVC) layer 40. Additionally, the wear layer 50 may be made so as to have a substantially translucent or transparent appearance. When the wear layer 50 is made of a translucent or transparent material, it permits the design features carried on the decorative layer 60 to be readily seen there-through. In one or more embodiments, a coating of another material may be applied to the top surface 10 of the wear layer 50. By way of example, this coating may comprise a ethoxyline resin (ER) or a polyurethane (PU) material, which may be cured using an ultra-violet (UV) lighting and heating process. It is within the scope of this invention, however, to provide a tile 1 with or without the decorative layer 60.

Additionally, it is within the scope of the present invention to provide a tile 1 that comprises waterproofing properties. As such, the materials of the different layers of the top layer 20 as well as of the core layer 30, may all comprise waterproofing properties. Similarly, adhesives used to connect these layers may also have waterproof properties.

As mentioned previously, the material composition of the top layer 20 may vary, but in at least one embodiment, the top layer 20 generally comprises a mixture of polyvinyl chloride (PVC), as well as calcium powder, oil, and a foaming agent. In one preferred embodiment, the material composition of the top layer 20 may be about 20% to about 30% polyvinyl chloride (PVC), about 60% to about 70% calcium power, about 5% to about 10% oil, and about 0.5% to about 5% foaming agent.

The tile 1 of the present invention also includes a lower or core portion, which may be defined by a core layer 30 as shown in FIGS. 1-14. The core layer 30 is preferably formed from a material to allow the tile 1 to be rigid as well as waterproof. In the preferred embodiments, the core layer 30 comprises a densified foam material, and further, will preferably be relatively light weight. In some cases, the core layer comprising a densified foam material may be referred to as a Wood Plastic Composite (WPC), but the composition of the core layer should not be construed as being limited to this. Additionally, the core layer 30 may have a smooth texture. In some embodiments, the tile 1 may comprise one or more sublayers joined to the core layer 30 to serve as an underlayment or to attenuate sound. These sublayers may be made of other materials such as laminate foil, cork, foam, or ethyl vinyl acetate.

While the material composition of the core layer 30 may vary, it comprises in at least one embodiment a combination of a synthetic plastic polymer such as polyvinyl chloride (PVC), calcium powder, and a foaming agent. In a preferred embodiment, the densified foam material of core layer 30 comprises polyvinyl chloride (PVC) in an amount of generally between about 50% to about 55%, calcium powder in an amount of generally between about 40% to about 45%, and foaming agent in an amount of generally between about 5% to about 10%. The foaming agent may be a mixture of materials that enhance stability. In another preferred embodiment, the densified foam material of core layer 30 comprises a foam sheet formed from polyvinyl chloride (PVC) in an amount of generally between about 45% to about 50%, calcium powder in an amount of generally between about 45% to about 50%, and foaming agent in an amount of generally between about 5% to about 10%. In yet another preferred embodiment, the densified foam material of core layer 30 comprises a foam sheet formed from polyvinyl chloride (PVC) in an amount of generally about 46.5%, calcium powder in an amount of generally about 46.5%, and foaming agent in an amount of generally about 7%.

Also in certain preferred embodiments of the tile 1, the core layer 30 comprising a densified foam material will have a density within an optimal range from about 800 kg/m3 (which is about 49.942 lb/ft3) to about 900 kg/m3 (which is about 56.185 lb/ft3), which aids in ensuring that the tile 1 is sufficiently rigid and durable for flooring applications. In another preferred embodiment, which is helpful to flooring applications, the density of the core layer 30 is between about 850 kg/m3 (which is about 53.064 lb/ft3) to about 900 kg/m3 (which is about 56.185 lb/ft3). It should be appreciated that while this is considered an optimal range, the density of the core layer 30 can also vary outside of this range, and still be within the spirit and scope of the present invention.

For example, in one or more alternative embodiments of the inventive tile 1, the core layer 30 may comprise a different density, such as within a range from about 500 kg/m3 (about 31.214 lb/ft3) to about 2,000 kg/m3 (about 124.856 lb/ft3). In at least one or more additional embodiments, the core layer 30 may comprise a different density in a range anywhere from generally about 500 kg/m3 (about 31.214 lb/ft3) up to generally about 1,500 kg/m3 (about 93.642 lb/ft3).

As a specific but non-limiting example, and with reference to FIGS. 18-24, the inventive tile 1 can also be readily used as a wall panel, with several such wall panels being used to cover a wall surface. Since wall panel(s) will not be subject to a load from foot traffic or from the weight of heavy items such as furniture, etc., the inventive tile 1 may have core layer 30 with a lower density in a different optimal range of about 500 kg/m3 (about 31.214 lb/ft3) to about 900 kg/m3 (about 56.185 lb/ft3). As will be described in more detail subsequently herein, with regard to wall installations, the inventive tile 1 having a core layer 30 within this lower density range is advantageous as it provides for a relatively flexible tile 1 that facilitates installation, particularly when a connector is used, or when a number of connectors are used, to attach the tile to a surface, such as a wall.

As another example, however, in one or more alternative embodiments of the inventive tile 1, the core layer 30 may comprise a different density, such as within a range from about 1,200 kg/m3 (about 74.914 lb/ft3) to about 2,000 kg/m3 (about 124.856 lb/ft3).

Figure 26:
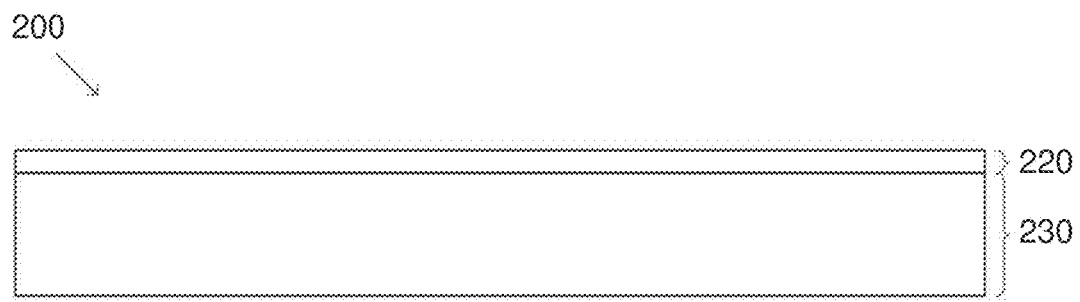
FIG. 26 is a transverse sectional view of another embodiment of a tile according to the present invention comprising a top section and a core layer.
Figure 27:
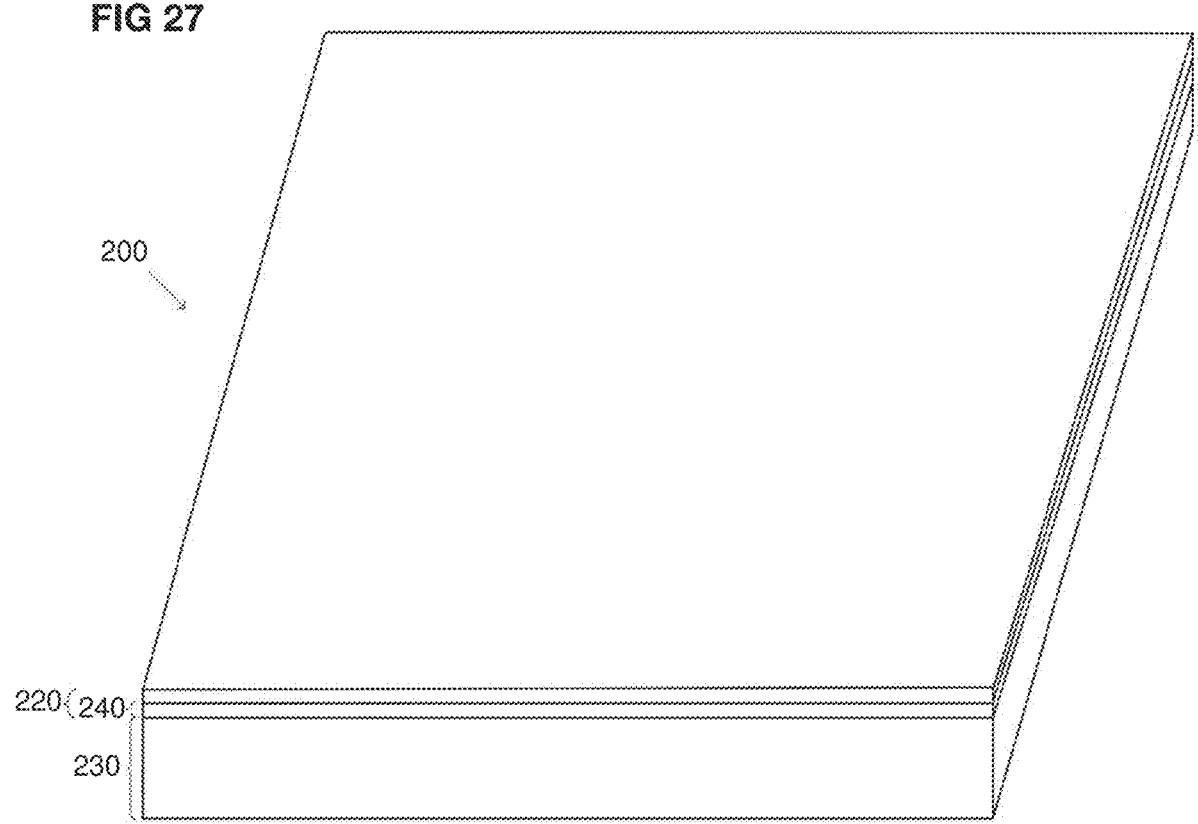
FIG. 27 is a perspective view of the tile shown in FIG. 26.
Figure 28:
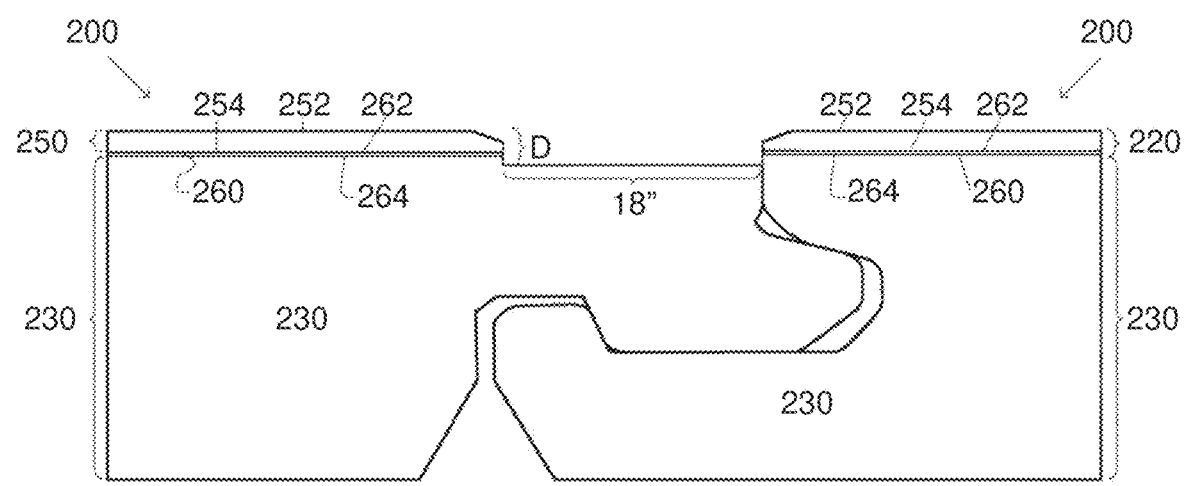
FIG. 28 is a transverse sectional view of yet another embodiment of two tiles according to the present invention comprising a top section and a core layer.

As yet another specific and non-limiting example, and with reference to FIGS. 26-28, the inventive tile 1 can include a core layer 230 formed of a stone plastic composite (SPC) material which, if used primarily to cover a floor surface, will be subject to heavier loads from foot traffic, the weight of furniture and the like. Therefore, the core layer 230 in such alternative and other embodiments intended for flooring applications may have a higher density, as will be described in more detail subsequently herein.

In general, the overall thickness of the tile 1 may range from about 4 millimeters to about 12 millimeters (which is from about 0.157 inches to about 0.472 inches), depending on the particular embodiment. In one or more embodiments of the tile 1, the overall thickness of the tile 1 from the top surface 10 of the top layer 20 to the bottom surface 34 of the core layer 30 will preferably be generally about 7 millimeters (about 0.275 inches), with the core layer 30 having a thickness in a range of generally between 4 millimeters to about 6 millimeters (about 0.016 inches to about 0.236 inches). In embodiments of the tile 1 wherein the top layer 20 includes a wear layer 50 and a polyvinyl chloride (PVC) layer 40, the top layer 20 may comprise a thickness of about 1.5 millimeters (about 0.059 inches) to about 2 millimeters (0.079 inches). For example, the wear layer 50 between its top surface 52 and lower surface 54 may be in a range of between generally about 0.3 millimeters (about 0.012 inches) to about 0.7 millimeters (about 0.028 inches). Also, the thickness of the polyvinyl chloride (PVC) layer 40 between its top surface 42 and lower surface 44 may be in a range of between generally about 1.0 millimeters (about 0.039 inches) to about 1.5 millimeters (about 0.059 inches), or even to about 2.0 millimeters (0.079 inches).

Figure 5:
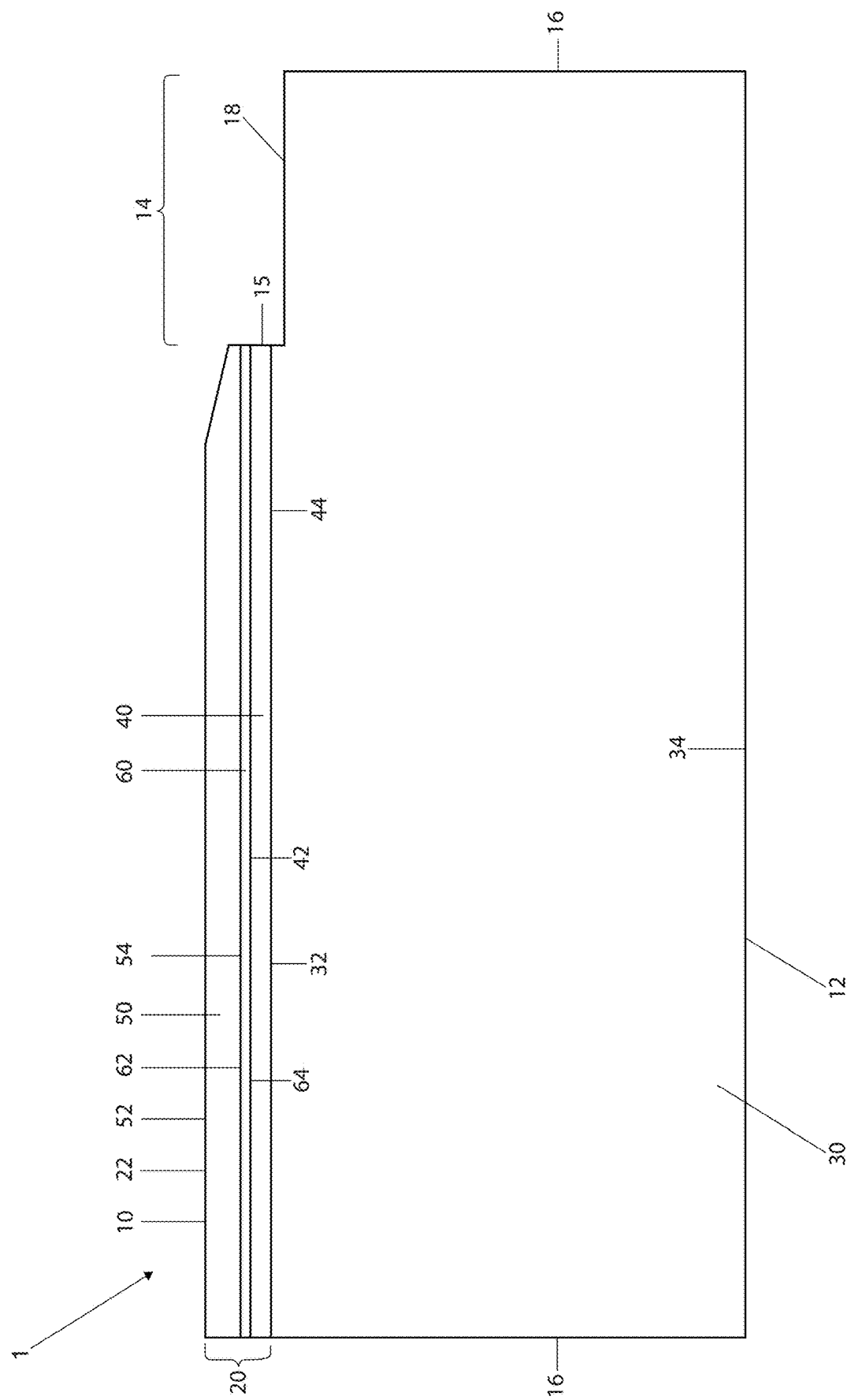
FIG. 5 is also a transverse sectional view of a tile in accordance with the present invention comprising a top layer and a core layer similar to FIG. 3, including the top layer having a polyvinyl chloride (PVC) layer, a decorative layer and a wear layer, but illustrating the exposed portion formed on the core layer.
Figure 6:
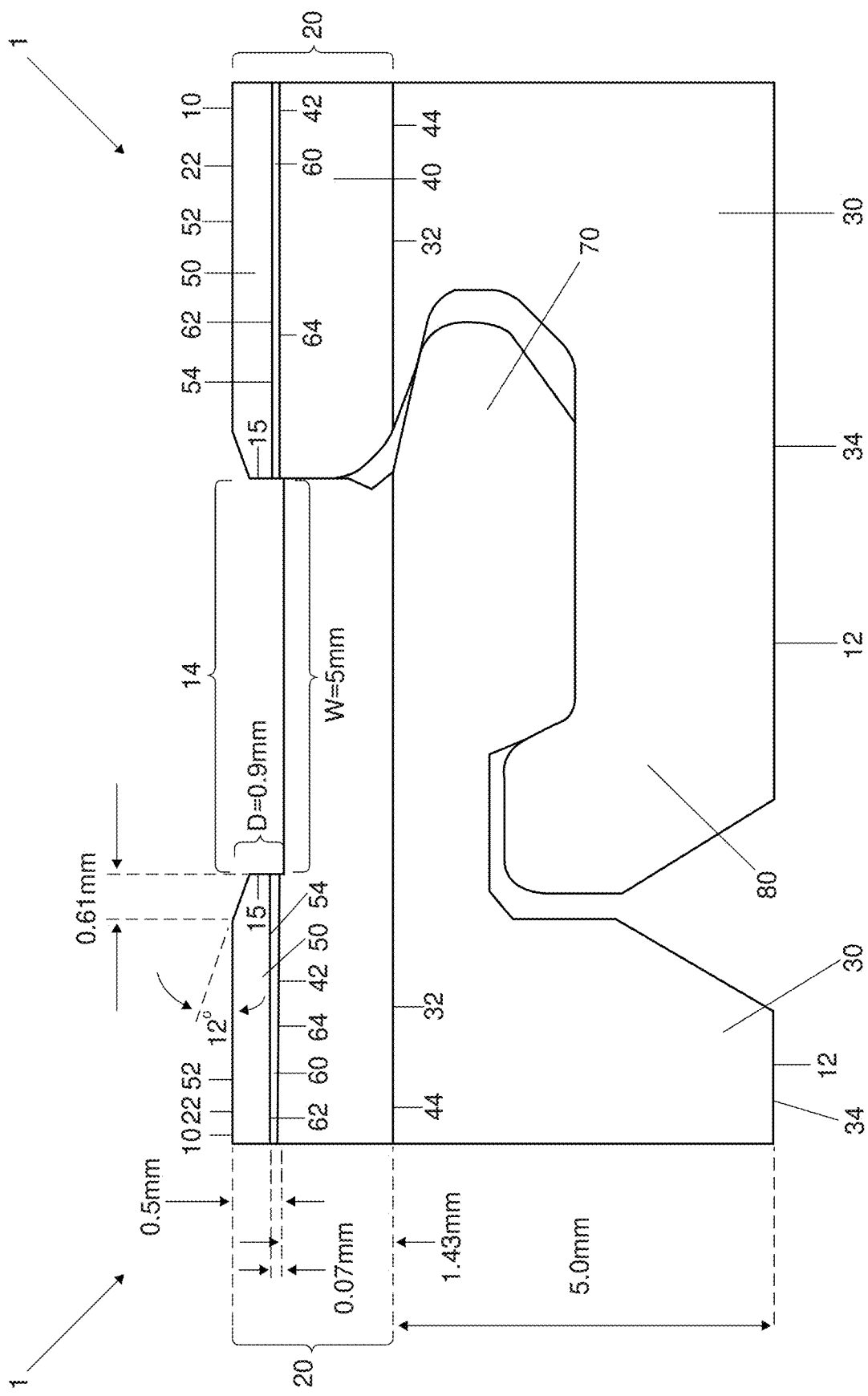
FIG. 6 is also a transverse sectional view of a tile according to the present invention, but illustrating a preferred embodiment of the top layer and exposed portion, as well as a core layer and an interconnecting mechanism.

In embodiments of the tile 1 including a decorative layer 60, such as shown in FIGS. 3, 5 through 7-B, and 9-11, the thickness of the decorative layer 60 between its top surface 62 and bottom surface 64 may be in a range of generally about 0.05 millimeters (about 0.002 inches) to about 0.1 millimeters (about 0.004 inches). As illustrated in FIG. 6, the core layer 30 may comprise a thickness of about 5 millimeters (about 0.197 inches), with the top layer 20 comprising a thickness of generally about 2 millimeters (about 0.079 inches), including a wear layer 50 having a thickness of about 0.5 millimeters (about 0.02 inches), a polyvinyl chloride (PVC) layer 40 having a thickness of about 1.43 millimeters (about 0.056 inches), and a decorative layer 60 having a thickness of about 0.07 millimeters (about 0.003 inches). As mentioned above, the thickness of the tile 1 may range from about 4 millimeters (about 0.016 inches) to about 12 millimeters (about 0.472 inches).

However, and in other embodiments, the inventive tile 1 may have a different overall thickness and still be within the intended spirit and scope of the present invention. Some non-limiting examples of such alternative embodiments will be described with reference to FIGS. 26 through 28.

Figure 7A:
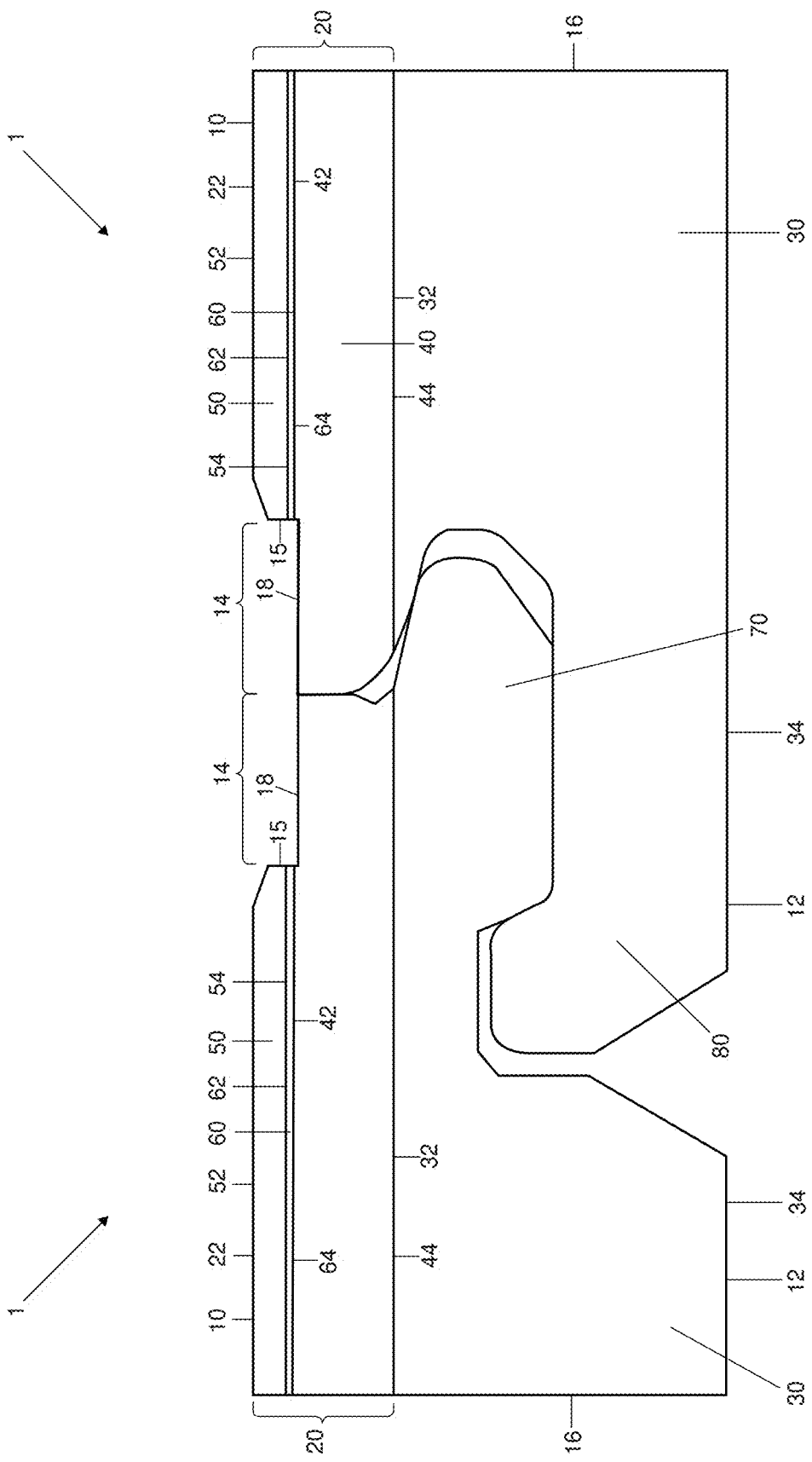
FIG. 7-A is also a transverse sectional view of a tile according to the present invention in another preferred embodiment comprising at least a top layer that includes a polyvinyl chloride (PVC) layer, and a core layer, and also an interconnecting mechanism, and illustrating an exposed portion having an imitation grout line formed in the PVC layer.

In one alternative embodiment, however, and as best shown in FIGS. 4-5, and 7-B, the inventive tile 1 may comprise a polyvinyl chloride layer 40 having a substantially reduced thickness between its top surface 42 and lower surface 44. For example, the thickness of the polyvinyl chloride (PVC) layer 40 may be approximately 0.3 millimeters (about 0.012 inches), which as described subsequently herein, may facilitate exposing at least a portion of the core layer 30 as the exposed portion 18 during the manufacturing process. In such embodiments, the overall thickness of the tile 1 will be generally about 5 millimeters (about 0.197 inches) to about 6.5 millimeters (about 0.256 inches), and preferably, approximately 5.9 millimeters (about 0.232 inches).

As noted above, the tile 1 of the present invention additionally comprises a plurality of sides, such as 16 or 16', and may also come in different shapes and in varying dimensions. For example, and as shown in the illustrative embodiments of FIGS. 8-11 and 15-A to 17-B, the tile 1 of the present invention may have a substantially rectangular shape with four sides 16 or 16'. The dimensions of such a tile 1 having a rectangular shape may be, by example only, twelve (12") inches by twenty-four (24") inches, but can readily be varied to other appealing dimensions, and may even assume a much longer length so as to be a wall plank or floor plank of, for example, twelve (12") inches by forty-eight (48") inches, which can be cut into individual panels. As another example, the tile 1 of the present invention might have a square shape. Moreover, the tile 1 of the present invention might also have six or eight sides 16 or 16' as is the case with tiles having hexagonal or octagonal shapes. Other shapes, including those comprising an uneven number of sides, are also possible depending on the overall desired visual effect.

The tile 1 of the present invention also includes along at least one of its sides, such as 16, an exposed portion 18. As illustrated in FIGS. 1-14, this exposed portion 18 extends outwardly below and away from the top surface 10 of the tile 1, and is defined in part by a sidewall 15 formed within at least said top layer 20. As will be described subsequently herein, the exposed portion 18 effectively defines a gap 14 in the plane of the top surface 10 of the tile 1 that, as perhaps best shown in FIGS. 8-14, preferably extends uniformly and either completely or substantially along the length of the side 16. In at least one embodiment, such as is illustrated in FIG. 6, this exposed portion 18 is configured to be located at a depth of generally about 0.9 millimeters (about 0.035 inches) from a top surface 10 of the tile, or in a range from about 0.9 millimeters (about 0.035 inches) up to about 2 millimeters (about 0.079 inches) from the top surface 10 of the tile 1. This exposed portion 18 also includes a textured surface structured to closely represent the look and feel of an actual grout line. As will also be described subsequently herein with reference to FIGS. 15-A through 17-B, when a plurality of the inventive tiles 1 are assembled and installed with their exposed portions 18 disposed in an operative orientation, they will collectively offer to a person standing close by or a few feet away (or more) a highly realistic appearance both in terms of the tile's similarity itself to a selected material such as real marble, stone, or ceramic, but importantly, also 1 in terms of the tiles 1 having the appearance of an actual grout line caused in large part by the depth of the exposed portion 18 and the width of the gap 14 relative to the top surface 10 of the tile 1, as well as the textured surface of the exposed portion 18. Moreover, the top layer 20 and/or core layer 30 may be manufactured to include a dye that may match or be representative a variety of grout colors so as to correspond with the intended coloring of the overall tile 1.

As is also shown in FIGS. 1-14, the exposed portion 18 of the tile 1, including the sidewall 15 associated therewith, can be seen to effectively define a gap 14. The width W of the exposed portion 18, and the gap 14 created thereby, will in the preferred embodiments be substantially uniform along a length of the side 14 of the tile, and may range from being nearly imperceptible, but still visible, to a width W of about 6 millimeters (about 0.236 inches), or more, depending on the desired look of the overall surface. The embodiment of FIG. 6, however, illustrates an exposed portion 18 having a width W of approximately 5 millimeters (about 0.197 inches). Additionally, the embodiment of FIG. 6 illustrates a sidewall 15 that extends into the polyvinyl chloride (PVC) layer 40 of the top layer 20, so that the exposed portion 18 is formed on or within the PVC layer 40 at a depth D of generally about 0.9 millimeters (about 0.035 inches) below the top surface 10 of the tile. However, the exposed portion 18 may be located at another depth, but preferably within a range of between generally about 0.9 millimeters (about 0.0354 inches) to about 2 millimeters (about 0.079 inches) from the top surface 10 of the tile 1. This range should 1 be considered an approximation as during the production of the tile(s) 1, variations, such as within 0.1 millimeters (about 0.004 inches), are likely, which may enhance the realistic appearance of the imitation grout line of the tile(s) 1.

The aforesaid exposed portion 18 having a textured surface structured to represent the look and feel of an actual grout line is ideally achieved during the manufacturing process for the inventive tile 1. More specifically, in the process of manufacturing the tile 1, a tool such as a press and/or router or another instrument, such a cutting blade(s), a profiling knife, etc. may be applied to the tile 1, such as to the top layer 20, along at least one side or edge 16. The press and/or router or other tool may be used to remove all or substantially all of the top layer 20 extending along a selected side 16 of the tile 1, so as to expose a portion of the polyvinyl chloride (PVC) layer 40 and define the exposed portion 18 in outwardly extending relation to a selected side, such as 16, of the tile 1. In the preferred embodiments, the density of the polyvinyl chloride (PVC) layer 40 should be between generally about 2,000 kg/m3 (which is about 124.856 lb/ft3) to about 2,400 kg/m3 (which is about 149.827 lb/ft3), in order to permit the tool, cutting blade(s), knife or other instrument to cut into and profile the polyvinyl chloride (PVC) layer 40 to form the sidewall 15 and exposed portion 18, and to create a texture surface thereon that ideally approximates that of fine sand. Additionally, this density range provides sufficient structural integrity to the polyvinyl chloride 1 (PVC) layer 40 so that it does not disintegrate, rupture, tear or otherwise incur damage during the cutting and profiling process. In an alternative embodiment, during the process of manufacturing the tile 1, the tool or instrument used may remove more of the top layer 20 extending along a selected side 16 of the tile, so as to expose a deeper profile into at least a portion of the core layer 30 as well.

Also, in the preferred embodiments of the tile 1 as shown in FIGS. 2-3, 6, 9, and 11-14, the exposed portion 18 is formed on the polyvinyl chloride (PVC) layer 40. As will become clear from the discussion below, during the manufacturing process, when a portion of the top surface 10 of the tile 1 is removed along one side, such as 16 thereof, preferably at a depth of between 0.9 millimeters (about 0.035 inches) to 2 millimeters (about 0.079 inches) below the plane of top surface 10, at least a portion of the polyvinyl chloride (PVC) layer 40 will be exposed and formed to define the exposed portion 18, including a sidewall 15 and a gap 14. Alternatively, and as has been described relative to FIGS. 4, 5 and 7-B, the thickness of the polyvinyl chloride (PVC) layer 40 may be substantially reduced so as to facilitate exposing at least a portion of the core layer 30 to define the exposed portion 18 and gap 14 thereon.

In another embodiment of the inventive tile 1, the top layer 20 may comprise yet a further additional layer for reasons which will now be described. More specifically, and in those embodiments wherein the top layer 20 includes a polyvinyl chloride 1 (PVC) layer 40 having a dye or colorant(s) and a decorative layer 60, an additional layer, which may be in the form of a coating, may be connected to and disposed between the polyvinyl chloride (PVC) layer 40 and the decorative layer 60. This additional layer may comprise a thin layer of raw polyvinyl chloride (PVC) material which is typically black in color, but in at least one other embodiment this additional layer may comprise a coating of material having a tonality that approximates a black color. The need in some embodiments for an additional layer arises because the decorative layer 60 is generally designed to be used with or against a dark background such that it can adequately reflect the desired tones of a selected color and/or overall designs appearing on the decorative layer 60. Therefore, some embodiments of the inventive tile 1 may comprise yet an additional layer of PVC or a black coating applied to the polyvinyl chloride (PVC) layer 40 to serve as a dark background for the decorative layer 60, which preferably has a tonality that approximates a black color or other dark background colors such as, but not limited to dark brown or dark grey. Also, the need for some embodiments of the tile 1 to include this additional layer or coating arises because during the formation of the polyvinyl chloride layer 40, when the raw polyvinyl chloride (PVC) is mixed with a dye or colorant(s), higher concentrations of the dye or colorant may accumulate towards the bottom and top surfaces of the PVC layer 40.

Accordingly, to help ensure that the color of the imitation grout line 1 being formed on the tile 1 on or as part of the polyvinyl chloride (PVC) layer 40 is substantially uniform, in the preferred embodiments no more than approximately 0.4 millimeters (about 0.016 inches) of material should be removed from the polyvinyl chloride (PVC) layer 40 itself, so as to create the exposed surface 18 at a desirable depth within the PVC layer where the dye or colorant(s) tend to accumulate. In at least one preferred embodiment, the depth of the material removed to create the exposed surface 18 in the PVC layer 40 will be less and generally only about 0.33 millimeters (about 0.013 inches) of material should be removed. In other words, because the dye or colorant(s) tend to accumulate at the upper and lower surfaces of the PVC layer 40, an optimal depth in some embodiments at which the exposed portion 18 will be disposed or located will be generally between approximately 0.33 millimeters (about 0.013 inches) to approximately 0.4 millimeters (about 0.016 inches) below the top or fifth surface 52 of the polyvinyl chloride (PVC) layer 40. This ensures that the exposed portion(s) 18 is formed on sections of the polyvinyl chloride (PVC) layer 40 that comprise an adequate or otherwise sufficient amount of dye or colorant.

With reference now to FIGS. 6, 7-A and 7-B, the inventive tile 1 may additionally comprise an interconnecting mechanism formed on the sides 16 or 16' of the tile 1. For example, the interconnecting mechanism of the present invention may comprise a "tongue" side 70 formed on or along one side 16 of the tile 1, and a "groove" side 80 formed on or along a different side 16' of a different tile 1. The "tongue" side 70 and the "groove" side 80 are configured so as to be joined together in mating engagement and facilitate both the installation and alignment of the tiles 1 during installation. Additionally, either the "tongue" side 70 and/or the "groove" side 80 may be formed on the tile 1 primarily as part of the core layer 30 as shown in FIGS. 6-7-B. The "tongue" side 70 and the "groove" side 80 may also be structured so as to permit slight movement and/or rotation between two adjacent tiles, which permits adjustment of one tile relative to another to accommodate uneven substrates, or a slab of concrete that is not perfectly level, as is often the case with unfinished floors and/or walls. As such, either the "tongue" side 70 or the "groove" side 80 may be formed at least partially within the top layer 20 as shown in FIGS. 6-7-A.

With reference now to FIG. 6, in a preferred embodiment the inventive tile 1 will have an exposed portion 18 formed on a side 16 thereof which corresponds to the "tongue" side 70 only, and not to the "groove" side 80. In the embodiment of FIG. 6, the gap 14 defined by exposed portion 18 and sidewall 15 is also partially defined by the top layer 20 and edge 16' of an adjacent tile 1 which includes the "groove" side 80. Alternatively, as is shown in the embodiments of FIGS. 7-A and 7-B, the "tongue" side 70 and the "groove" side 80 of the tile 1 may each be configured to include an exposed portion 18 having the textured surface that imitates the grout line. Other embodiments are also within the scope of the present invention wherein the exposed portion 18 may be formed on a tile 1 with a "groove" side 80, and not on the "tongue" side 70. Moreover, the tile 1 of the present invention may be cooperatively configured with different mechanical joining systems made by a variety of manufacturers. These mechanical joining systems may include a relatively new "click-lock" type of mechanical joining system used during installation of a variety of surfaces such as imitation flooring tiles.

With reference now FIGS. 18-24, in certain embodiments the inventive tile 1 can also be structured to facilitate installation, particularly on a vertical wall surface, but also on other surfaces including if desired, a ceiling.

Figure 18:
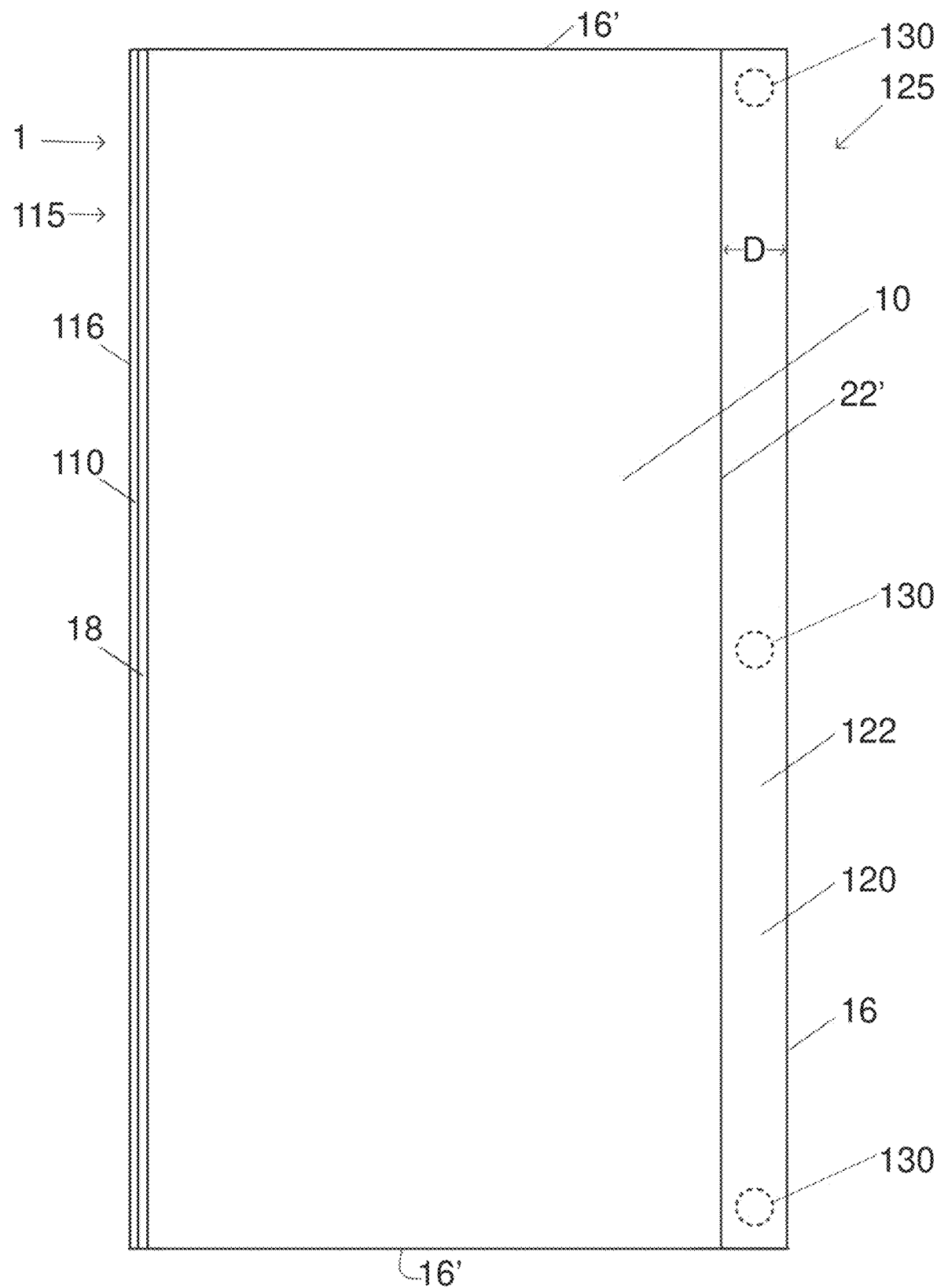
FIG. 18 is a plan view of another embodiment of a tile according to the present invention, comprising an elongated interconnecting mechanism and an exposed portion structured to imitate a grout line.

For example, and with initial reference to FIG. 18, the inventive tile 1 in such embodiments may be provided with an elongated interconnecting mechanism 125 on or along at least one side thereof 16. The elongated interconnecting mechanism 125 is structured and disposed to receive a portion of one connector there-through such as at 130, or a plurality of connectors, to attach the tile 1 to an underlying surface, such as an unfinished drywall surface, and ideally in a manner that conceals the connector in the finished installation. Additionally, and with reference to FIGS. 19 and 20, in embodiments of the tile 1 having the elongated interconnecting mechanism 125, the tile 1 will preferably also include, but does not have to include, a mating interconnecting mechanism 115 formed on or along an oppositely disposed side 116 thereof, for reasons which will become clear from the description subsequently herein, below.

Additionally, the inventive tile 1 having an elongated interconnecting mechanism 125 will, in most embodiments but not necessarily in all embodiments, include an exposed portion 18 structured to imitate the look and feel of a real grout line. As has been described previously herein, the exposed portion 18 which provides a realistic looking grout line may be formed along at least one side of the tile 1, such as at 116, as shown in FIGS. 18 and 21. In such embodiments, the exposed portion 18 may be formed in a top section of the tile 1, such as a polyvinyl chloride (PVC) layer 40 in the manner described previously herein. Alternatively, and with reference to the embodiments of FIGS. 19 and 20, the inventive tile 1 having an elongated interconnecting mechanism 125 may also be provided without an exposed portion(s) 18.

In other embodiments, the inventive tile 1 having an elongated interconnecting mechanism 125 may also comprise one or more sub-layers that serve as an underlayment or sublayer such as for sound attenuation. Such sublayer(s), may be made from materials suitable for this purpose, including but not limited to cork, laminate foil, a thin layer of foam, or ethyl vinyl acetate (EVA), and may be connected to or otherwise adhesively joined to a bottom surface of the core layer 30 of the tile 1.

Figure 19:
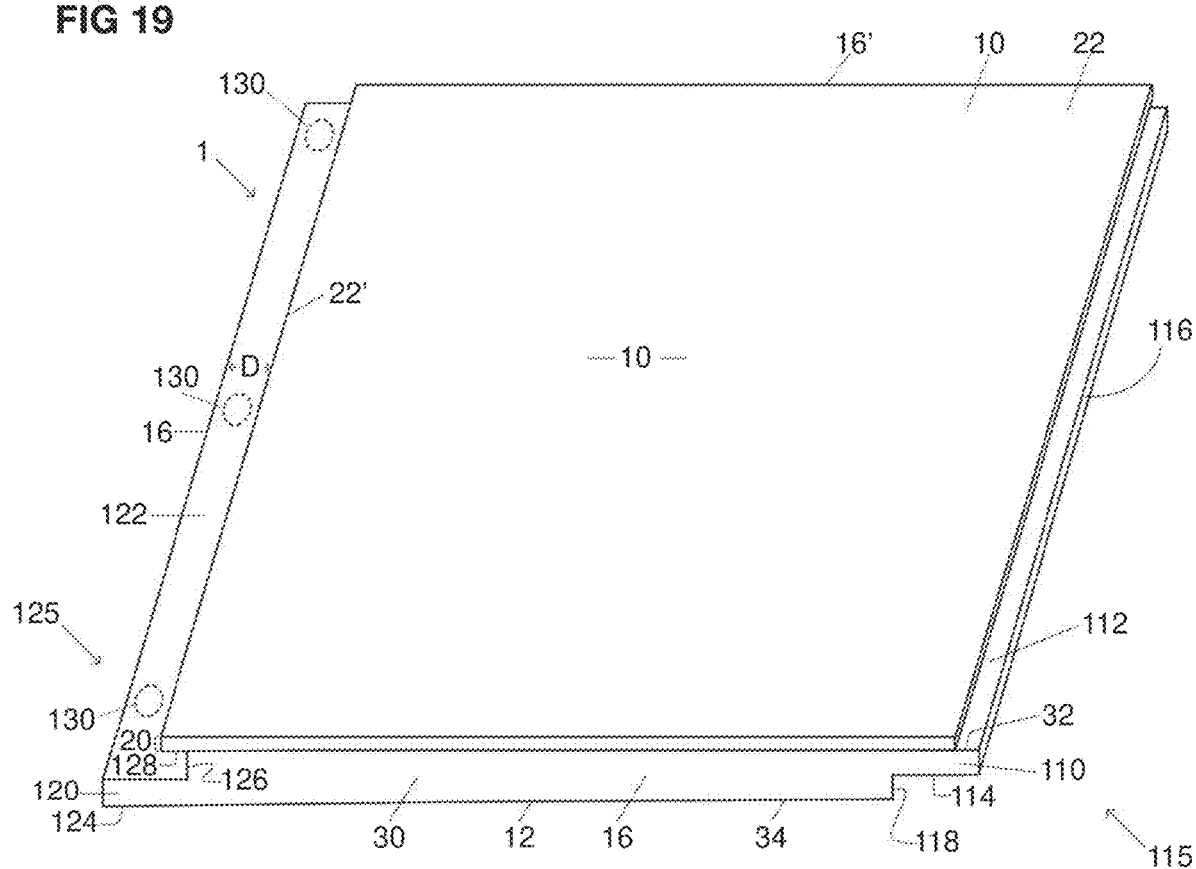
FIG. 19 is a perspective view of another embodiment of a tile according to the present invention comprising a top section and a core layer and having an elongated interconnecting mechanism formed along one side thereof, and a mating interconnecting mechanism formed along an oppositely disposed side thereof.
Figure 20:
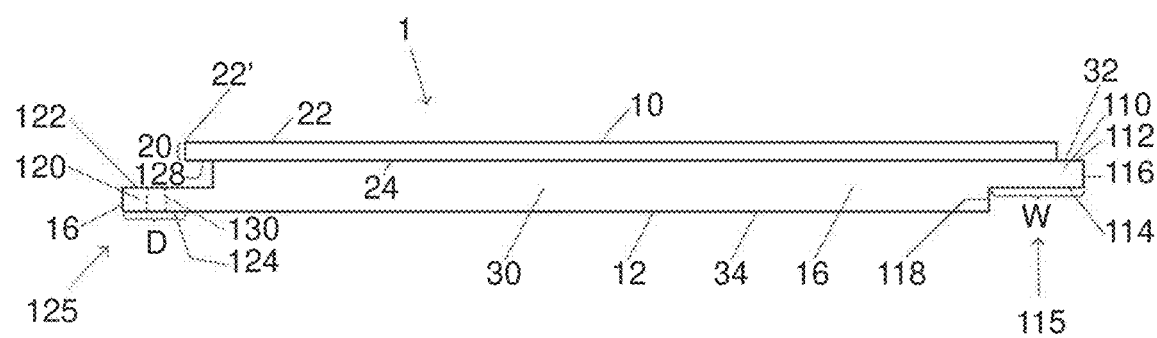
FIG. 20 is a transverse sectional view of the embodiment of a tile shown in FIG. 19.
Figure 21:
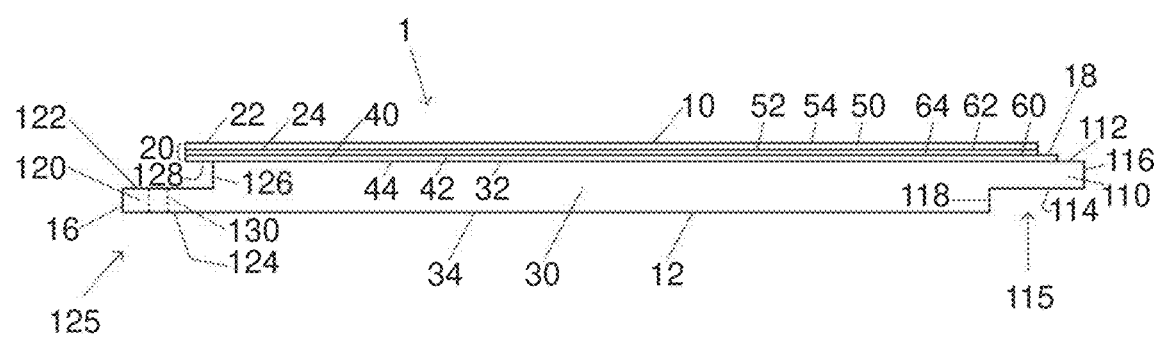
FIG. 21 is a transverse sectional view of another embodiment of a tile according to the present invention comprising a top section and a core layer, with interconnecting mechanism formed along opposite sides thereof, and including an exposed portion structured to imitate a grout line.

Referring now to FIGS. 19 and 20, in one embodiment the inventive tile 1 includes an elongated interconnecting mechanism 125 that comprises a lower extended segment 120 formed on at least part of one side 16 of the tile 1. Preferably, however, the elongated interconnecting mechanism is formed along substantially all, and ideally along all of the side 16 of the tile 1, and further, so as to have a substantially uniform configuration. As shown in FIGS. 19 and 20, the lower extended segment 120 extends outwardly and beyond an upper edge 22' associated with the top surface 10 of the tile 1. As perhaps best illustrated in FIG. 20, the lower extended segment 120 itself may comprise a top portion 122 and a bottom portion 124 and, while the particular configuration of the lower extended segment 120 may vary, it will preferably extend outwardly from and coplanar with the top surface of the tile 1 at a distance D of generally about 11 millimeters (about 0.433 inches). While this distance D can also vary, it will preferably be in a range of between about 8 millimeters (about 0.315 inches) to generally 13 millimeters (about 0.512 inches). Also, this distance D, which may be considered the width dimension of the lower extended segment 120, is sized, dimensioned and configured to provide sufficient space or physical room for receiving a one or more connectors, disposed in an operative position on or along the length of side 16 of the tile 1, used during installation to secure the tile 1 to an underlying surface or substrate, such as a wall or a ceiling.

Additionally, in the illustrated embodiment of FIGS. 19 and 20, the lower extended segment 120 is formed on or from the core layer 30 of the tile 1. For example, during manufacture of the tile 1, the lower extended segment 120 may be formed by removing sufficient material from the layer(s) of the tile 1 above the core layer 30, such as the top section 20 of the tile 1, which as described previously herein may have one or more layers, to reveal the top portion 122 of the lower extended segment 120 and to define the lower extended segment 120 at a desirable distance below the upper edge 22' associated with the top surface of the tile 1. As an alternative, one or more layer(s) of the tile's 1 top section 20 may be disposed in an offset relation to the core layer 30, to define the lower extended segment 120, as illustrated in FIG. 21. It should be appreciated that in other embodiments, however, the lower extended segment 120 could alternatively be formed on a polyvinyl chloride (PVC) 40 layer of the tile 1 associated with the top section 20, rather than being formed on the core layer 30.

As also shown in the illustrated embodiment of FIGS. 19 and 20, the lower extended segment 120 may comprise a lateral portion 126, in addition to a top portion 122 and a bottom portion 124. As such, an overlapping portion 128 is also formed on the tile 1 in this illustrated embodiment, and defines a lip extending along the side 16 of the tile 1 that serves to partially define the lower extended segment 120 as a channel that also extends along the side 16 of the tile 1. As will become clear from the description subsequently herein, this embodiment having the lower extended segment 120 comprised of a channel facilitates installation of the tile 1 and further, operates to reduce or eliminate shifting or displacement of the tile 1, following installation of the tile 1 on a vertical surface such as a wall in particular. In the illustrated embodiment of FIGS. 19 and 20, as well as in FIG. 21, the overlapping portion 128 is formed by or within the top section 20 of the tile, and as also shown, is disposed in an offset relation relative to the core layer 30 of the tile 1, from which the bottom portion 124 and lateral portion 126 of the lower extending segment 120 are formed. Also in the illustrated embodiment of FIGS. 19 and 20, the width of the overlapping portion 128 will preferably be about 3 millimeters (about 0.118 inches), but in other embodiments could be quite small at about 1 millimeter (about 0.039 inches) or alternatively, larger to a width of about 5 millimeter (about 0.197 inches). In addition, the height of the lateral portion 126 may be in a range from anywhere of about 1.5 millimeters (0.059 inches) to about 2.0 millimeters (0.079 inches). It should be appreciated that these dimensions are approximated for the illustrated embodiment, and can be varied while still yielding a tile that is within the spirit and scope of the invention.

As also shown in FIGS. 18 and 19, the intended location of a connector on the elongated interconnecting mechanism 125 is indicated in phantom lines at 130. In this embodiment, three connector locations 130 are illustrated on the lower extended segment 120 of the tile 1 although it should be appreciated that the number of connectors can be more depending on the length of the particular tile 1, or in some cases, less. The type of connector received on the lower extended segment 120 of the tile 1 can also vary, and may include flat-head screws, bolts, "Tapcon" concrete screws, or other types of screws, fasteners, and the like. One of these connectors may be drilled, screwed, or otherwise driven directly into one of the intended locations 130 on the lower extended segment 120 of the tile 1, and into the underlying substrate. By way of example, in drywall applications, installation of the tile 1 will typically involve at least two connectors, such as two flat-head screws, to secure the tile 1, which will preferably occur at the location of a support stud for the drywall or closely adjacent thereto. An additional connector may be installed on the tile 1 and fastened to the drywall that is not at an approximate location of a drywall stud. It is worth pointing out that if such flat-head screws are used to secure the tile 1 to a drywall surface, they will ideally be driven through the lower extended segment 120 and into the underlying surface behind the tile 1, so that the flat-head portion thereof is substantially aligned or flush with the top portion 122 of the lower extended segment 120. For various reasons, it is preferable that the head of the connector be in such substantial alignment, including so as to only minimally interfere with, if at all, the movement of the upper extended segment 110 into sliding engagement with the lower extended segment 120.

Additionally, and as previously mentioned herein, the inventive tile 1 may have a core layer 30 formed to have an optimal density in a lower range than other embodiments disclosed herein. As an example, when the inventive tile 1 is used as wall panel, the core layer 30 may have a density in a range from about 500 kg/m3 (about 31.214 lb/ft3) to about 900 kg/m3 (about 56.185 lb/ft3). By providing the inventive tile 1 with a core layer 30 having a lower density, it results in a rigid, yet lighter, softer and somewhat more flexible tile 1, compared to other embodiments disclosed herein having higher density ranges for the core layer 30. This is advantageous, particularly for use on wall surfaces, because a lighter tile 1 is less likely to cause bowing of or to otherwise distort the underlying surface. Additionally, when the inventive tile 1 is being applied to a wall, there should be no load from foot traffic, furniture, etc., and consequently a higher density and level if rigidity associated therewith is not strictly needed. Moreover, when the inventive tile 1 comprises an elongated interconnecting mechanism for use with a connector, the lower density of the core layer 30 more readily receives the connector(s) without incurring damage. Conversely, a tile 1 with a higher density of the core layer 30 is likely to be more susceptible to damage when a connector is installed through the core layer 30.

In one alternative embodiment of the present invention, a tile(s) 1 may be provided with pre-drilled holes at the intended locations 130 of the connector(s). The predrilled holed may even be, if desired, dimensioned to correspond to the size of the connector(s).

Still referring to FIGS. 19 and 20, and as noted previously herein, the tile 1 including an elongated interconnecting mechanism 125 along one side 16, will preferably also include a mating interconnecting mechanism 115 formed on and ideally along an oppositely disposed side 116 thereof, or also an adjacent side, which will also have a substantially uniform configuration. In the illustrated embodiment of FIGS. 19 and 20, the mating interconnecting mechanism 115 comprises an upper extended segment 110 having a top portion 112 and a bottom portion 114. However, the bottom portion 114 is illustrated as having a width dimension W that is larger or wider than that of the top portion 112. As a non-limiting example, the bottom portion 114 of the upper extended segment 110 may have a width dimension W that is generally about 13 millimeters, although this could be anywhere in a range from about 10 millimeters to about 15 millimeters. In contrast, the top portion 112 may comprise a much smaller width dimension of about 3 millimeters (about 0.118 inches), although this could be anywhere in a range from about only 1 millimeter (about 0.039 inches) to about 5 millimeters (about 0.197 inches). It should again be appreciated that these dimensions are approximated for the illustrated embodiment, and can be varied while still yielding a tile that is within the spirit and scope of the invention.

Figure 22:
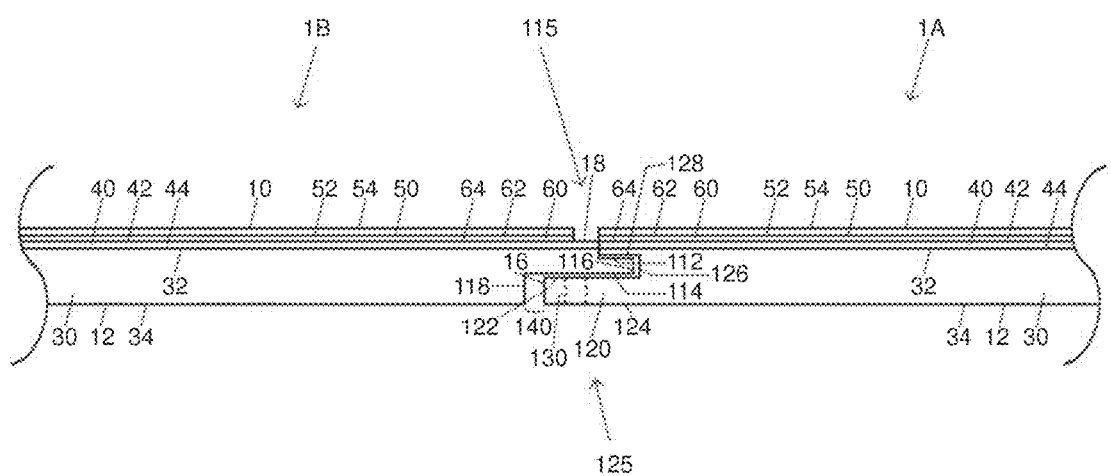
FIG. 22 is a transverse sectional view of a portion of two different tiles, each similar to that shown in FIG. 21, but illustrating the tiles matingly connected to each other.

With reference now to FIG. 22, a pair of tiles 1A and 1B are illustrated in an embodiment according to the present invention, and shown in an assembled state, with the edges 16 and 116 of the tiles matingly joined together. More specifically, the elongated interconnecting mechanism 125 on a first tile 1A is illustrated as being joined to the mating interconnecting mechanism 115 on a second tile 1B. As represented in FIG. 22, when these two tiles 1A and 1B are connected, the lower extended segment 120 faces and/or abuttingly engages with the upper extended segment 110. Additionally, a distal section of the upper extended segment 110 of the tile 1B is matingly received within the channel defined by the overlapping portion 128 and the lower extended segment 120 on the adjacent tile 1A. As stated previously herein, this mating interconnection is operative to reduce or eliminate shifting or displacement of the tile 1B during and after installation.

Still referring to FIG. 22, the illustrated embodiment of tile 1B is shown to include a mating interconnecting mechanism 115 that is structured and disposed to be slidably inserted into the elongated interconnecting mechanism 125 of tile 1A. More specifically, the upper extended segment 110 of mating interconnecting mechanism 115 is formed to be slidably moved on the lower extended segment 120 of tile 1A into a position, as shown, with its distal end inserted into the channel defined by the overlapping portion 128, top portion 122 and lateral portion 126 thereof. Accordingly, the bottom portion 114 of the upper extended segment 110 is structured so as to be capable of sliding with respect to the top portion 122 of the lower extended segment 120, such that, and as represented in FIG. 22, when the two tiles 1A and 1B are connected, the top portion 122 of the lower extended segment 120 of tile 1A faces and abutingly engages the bottom portion 114 of the upper extended segment 110 of tile 1B. In the illustrated embodiment, and as shown in FIG. 20, this is accomplished by the upper extended segment 110 having a width dimension W that is slightly larger than the dimension D of the lower extended segment 120.

Consequently, and in the illustrated embodiment shown in FIG. 22, a recess, indicated as 140, may be formed in the space between the edges 16 and 116 of the joined tiles 1B and 1A. More specifically, the recess 140 may comprise a small gap formed between the proximal end 118 of the upper extended segment 120 on tile 1B, and the outer lower edge 16' of the adjacent tile 1A corresponding to the lower extended segment 120. The recess 140 facilitates installation of tile 1B relative to tile 1A and also allows for dimensional adjustments between them after installation. That is, even after the upper extended segment 110 of tile 1B has been inserted into the elongated interconnecting mechanism 125 of tile 1A, the recess 140 allows for some micro dimensional adjustments during installation, such as by allowing the upper extended segment 110 to slide slightly relative to the lower extended segment 120. It is pointed out, however, that while a recess 140 has been described and illustrated herein for achieving the slidable insertion of one tile, such as 1B having a mating interconnecting mechanism 115 into another tile, such as 1A having an elongated interconnecting mechanism 125, it would also be within the spirit and scope of the present invention to utilize other structures for achieving this purpose, or even to reverse the configuration of the structures described herein.

Figure 23:
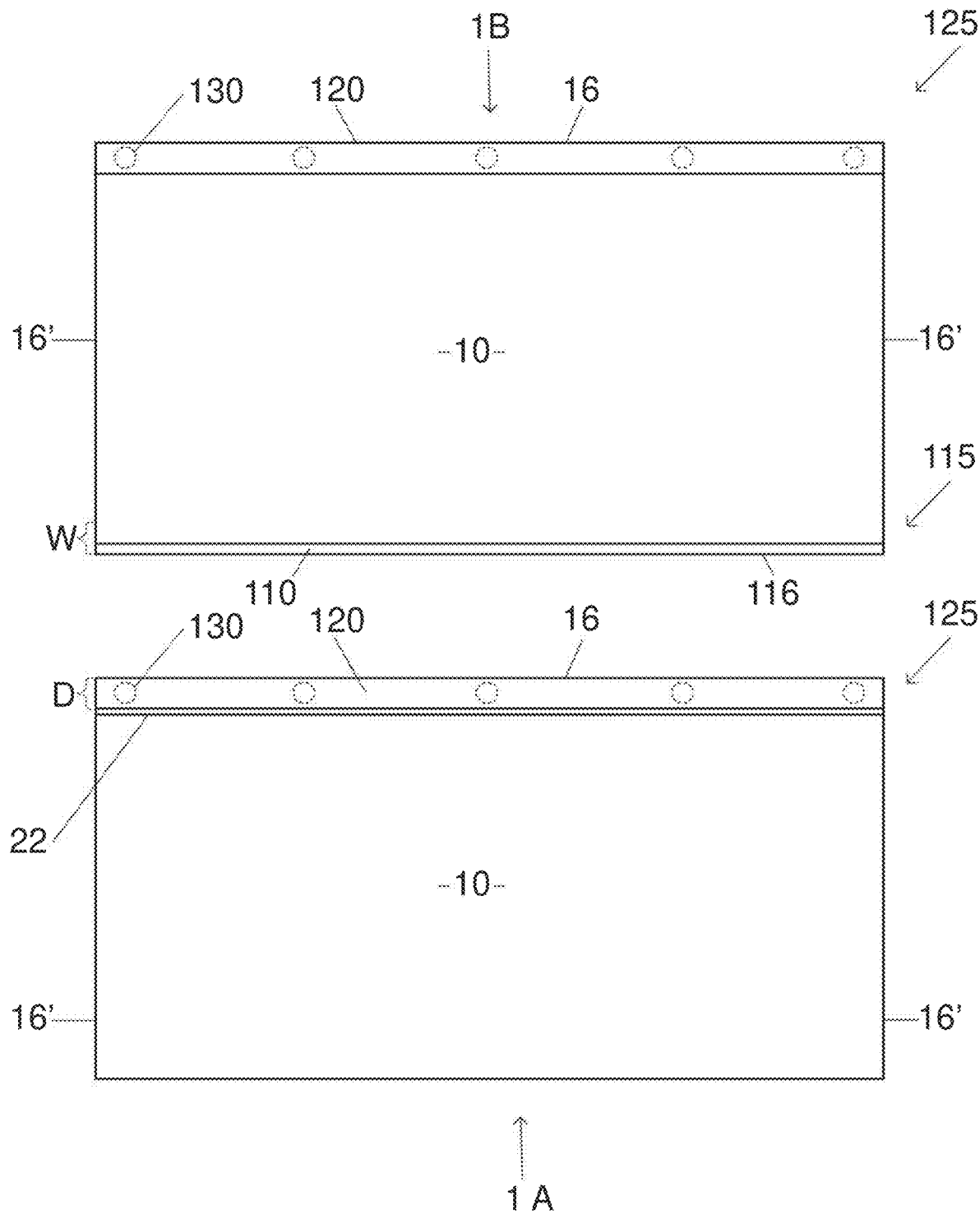
FIG. 23 is a front view of two tiles, each similar to that shown in FIG. 21, illustrating a positioning of one tile relative to another in preparation for installation on surface.
Figure 24:
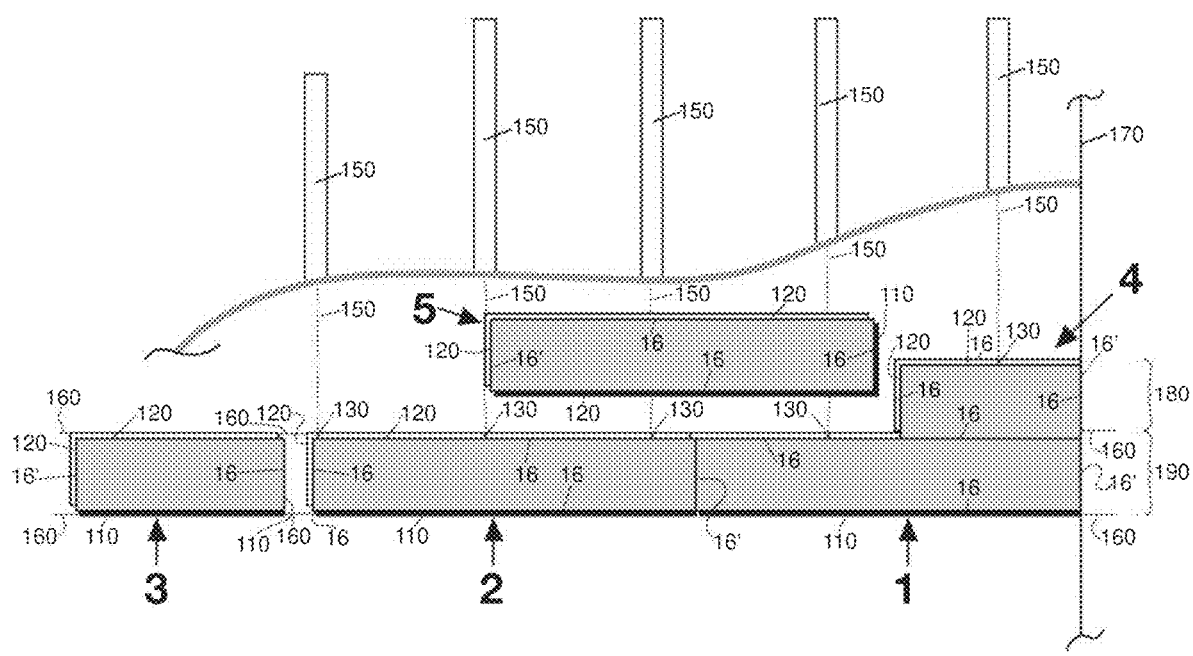
FIG. 24 is a plan view of a plurality of tiles formed in accordance with one or more embodiments of the present invention, and illustrating the positioning and installation thereof on drywall surface, which itself is represented in a cutaway view.

As briefly described above, the illustrated embodiment in FIG. 22 which depicts two tiles 1A and 1B, each having a mating interconnecting mechanism 115 and an elongated interconnecting mechanism 125, allows for an easy and efficient installation of a plurality of such tiles onto a surface such as a wall, as is generally reflected in FIGS. 23 and 24. More specifically, a tile such as 1A may be positioned first on a wall surface in a desired location with the elongated interconnecting mechanism 125 exposed. To assist with ascertaining a desired location for the tile 1A, guide lines may be pre-marked on the wall or other surface to indicate the intended location(s) where the tiles 1A, 1B, and/or the sides 16' thereof should be aligned, as shown at 160 in FIG. 24. Once a desired location is determined, the first tile 1A may be positioned on the wall surface and oriented with the elongated interconnecting mechanism 125 disposed in an upwardly facing orientation, as shown in FIG. 23. The lateral side(s) 16' of the tile 1A may be substantially aligned with a structure on the wall surface, whether a corner, a door, a window, etc., such as shown at an initial position 170 in FIG. 24. One or more connectors can then be drilled into the exposed lower extended segment 120 at locations such as 130, shown in at least FIGS. 18-19 and 23-24, to attach the tile 1A to the wall surface. The connector(s) are ideally driven far enough through the lower extended segment 120 and into the wall surface so that the head portion of the connector is in close alignment with the lower extended segment 120, and the top portion 122 thereof in particular.

Thereafter, a second tile, such as 1B may then be relatively easily assembled into place adjacent the first tile 1A, with the mating interconnecting mechanism 115 generally aligned with the elongated interconnecting mechanism 125, and then slidably moved into mating engagement in the direction of arrow Y shown in FIG. 23. As has been described previously herein, the mating engagement between tiles 1A and 1B may be defined by the upper extended segment 110 on tile 1B being slidably moved on the lower extended segment 120 of tile 1A and into position with its distal end inserted into the channel defined by the overlapping portion 128, top portion 122 and lateral portion 126 thereof, as shown in FIG. 22. In the preferred embodiments, once tile 1B has been positioned to be matingly joined with tile 1A, the elongated interconnecting mechanism 125 associated with tile 1B on an opposite edge thereof, will be now be exposed, also ideally in an upwardly facing orientation, as best shown in FIG. 23. Consequently, one or more connectors can then be drilled into the exposed lower extended segment 120 of tile 1B, as described, followed by the introduction of a third tile having the mating interconnecting mechanism 115 formed thereon for being matingly joined with the elongated interconnecting mechanism 125 of tile 1B. This process may be repeated as many times as needed to complete an installation of the tiles 1 on a surface.

Additionally, once a plurality of tiles such as 1A and 1B in FIG. 23 have been assembled and installed, the upper extended segment 110 of a tile 1B serves to conceal the one or more connectors, as well as the lower extended segment 120 through which they pass, to attach the tile to the wall or other surface.

As an alternative, one or more tiles 1 according to the present invention may be glued directly onto the underlying surface, whether a wall, floor, ceiling, etc.

With reference now to FIG. 21, the illustrated embodiment of the tile 1 additionally includes an exposed portion 18 that closely imitates the look and feel of a real grout line. As shown, the exposed portion 18 is formed on a side 116 of the tile 1 corresponding to the mating interconnecting mechanism, and upper extended segment 110 so that the imitation but realistic looking grout line will still be visible in the final installation.

With reference now to FIG. 24, a plurality of the inventive tiles 1 described herein are shown, each as having a substantially rectangular configuration, and in an offset pattern or "staggered" relationship to one another. For example, in FIG. 24, three tiles, marked as 1, 2, and 5, each comprise a substantially equivalent length, whereas tiles marked as 3 and 4 may comprise a different, reduced length and/or may be cut or otherwise modified during the installation process. One or more connectors may be installed at intended locations 130 on the lower extended segment of the tile 1, some of which should be in alignment with the location 150' of a supporting drywall stud 150, with the approximate locations 150' of the supporting drywall studs 150 being represented with broken lines. Once the first tile 1 is secured in an initial position, such as 170 in FIG. 24, a second tile 2 may be inserted or slid into a side 16' of the first tile 1. Subsequently, further connectors may be installed on the tile 2 at intended locations 130 on the lower extended segment thereof 120 to secure it to the drywall. Thereafter, another tile 4 may be positioned on top of tile 1 and its upper extended segment 110 slidably inserted into the lower extended segment of tile 1, to begin creating a second row 180 of tiles. As also shown in FIG. 24, a tile 4 may be inserted into tile 1, and tile 5 may be inserted into a portion of tile 1 and into a portion of tile 2 to create a substantially offset pattern. Additional rows of tiles 1 may be installed above to substantially cover the intended surface. Installation does not necessarily have be done from right to left, as it may also be done from left to right.

The production process for the inventive tile 1 can vary, but generally comprises different production sequences. For example, the core layer 30 may be produced by mixing together the raw materials, such as a PVC material, calcium powder and foaming agent, and any accessory materials, and applying heat to melt the mixture. The melted materials may be then placed into an extrusion machine that molds the melted material into boards. At this stage, foaming material may be added to facilitate production and thereafter, a resting or curing stage for roughly 24 to 36 hours. The production process for the top layer 20 also comprises mixing together the raw materials, such as a PVC material, calcium powder, oil and a foaming agent, and any accessory materials, and applying heat to the mixture to melt it. Then the melted materials may be pressed over one or more pressing stages to form vinyl pieces, which at this point, are likely to include a textured surface. Thereafter, the vinyl pieces, which essentially form the top layer 20, may be pressed with a decorative layer 60, such as a thin film sheet of polyvinyl chloride (PVC). A UV coating may later be added to the top surface 10.

After production of the top layer 20 and the core layer 30, individual sheets of both may be adhesively joined or glued together to form the desired tile(s) 1 as shown for example, in FIGS. 8-11. After application of the glue or other adhesive(s), the assembled layers are pressed, for example, by a cold pressure machine in a thermostatic chamber for about 6 hours to about 8 hours. After pressing, the assembled layers may be left in the thermostatic chamber for about 36 hours to about 48 hours to rest or cure. Thereafter, the assembled layers or master-boards may be cut into smaller sizes. The master-boards generally have a dimension of about 2 meters to about 3 meters, but may have different dimensions. After the assembled layers or master-boards are cut into smaller sizes, each individual piece may be passed through a machine that gives one or more sides 16 or 16' of a tile an individual profile. This profile may include forming modifying, roughening or otherwise cutting the sides 16 or 16' of the assembled tiles 1. At this stage, either or both of the exposed surface 18, having the imitation grout line, or the interconnecting mechanism may be formed. Thereafter, the tile(s) 1 may be packaged for shipment.

As previously mentioned, the tile 1 of the present invention can be configured to imitate the feel or texture of a real material such as real stone, marble, ceramic, wood, or another material. Accordingly, during the pressing stage a customized texture may be given to the wear layer 50 of the tiles 1. A computer may be used to configure a press according to a decorative design, such as a visual design of the decorative layer 60, so that the press gives the wear layer 50 a corresponding texture. More specifically, a picture of the intended decorative design may be inputted into a computer so as to program the press accordingly.

Figure 15B:
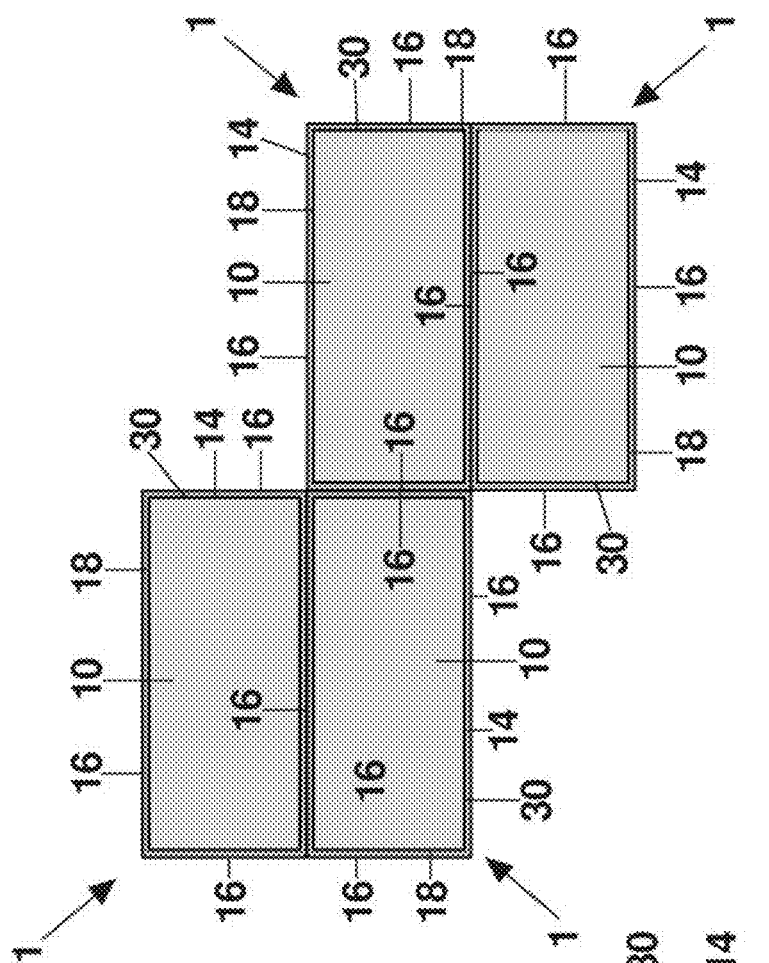
FIG. 15-A is a plan view of one preferred embodiment according to the present invention showing a tile comprising an exposed surface with an imitation grout line formed on all of its sides.
Figure 15A:
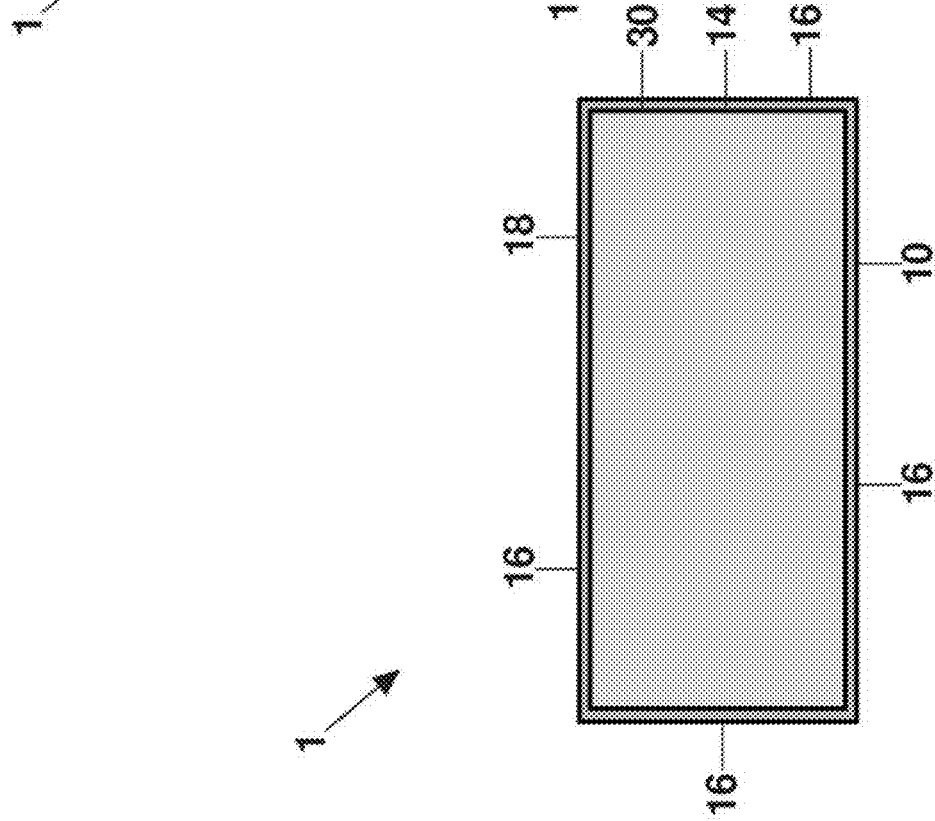
Figure 17B:
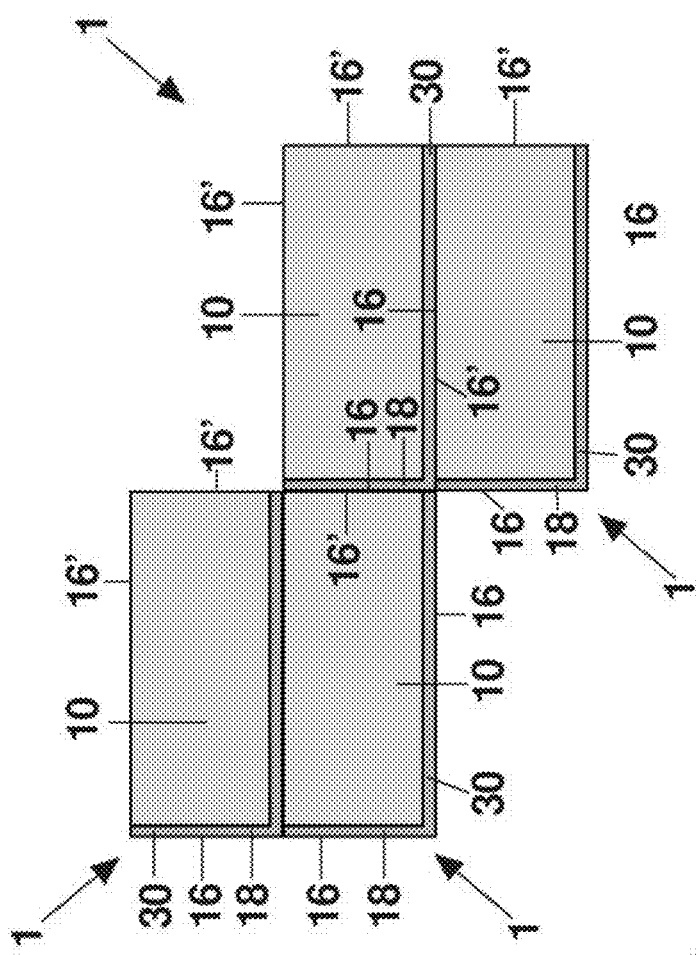
FIG. 17-A is a plan view of another preferred embodiment according to the present invention showing a tile comprising an imitation grout line formed on two adjacent sides.
Figure 17A:
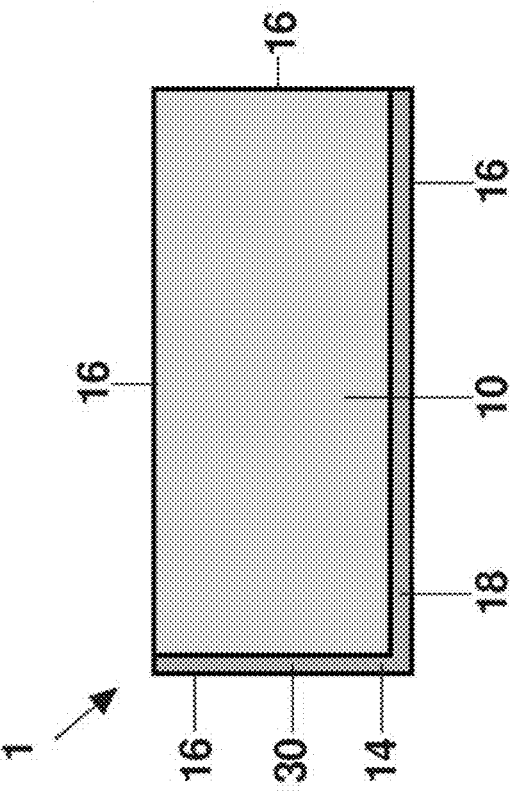

For use as a flooring application, a plurality of the inventive tiles 1 will be disposed next to each other in an operative orientation. As such, a side of one tile 1 will be disposed next to the side of a different tile 1. As mentioned previously, the exposed portion 18 of the inventive tile 1, and the gap 14 defined thereby, may have varying dimensions. Also, and with reference now to FIG. 15-A, in one embodiment of the tile 1 having a rectangular configuration, each of the four sides 16 may have an exposed portion 18 and a textured surface formed thereon. In such an embodiment, the exposed portion 18 and textured surface formed on each side 16 may be sized to equal generally one half (½) of the overall, intended resulting size of the imitation grout line formed between tiles, as illustrated in FIG. 15-B. For example, the width of the exposed portion 18 and textured surface may be generally about 2.5 millimeters (about 0.098 inches) to about 3 millimeters (about 0.118 inches). As such, an entire simulated grout line comprising the exposed portion 18 and texture surface thereon may be formed between two adjacent tiles and have a width of generally about or between 5 millimeters (about 0.197 inches) and 6 millimeters (about 0.236 inches).

In an alternative embodiment, and with reference now to FIGS. 16-A and 17-A, an inventive tile 1 may have an exposed portion 18 and textured surface formed on only two sides 16 thereof, each of which is sized to equal generally all or substantially all of the grout line formed between tiles. That is, and as shown in FIGS. 16-A and 17-A, a tile 1 may have two sides 16 that each include an exposed portion 18 and a textured surface formed thereon, and two sides 16' that do not. For example, and as is perhaps best shown in FIG. 16-B, each side(s) 16 of the tile 1 having an exposed portion 18 may be disposed next to a side 16' of a tile 1 that does not have such structure. In this embodiment, the exposed portion 18 and textured surface may be sized to have a width of generally about or between 5 millimeters (about 0.197 inches) to 6 millimeters (about 0.236 inches). When two or more of such tiles 1 shown in FIG. 16-A or 17-A are disposed next to each other, as shown in FIGS. 16-B and 17-B respectively, the visual effect that results is a full imitation grout line formed around all sides of each tile. However, other combinations of the size and location of the exposed portion 18 are also possible.

Figure 25:
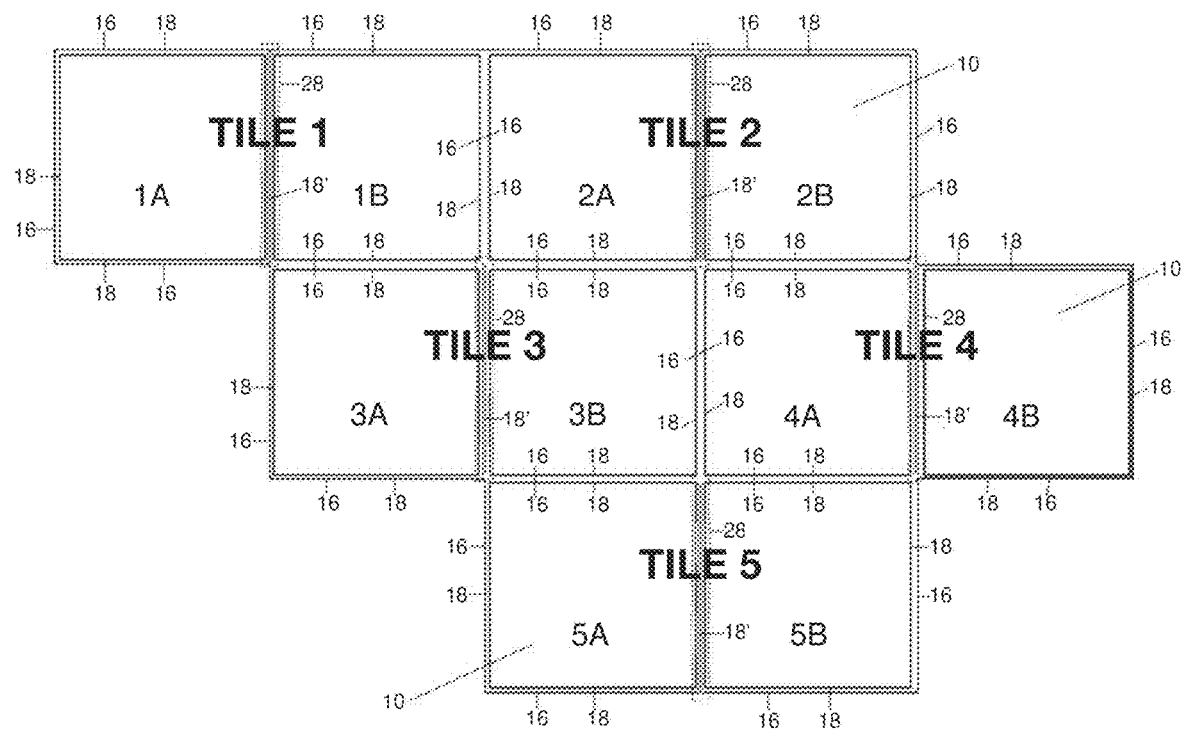
FIG. 25 is a plan view of a plurality of tiles in another embodiment according to the present invention, wherein each tile comprises an additional exposed portion formed substantially across a middle section of the tile, as well as an exposed portions formed along one or more sides of the tile.

With reference now to FIG. 25, an additional feature of the present invention comprises forming the exposed portion 18 at a middle or central section 28 of the tile 1, in addition to, or instead of, one of its side(s) 16. More specifically, it is often desirable to provide a surface, such as a wall or a floor surface, with a visual appearance of several tiles 1 being disposed in an even arrangement, wherein the four corners of four different but adjacently disposed tiles meet at a common point, as can be appreciated by the arrangement of tiles in FIG. 25. From an installation and durability perspective, there are disadvantages associated with the even arrangement of tiles as this common point is often weak and makes the tiles 1 susceptible to damage. The present invention addresses this disadvantage by providing a substantially rectangular tile 1 that imitates the appearance of two different substantially square tiles 1, and in some embodiments more than two square tiles.

More specifically, and as shown in FIG. 25, each one of tiles labeled as TILE 1, TILE 2, TILE 3, TILE 4 and TILE 5 has a substantially rectangular shape, with a length that is approximately twice their individual width, such as a length of 24 inches by a width of 12 inches. Furthermore, each one of these TILES 1-5 preferably comprises an exposed portion 18 formed along one or more its sides 16 to closely imitate the look and feel of a real grout line, as described previously herein. However, the inventive tiles shown in FIG. 25 each includes another exposed portion, namely, a middle exposed portion, indicated as 18' formed substantially across a middle portion 28 of the tile's visible top surface 10, which is also structured to closely imitate the look and feel of a real grout line, as described previously herein. As illustrated, the middle exposed portion 18' is disposed within a middle or central portion 28 of the TILE 1, and may extend completely across the top surface 10 thereof between opposite side(s) 16 of the TILE 1. For purposes of clarity, the middle exposed portion 18' may be formed on the tile 1 in the in a manner similar to embodiments previously described herein, such as being formed in the polyvinyl chloride (PVC) layer 40 at a depth below the top surface 22 of the tile 1. In other embodiments, the middle exposed portion 18' may be formed in the core layer 30.

However, and as illustrated in FIG. 25, when a plurality of such substantially rectangular tiles, such as those labeled TILE 1, TILE 2, TILE 3, TILE 4 and TILE 5, are installed next to each other in an offset manner, so as to form a "staggered arrangement" similar to that shown in FIG. 24, the resulting appearance will be that of an even arrangement or several squares as shown in FIG. 25. For illustrative purposes, each one of the substantially rectangular TILES 1-5 has a first portion labeled as "A," and a second portion labeled as "B," such as "1A" and "1B in TILE 1, " "2A" and "2B" in TILE 2, etc. Each portion, "A" and "B" of each TILE 1-5 is intended to create the visual impression of being one individual tile having a substantially square shape. Said differently, each substantially rectangular TILE 1-5 is intended to provide a visual appearance of two substantially square tiles. A staggered arrangement may thus be created by disposing the portion "B" of one tile next to the portion "A" of a different tile. This may be done in a "horizontal" manner, such as disposing portion "2A" right next to portion "M". This may also be done in a "vertical" manner such as disposing portion "3A" directly below portion "1B," and portion "4A" below portion 5B". This arrangement may be repeated so that the exposed portion 18 of one side(s) 16 of a tile offering a realistic looking grout line is disposed in alignment with the middle exposed portion 18' of a different tile, which also includes a realistic looking grout line.

For example, and still referring to FIG. 25, the exposed portion 18 of the left side 16 of TILE 3, namely, that marked with tile portion "3A," may be disposed in alignment with the middle exposed portion 18' of TILE 1, and more specifically, with the middle exposed portion 18' formed across TILE 1 between portions "1A" and "1B". Also by way of example, the exposed portion 18 formed on the right side 16 of TILE 3, namely, that marked with tile portion "3B," may be disposed in alignment with the exposed portion 18 formed on the left side 16 of TILE 4, namely, that marked as "4A," such that both of these exposed portions 18 are disposed in substantially parallel alignment with each other, and also in alignment with the middle exposed portions 18' of TILE 2 immediately above, namely, that marked between "2A" and "2B", and also in alignment with the exposed portion 18' of TILE 5 immediately below, namely, that marked between "5A" and "5B".

As may be appreciated from FIG. 25, the visual result offered by the offset or staggered arrangement of the substantially rectangular TILES 1 through 5, each of which has the middle exposed portion 18' formed thereon, is a substantially even arrangement appearing to be several square tiles arranged with a common point between the four corners of four different but adjacently disposed tiles. The actual physical arrangement formed by TILES 1 through 5, however, while achieving this visual result, includes an actual common point between only two corners of two different but adjacently disposed tiles. As a result, the weakness associated with the common points, where four different corners of four different tiles are adjacent to each other, is minimized, and the chance of tiles being damaged at such common points is greatly reduced.

Moreover, this benefit offered by the present invention can be significantly increased. Specifically, while the size of the substantially rectangular tiles shown in FIG. 25 are likely to be offered in a common rectangular shape of 12 inches in width by 24 inches in length, this can be increased to a much larger size, such as 12 inches by 48 inches in length, with each such larger tile formed to have additional middle exposed portions 18' across the middle and other sections thereof, so that when arranged with other such tiles in an offset or staggered arrangement, the visual result will still offer an appearance of evenly arranged tiles, similar to several aligned square tiles forming a grid. However, the common points between four actual corners of four adjacently disposed tiles will be minimized. It should be appreciated, of course, that other dimensions and/or configurations of the inventive tile shown in FIG. 25 are also within the scope of the present invention.

Figure 12:
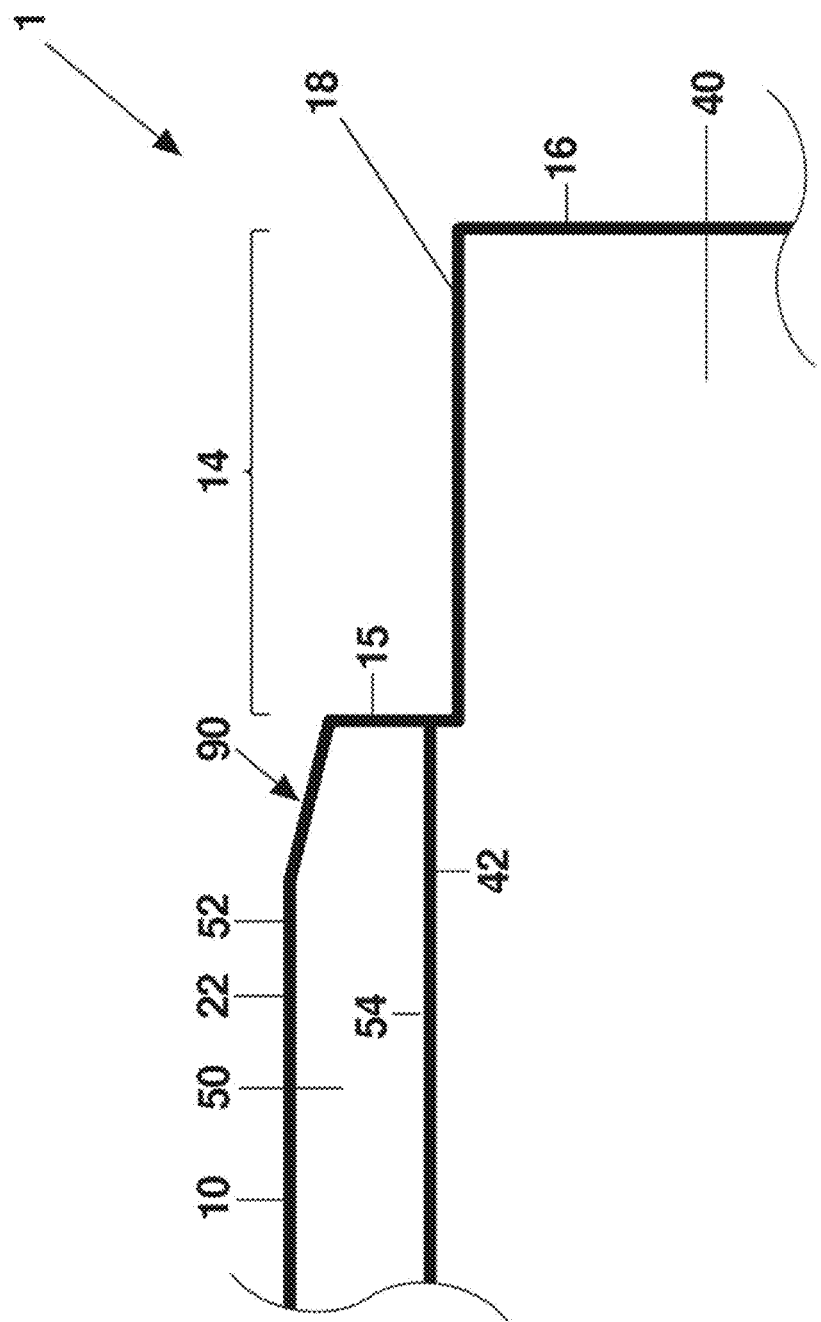
FIG. 12 is a transverse sectional view of one embodiment according to the present invention having a bevel formed on the top layer.
Figure 13:
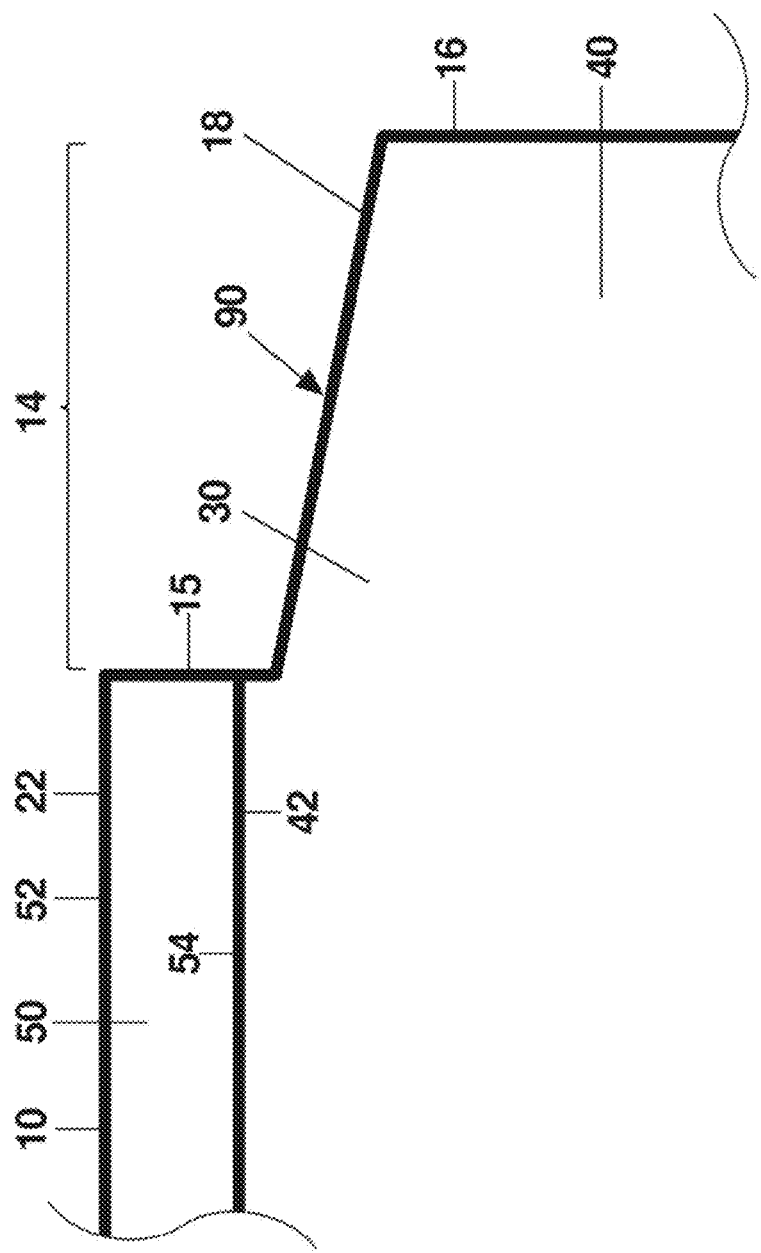
FIG. 13 is a transverse sectional view of an alternative embodiment according to the present invention having a bevel formed on the core layer.
Figure 14:
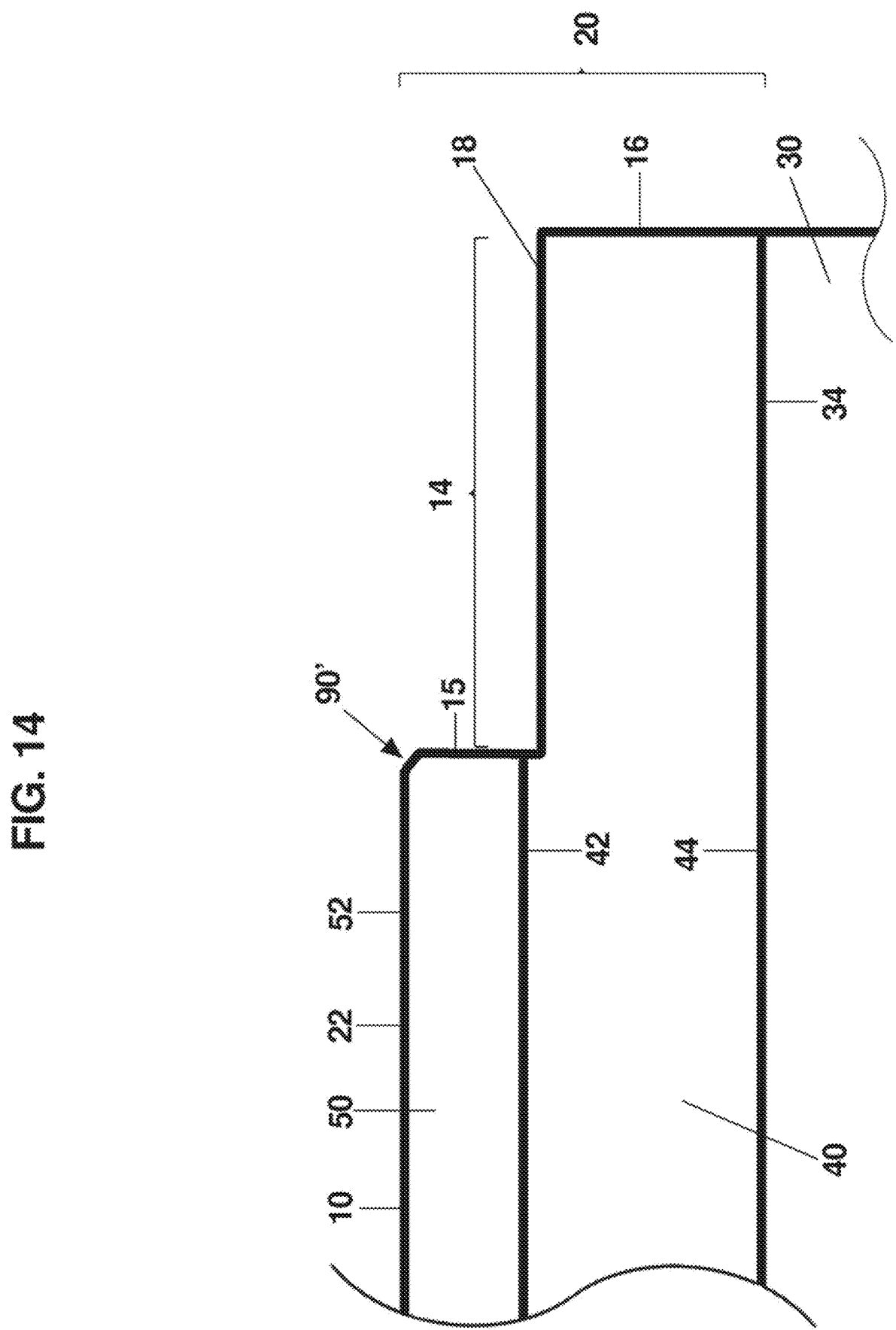
FIG. 14 is a transverse section view of yet another embodiment according to the present invention having a micro bevel formed on a top layer.

With reference back now to FIGS. 12-14, the tile 1 of the present invention may also comprise a bevel 90 formed on one or more side(s) 16 of the tile 1 adjacent to the exposed portion 18 and gap 14. The bevel 90 may be formed on the sidewall 15 associated with the exposed portion 18, at an upper portion thereof so as to be formed on the top layer 20, and specifically on the wear layer 50. The bevel 90 comprises a slanted portion that slopes downwardly, away from the top surface 10 of the tile 1 and towards the sidewall 15 that at least partially defining the exposed portion 18. Preferably, the bevel 90 is formed to extend uniformly and coincident with sidewall 15, exposed portion 18 and gap 14 along all or substantially all of one the side(s) 16 of the tile 1. Additionally, the bevel 90 may comprise a variety of sizes and angles of inclination with respect to the top surface 10 of the tile 1. For example, the bevel may have an angle of inclination that can range from generally about thirty degrees (30°) to about ninety degrees (90°). The illustrative embodiment of FIG. 12 shows a bevel 90 having an angle of inclination of generally thirty degrees (30°). In an alternative embodiment shown in FIG. 13, the bevel 90 may instead comprise a two stage descent from the top surface 10 to the sidewall 15 defining exposed portion 18 and gap 14 of the tile 1. With reference to FIG. 14, the bevel 90 may alternatively comprise a "micro" bevel 90'. As another example, and as shown in FIG. 13, the bevel 90 may additionally be formed on the exposed portion 18 itself, and may correspond with either the core layer 30 and/or the polyvinyl chloride (PVC) 40 layer instead of the top layer 20. In such cases, the bevel 90 may have a slanted portion with an angle of inclination of generally about ten degrees (10°).

With reference now to FIGS. 26-28, yet additional features of the present invention can include providing a tile 200 with a core layer 230 comprised of a material different from previous embodiments described herein. For example, the inventive tile 200 may also be formed so as to include a material such as stone plastic composite (SPC), which may also referred to at times as a stone polymer composite (SPC). Stone plastic composite (SPC) is generally a mixture of materials that includes densified foam polyvinyl chloride (PVC) and stone dust, or an equivalent material, and will typically be about two times the weight (or more) of the core layer 30 described previously herein as a densified foam material, and is also sometimes referred to as "rigid board." Such alternative embodiments using SPC material to form the core layer 230 are likely to prove advantageous because the properties of an SPC material include being more resistant to expansion and/or contraction. More specifically, the expansion coefficient of a stone plastic composite (SPC) is lower than that of other materials used in flooring applications, and therefore, stone plastic composite (SPC) material reduces the possibility that the overall tile 200 will flex, bend, or otherwise expand in ambient conditions. Using a stone plastic composite (SPC) material may also result in reduced or no dimensional shifting that might otherwise occur between individual tile(s) 200 after installation.

Accordingly, and in one or more additional embodiments, the core layer 230 of the present inventive tile 200 comprises a stone plastic composite (SPC) material structured to provide additional rigidity and sufficient support for a top section 220 of the inventive tile 200, so that the resulting tile 200 is especially suitable for flooring applications. For example, in one or more of such embodiments, the core layer 230 comprises a stone plastic composite (SPC) material having an optimal density in a preferred range from anywhere of about 1,500 kg/m3 (about 93.642 lb/ft3) to about 2,000 kg/m3 (about 124.856 lb/ft3). In at least one preferred embodiment, however, the core layer 230 comprising a stone plastic composite (SPC) material will have a density that is generally between 1,900 kg/m3 (about 118.613 lb/ft3) to about 2,000 kg/m3 (about 124.856 lb/ft3). Additionally, in one or more embodiments, such as shown in FIG. 27, the top section 220 of the tile 200 may comprise a polyvinyl chloride (PVC) layer 240, although as described subsequently herein, given the properties of a core layer 230 that includes SPC, this is not necessary and a top section 220 formed of different materials is also possible.

As shown in FIG. 28, in one or more embodiments, the top section 220 of the tile 200 may comprise a wear layer 250 and a decorative layer 260. A lower surface 254 of the wear layer 250 may be joined to a top surface 262 of the decorative layer 260. A top surface 252 of the wear layer 250 may be substantially coincident with the top surface of the tile 200. Thus, in FIG. 28 the top section 220 comprises a wear layer 250 and a decorative layer 260, but not a polyvinyl chloride (PVC) layer 240, joined directly to the core layer 230. More specifically, a lower surface 264 of the decorative layer 260 may be joined directly to the core layer 230 comprising a stone plastic composite (SPC) material. The wear layer 250 and/or the decorative layer 260 may comprise a relatively thin film or sheet formed from polyvinyl chloride (PVC), although it is possible that other materials may be utilized. In embodiments wherein the tile 200 includes both a core layer 230 comprising stone plastic composite (SPC) material and a polyvinyl chloride (PVC) layer 240, the density of the core layer 230 will preferably be greater than the density of the PVC layer 240.

In one or more of the embodiments wherein tile 200 has a core layer 230 comprising a stone plastic composite (SPC) material and a wear layer 250, the thickness of the wear layer 250 may be in a range from about 0.1 millimeters (about 0.004 inches) to about 0.7 millimeters (about 0.028 millimeters), and in some embodiments a thickness of about 0.3 millimeters (0.012 inches) to about 0.5 millimeters (0.020 inches). Additionally, a polyurethane (PU) coating may be applied to one or more layers to at least partially reduce scratching of a layer(s) below.

Additionally, in one or more embodiments wherein the core layer 230 comprises a stone plastic composite (SPC) material, the thickness of the tile 200 or portions thereof may be reduced. For example, the core layer 230 may have a thickness in a range from anywhere of about 3 millimeters (about 0.118 inches) to about 8 millimeters (about 0.315 inches), which together with the density of the core layer 230, is likely to reduce the chances that the tile 200 will crack due to heavy foot traffic. In one preferred embodiment, the thickness of the core layer 230 will be reduced to approximately 4 millimeters (about 0.157 inches). As an additional non-limiting example, the overall thickness of the tile 200 having a core layer 230 comprised at least in part of stone plastic composite (SPC) and including a top section 220 may be about 5 millimeters (about 0.197 inches). As yet another non-limiting example, when a tile 200 having a core layer 230 comprised at least in part of stone plastic composite (SPC) includes a top section 220 including a PVC layer 240, the latter may have a thickness of about 1 millimeter (0.039 inches) to about 2 millimeters (0.079 inches).

Also, there can be other embodiments wherein the inventive tile 200 comprises a core layer 230 that is at least partially made from a stone plastic composite (SPC) material, and wherein the top section 220 is manufactured so as not to include a polyvinyl chloride (PVC) layer 240. For example, in one embodiment, a tile 200 according to the present invention may be provided with a core layer 230 comprising a stone plastic composite (SPC) material, and a relatively thin veneer layer 220. The veneer layer 220, which may comprise a "raw" veneer formed from a variety of materials, will preferably comprise one or more layers of natural stone or of genuine wood. In such embodiments, the thickness of the veneer layer 220 may now be produced to be very thin, such as within a range from anywhere of about 0.3 millimeters (about 0.012 inches) to about 1 millimeter (about 0.039 inches). In one preferred embodiment, the thickness of the veneer layer 220 is about 0.6 millimeters (about 0.024 inches) as in initial testing for durability, favorable results have been observed. In at least one embodiment, a liquid vinyl compound may be applied to the veneer layer 220 for additional wear and/or moisture resistance.

With regard to the material composition of the core layer 230 comprising a stone plastic composite (SPC) material, while there may be various formulations, in at least one embodiment this comprises a combination of stone dust, a synthetic plastic polymer such as polyvinyl chloride (PVC), calcium powder, and a chemical agent. In a preferred embodiment, the stone plastic composite (SPC) material of the core layer 230 comprises polyvinyl chloride (PVC) in an amount of generally between about 20% to about 30%, calcium powder or stone dust in an amount of generally between about 70% to about 80%, and a chemical agent, in an amount of generally between about 0.5% to about 5%. In at least one embodiment the chemical agent may be provided in an amount of about 0.5% to about 2%. The chemical agent may include a lubricating agent, a bonding agent, and/or a stabilizer. In yet another preferred embodiment, the stone plastic composite (SPC) material of the core layer 30 comprises polyvinyl chloride (PVC) in an amount of generally about 24.8%, calcium powder in an amount of generally about 74.5%, and a chemical agent in an amount of generally about 0.7%. The core layer 230 may be formed as an extruded sheet.

With reference now to FIGS. 29-32, in one or more additional embodiments of the present invention, tile 300 is configured to reduce or avoid staining of the exposed portion(s) 18 and/or 18' comprising the imitation grout line, whether from dirt, oils, dropped food, spilled liquids, etc. For example, the tile 300 shown in FIG. 29 includes a protective section 370 disposed between a top section 320 and a core layer 330, and with the exposed portion 18 formed within the protective section 370.

Figure 29:
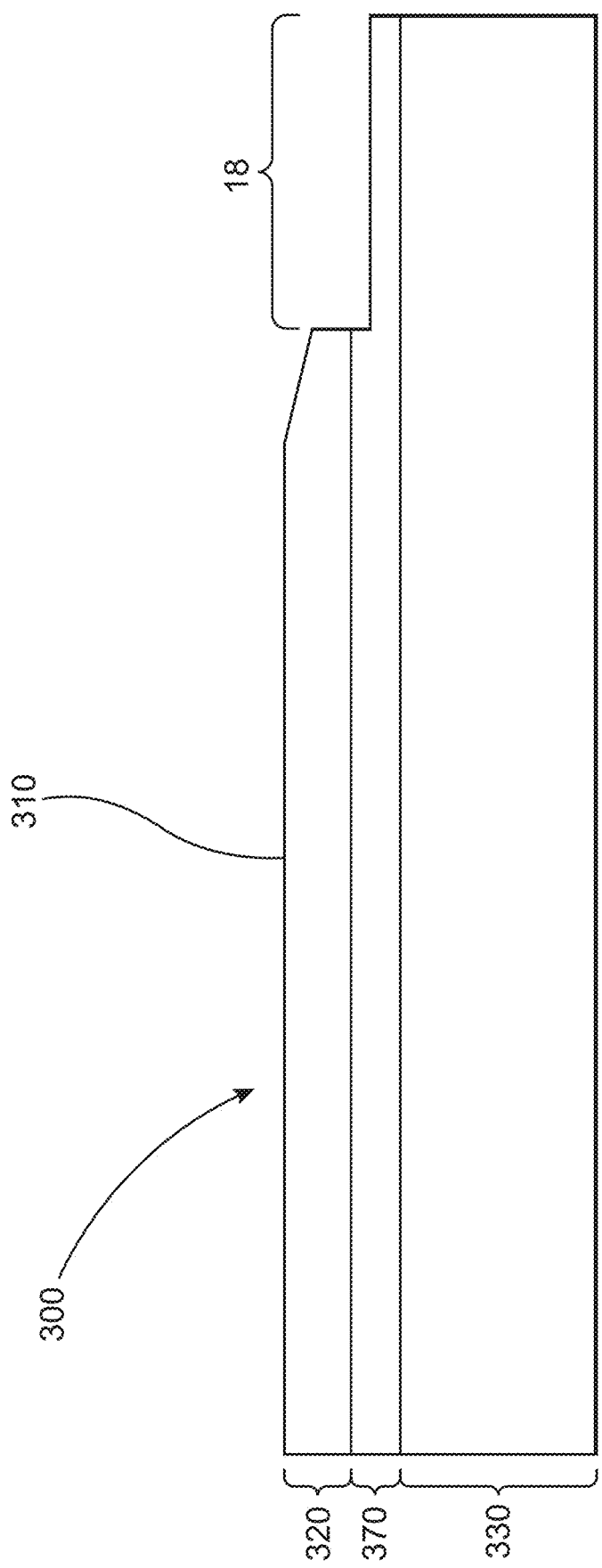
FIG. 29 is a transverse sectional view of yet another embodiment of a tile according to the present invention comprising a protective section, a top section, and a core layer.
Figure 30:
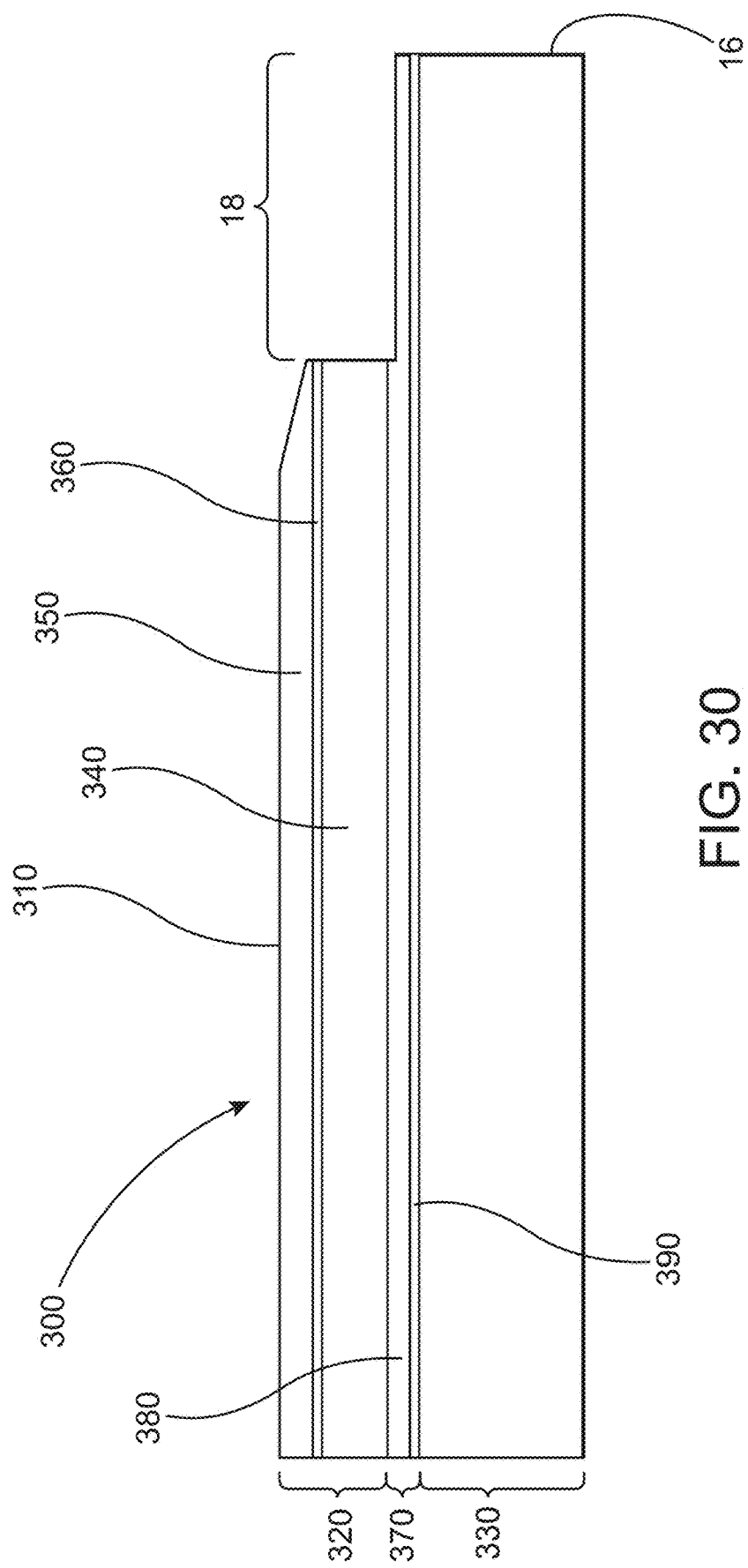
FIG. 30 is a transverse sectional view of one embodiment of a tile according to the present invention comprising a protective section with a protective layer and a decorative layer.
Figure 31:
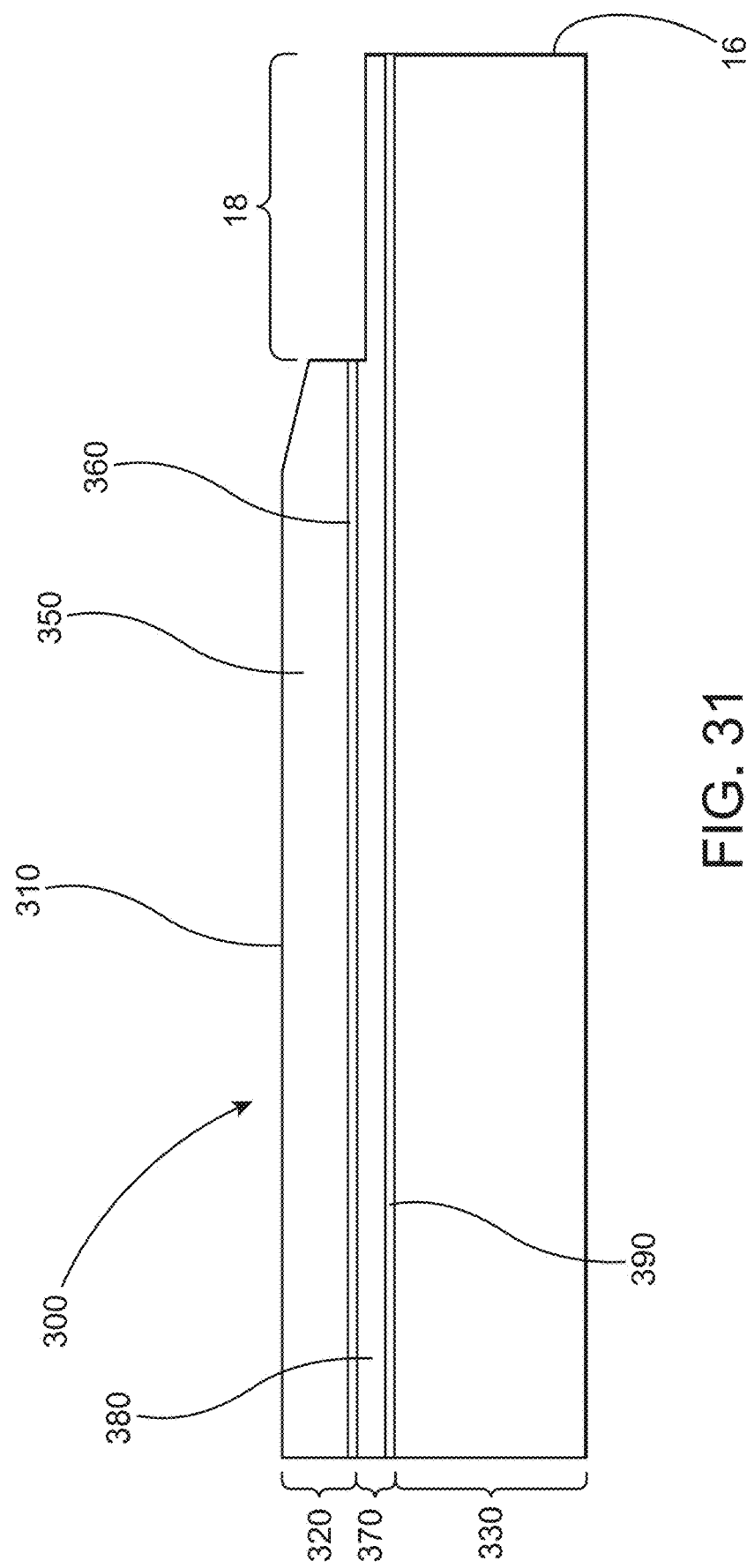
FIG. 31 is a transverse sectional view of another embodiment of a tile according to the present invention comprising a protective section with a protective layer and a decorative layer.

Still referring to FIGS. 29-32, the top section 320 of the tile 300 has a top surface 310, which can be configured to imitate the look and feel of natural materials, as described previously herein, such as natural stone, genuine wood, etc. For example, and as shown in FIGS. 30 and 31, the top section 320 of the tile 300 may comprise a wear layer 350 and/or a first decorative layer 360 structured to imitate the look of a desired natural material. The material of the wear layer 350 may be made so as to have a substantially translucent or transparent appearance to permit the design features of the first decorative layer 360 to be seen therethrough. The wear layer 350 may comprise a clear polyvinylchloride (PVC) material, and further, may be formed with nano-crystals, e.g., made of micro-ceramic beads or aluminum oxide crystals, so as to be resistant to abrasion. Additionally, the tile 300 illustrated in these embodiments comprises a core layer 330 made of a densified foam material, as previously described herein. In some cases, the core layer comprising a densified foam material may be referred to as a Wood Plastic Composite (WPC), but should not be construed as being limited to this. In other embodiments, it is possible for the core layer 330 to comprise a stone plastic composite (SPC) material, as has also been described herein As best shown in FIG. 30, in one or more embodiments the top section 320 of the tile 300 additionally comprises a layer of a polyvinyl chloride (PVC) material 340. The polyvinyl chloride layer (PVC) 340 may comprise natural or otherwise "virgin" polyvinyl chloride (PVC). This layer of PVC material 340 is preferably disposed between the first decorative layer 360 of the top section and the core layer 330, and is structured to enhance the rigidity and stability of the tile 300, particularly in those embodiments where the core layer 330 comprises a densified foam material.

As shown in FIGS. 29-31, the inventive tile 300 also comprises at least one exposed portion 18 formed on at least one its sides 16, which is structured to represent an imitation but highly realistic looking grout line. In these embodiments, the exposed portion(s) 18 and/or 18' is formed directly on or within the protective section 370.

Figure 32:
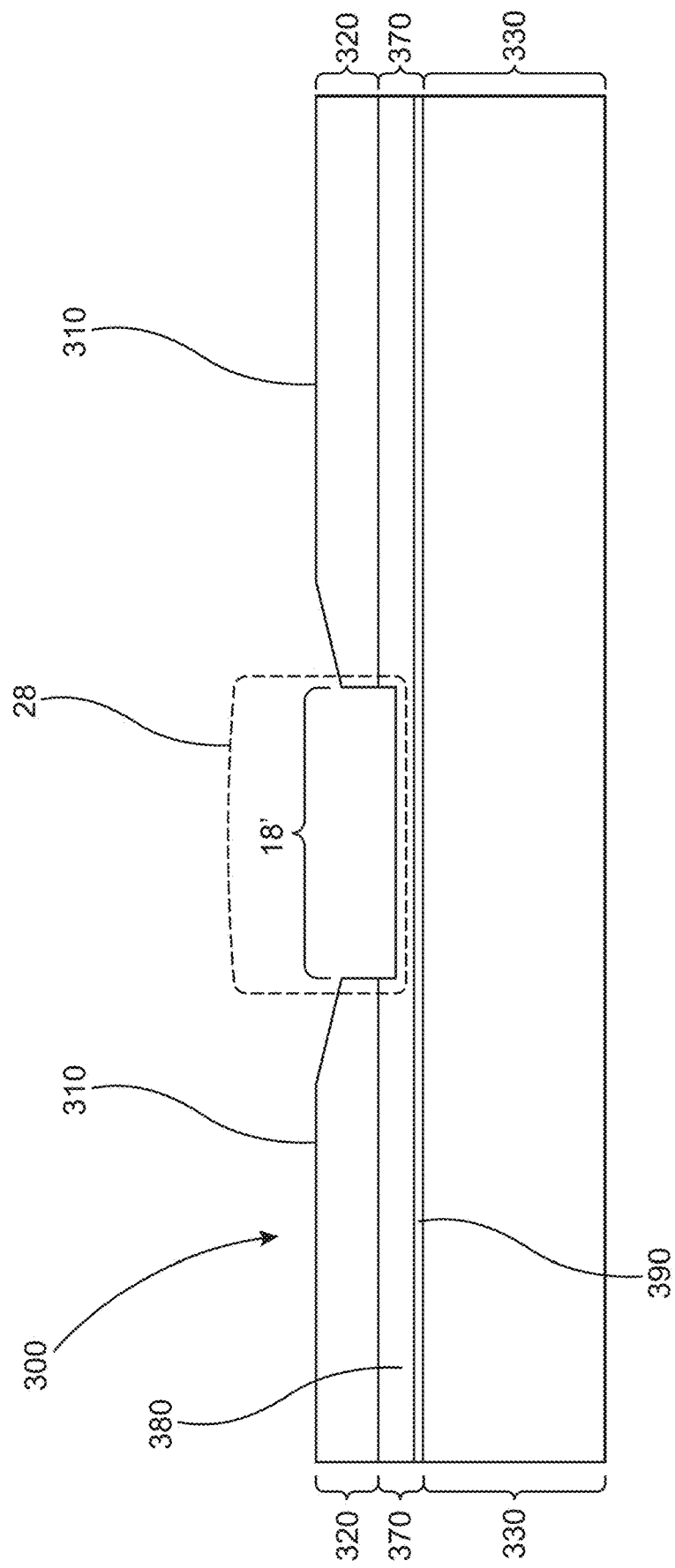
FIG. 32 is a transverse sectional view of one embodiment of a tile according to the present invention comprising a protective section, a top section, and a core layer, wherein an exposed portion is formed on a middle section of the tile.
Figure 33A:
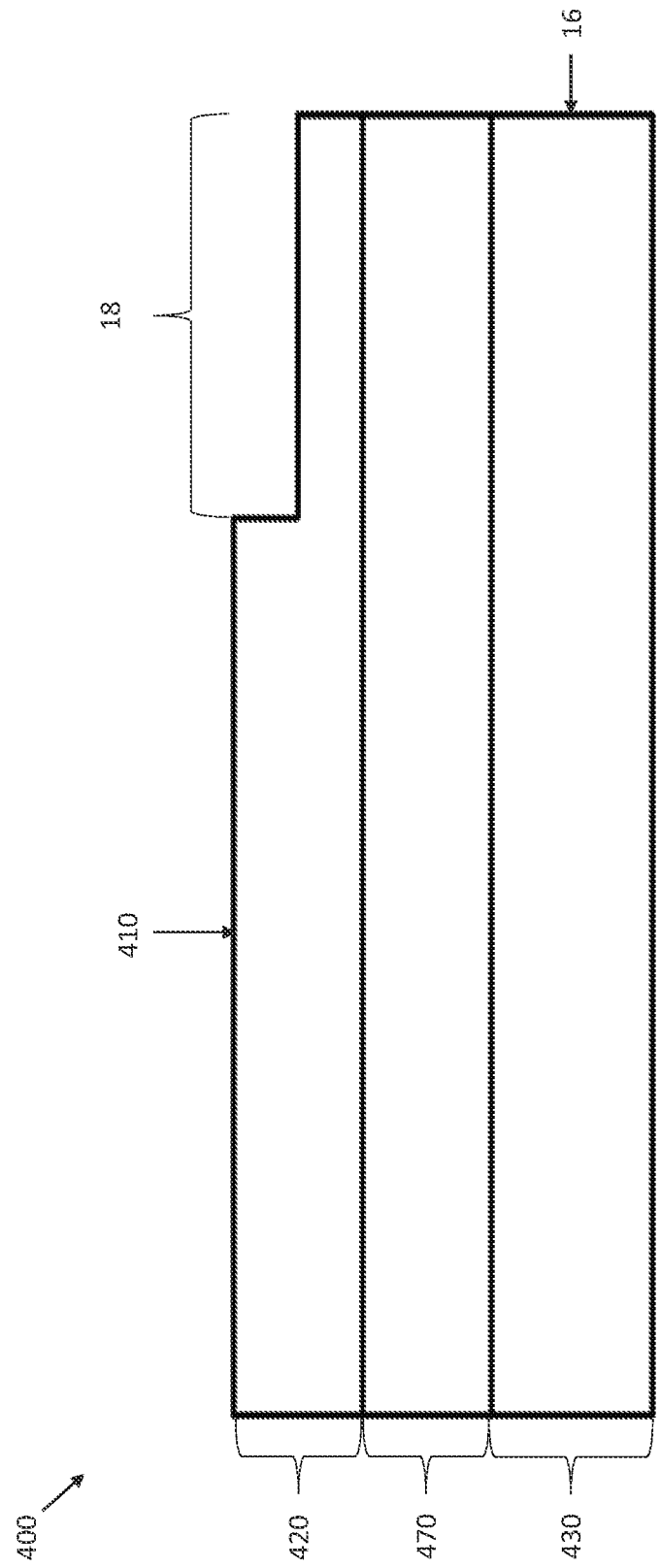
FIG. 33A is a transverse sectional view of yet another embodiment of a tile according to the present invention comprising at least a vinyl layer and a top section, as well as an exposed portion formed in the top section, and a core layer which is optional.
Figure 33B:
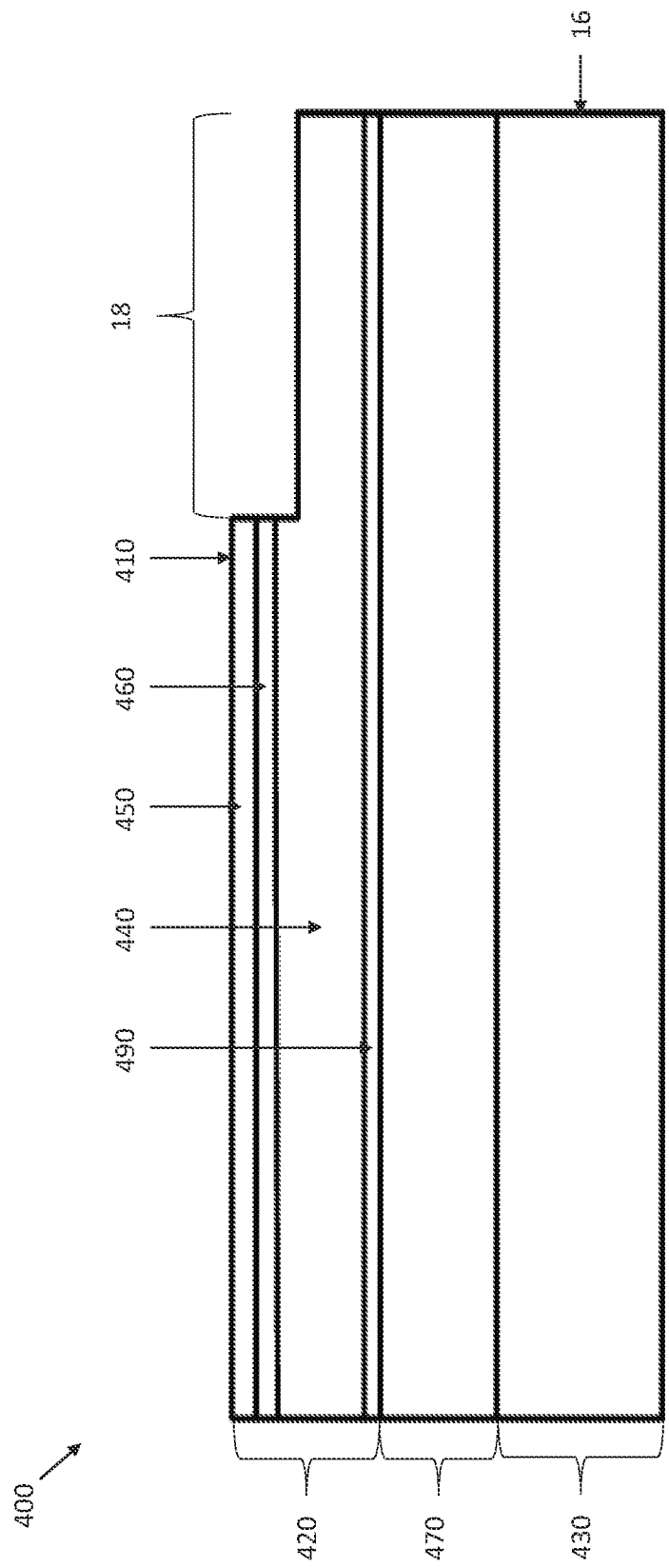
FIG. 33B is a transverse sectional view of yet another embodiment of a tile according to the present invention having a vinyl layer, and a top section comprising a first and a second wear layer and a first and a second decorative layer.

The protective section 370 comprises at least a protective layer 380 in one embodiment, but in the preferred embodiments, comprises both a protective layer 380 and another or second decorative layer 390, as shown in FIGS. 30 through 32. In these embodiments, the protective layer 380 is disposed above and/or in immediately adjacent, covering relation to the second decorative layer 390. Also in these embodiments, the protective layer 380 preferably comprises a material that is either transparent or substantially translucent, so as to permit one or more design features associated with the second decorative layer 390 to be observable therethrough, such as a coloring thereof, that will generally be an intended color of the exposed portion 18 or 18' which closely simulates a real grout line. Ideally, the material of the protective layer 380 is clear or at least translucent, so that the design features of the second decorative layer 390 can be observed, and with little to no distortion. The second decorative layer 390 may comprise a very thin film having a solid color. However, this is not strictly required as it is possible that the second decorative layer 390 comprises a relatively thin film with other design features and/or patterns. Additionally, the protective layer 380 is preferably formed from a vinyl composite material, including a synthetic plastic polymer which may be, but is not limited to, polyvinyl chloride (PVC). During the manufacturing process for the tile 300, the exposed portion 18 can be formed by a cutting process utilizing a knife, cutting blade(s), etc. to remove material from the top section 320 and side(s) 16 of the tile 300, to reveal the protective layer 380, and to form the exposed portion(s) 18 and/or 18' within the protective layer 380 and with a size, shape and texture that closely imitates the look and feel of a real grout line. Accordingly, the vinyl composite material of the protective layer 380 is sufficiently rigid and structured to not only permit the formation of the exposed portion 18, but to withstand wear and tear conditions associated with flooring, whether from being walked upon, furniture being moved, etc. In addition, the protective layer 380 is structured to provide protection to the exposed portion(s) 18 and/or 18', comprising the imitation grout line, so as to avoid or limit any staining thereof, whether from dust, grease, dirt, oils, pieces of food or other particles.

In one or more embodiments, such as but not limited to one where the core layer 330 comprises a stone plastic composite (SPC) material, a coating of another material may be applied to the top surface of the protective layer 380. By way of example only, this coating may comprise an ethoxyline resin (ER) or a polyurethane (PU) material, which may be cured using an ultra-violet (UV) lighting and heating process. Further, such a coating may comprise an ultra-violet (UV) cured polyurethane (PU) material that may additionally comprise nano-silica, ceramic beads, or otherwise aluminum oxide crystals. Such a coating may be applied during the manufacturing process before boards are cut into individual planks or tile sizes. For most embodiments described herein, however, a tile 300 having a protective section 370 will not need a further protective coating or painting applied to the exposed portion 18 having the appearance of grout line after the tile 300 is manufactured.

With reference now to FIGS. 30-31, the thickness of the different sections 320, 370 and 330, as well as the various layers of material within them, may vary according to the intended or particular application. As a non-limiting example, the top section 320 of tile 300 may have a depth or thickness in a range of generally about 1.27 millimeters to about 2.77 millimeters (about 0.05 inches to 0.109 inches), comprising a wear layer 350 with a thickness in a range from about 0.2 millimeters (0.008 inches) to about 0.7 millimeters (0.028 inches), a first decorative layer 360 with a thickness of about 0.07 millimeters (about 0.003 inches), and a polyvinyl chloride layer (PVC) 340 having a thickness in a range of about 1 millimeter (about 0.039 inches) to about 2 millimeters (0.079 inches). The protective section 370 may have a depth or thickness in a range of generally about 0.11 millimeters to about 0.69 millimeters (0.004 inches to 0.027 inches), comprising a protective layer 380 with a thickness in a range from about 0.1 millimeter (about 0.004 inches) to about 0.6 millimeters (0.024 inches) and a second decorative layer 390 of about 0.01 millimeters (about 0.0004 inches) to about 0.09 millimeters (about 0.0035 inches). In at least one preferred embodiment, however, the thickness of the protective layer 380 is about 0.3 millimeters (about 0.012 inches) and the thickness of the second decorative layer 390 is about 0.07 millimeters (about 0.0028 inches). Further, the core layer 330 may have a depth or thickness in a range from about 3 millimeters (about 0.118 inches) to about 6 millimeters (about 0.236 inches). As has been described previously herein, the depth of the exposed portion 18 and/or 18', from the top surface 310 of the tile 300, can vary, such as for example, within a range between about 0.9 millimeters to 2 millimeters. However, in some embodiments, the depth of the exposed portion 18 and/or 18' from the top surface 310 may be less, whether from a slight or minimal depth that may be about 0.3 millimeters deep, or at a greater depth such as up to about 1 millimeter (about 0.039 inches). It is emphasized that the foregoing is provided only for illustrative purposes and should not be construed in a limiting sense.

With reference now to FIG. 32, another feature of the tile 300 having a protective section 370 is to achieve a substantially uniform appearance, at least in the color of a plurality of exposed portions 18 and/or 18' formed thereon. For example, a tile 300 having an exposed portion 18 structured to represent a grout line formed along one side thereof as shown in FIG. 30, may further include additional exposed portion(s) 18' representing a grout line that is formed substantially at or across the top surface 310, such as but not limited to, across a central or middle section of the tile 300, as shown in FIG. 32 and indicated by the dashed lines at 28. A tile 300 having a protective section 370, as described herein, is structured to provide a substantially uniform color and appearance to these different exposed portions 18 and/or 18' irrespective of their location on the tile 300 and how each is formed during the manufacturing process. For example, the exposed portion(s) 18 are typically formed along the side(s) 16 of a tile 100 during manufacture using a cutting process with one or more blades applied horizontally, e.g., by a saw or other machine, in generally parallel relation to the tile 1. Conversely, to form the exposed portion(s) 18' across a middle section 28 of a tile as shown in FIG. 32, the cutting process uses one or more blades applied vertically or in perpendicular relation to the tile 300.

By providing tile 300 with a protective section 370, and forming the exposed portions 18 and/or 18' within protective layer 380, substantially uniformity can be achieved for a plurality of different exposed portion(s) 18 and/or 18' in terms of the coloring thereof corresponding to imitation grout lines, as the protective layer 380 provides even distribution for the colorant or dye. In contrast, when an exposed portion(s) 18 or 18' is formed directly on a core layer, or on a polyvinyl chloride layer, it is difficult to ensure a consistent appearance and color of the exposed portions 18 and/or 18' because during the manufacturing process, any colorant or dye added to the core layer 330 or polyvinyl chloride (PVC) layer 340 tends to accumulate on the sides, or at the top or bottom surfaces, rather than being evenly distributed, so that when the various exposed portions 18 and/or 18' are formed, the color of the imitation grout line may be less than consistent. Moreover, the protective layer 380 of tile 300 allows for the texture of various exposed portions 18 and/or 18' to be highly similar in appearance, despite some inconsistencies in how the cutting process is applied.

With reference now to FIGS. 33A-39, the tile of the present invention is also capable of yet further embodiments. More specifically, the inventive tile 400 can comprise at least a top section 420 and a vinyl layer 470, as well as an exposed portion(s) 18 structured to look like and closely imitate a real grout line, and further along with a core layer 430 in certain embodiments, although this core layer 430 is not always required.

Also, and as with other embodiments described herein, the tile 400 may be configured so that the top surface 410 imitates the look and feel of natural materials, including, but not limited to, natural stone, genuine wood, etc. For example, as shown in FIGS. 33B, 34, 35B and 36B, the top section 410 of the tile 400 may comprise a first wear layer 450 and/or a first decorative layer 460 structured to imitate the look of a desired material.

However, and as is also shown in FIGS. 33B, 34, 35B and 36B, the inventive tile 400 includes a top section 410 comprising a second wear layer 440 and/or a second decorative layer 490. The second decorative layer 490 is structured to include a color that will preferably correspond to an intended grout color. Additionally, the material of the second wear layer 440 is preferably structured to at least partially reduce staining, and generally provides protection to the second decorative layer 490 below. The wear layer(s) 450 and/or 440 may comprise a substantially translucent material so that the design features of the decorative layer(s) 460 and/or 490 may be seen there-through.

As represented in FIGS. 33A-35B and 39, the inventive tile 400 may further comprise a core layer 430. The core layer 430 is adhered to or otherwise joined to the vinyl layer 470 and may comprise a rigid material, such as a stone plastic composite (SPC) material, or alternatively, a densified foam material, as previously described herein.

However, and as represented in FIGS. 36A-38, it is also within the scope of the present invention to provide a tile 400 having a top section 420 joined to a vinyl layer 470, but without a core layer 430. More specifically, in such embodiments, the vinyl layer 470 comprises a solid vinyl material that is structured and disposed to be sufficiently rigid for use as a substrate in flooring applications but also, sufficiently flexible to allow foot comfort for those using the tile 400. Additionally, the vinyl layer 470 may be sufficiently rigid so that an interconnecting mechanism may be profiled thereon, as described further below. The solid vinyl material of the vinyl layer 470 comprises at least a polyvinyl chloride (PVC) material. However, the solid vinyl material of the vinyl layer 470 may also comprise calcium powder or stone dust. In at least one embodiment, the solid vinyl material of the vinyl layer 470 comprises at least a polyvinyl chloride (PVC) material, calcium powder or stone dust, and a plasticizer. As a non-limiting example, plasticizers commonly referred to as DOTP or dioctyl terephthalate may be used. Other examples of plasticizers that may be used include those that do not comprise phthalate.

The following examples of the material composition of the vinyl layer 470 are provided for illustration purposes only, and are not to be considered limiting, as other variations are possible depending on the specific application. For example, the polyvinyl chloride material may be provided in an amount that is about 20% to about 30% of the overall weight of the vinyl layer 470. Also as an example, the calcium powder or stone dust may be provided in an amount that is about 60% to about 70% of the overall weight of the vinyl layer 470. As a further example, the plasticizer may be provided in an amount that is about 10% to about 15% of the overall weight of the vinyl layer 470. In at least one embodiment, the inventive tile 400 comprises a vinyl layer 470 with a vinyl material comprising (i) polyvinyl chloride in an amount that is about 25% of the overall weight of the vinyl layer 470, (ii) calcium powder or stone dust in an amount that is about 63% to about 65% of the overall weight of the vinyl layer 470, and (iii) a plasticizer in an amount that is about 10% to about 12% of the overall weight of the vinyl layer 470.

In one or more preferred embodiments, the vinyl layer 470 of the inventive tile 400 such as is illustrated in FIGS. 33A to 39, comprises a density of about 1,700 kg/m3 (about 106.128 lb/ft3) to about 2,100 kg/m3 (about 131.099 lb/ft3). Favorable results have been observed with a density of the vinyl layer 470 of about 1,800 kg/m3 (about 112.370 lb/ft3) to about 2,000 kg/m3 (about 124.856 lb/ft3) but acceptable results are achievable at densities somewhat outside of this range, as noted above. In one most preferred embodiment, however, the density of the vinyl layer 470 comprises about 1,900 kg/m3 (about 118.613 lb/ft3). Additionally, in those embodiments of the invention including a core layer 430 in addition to the vinyl layer 470, such as is shown in FIGS. 33A to 35B and FIG. 39, the density of the core layer 430 may vary according to the specific substrate, i.e., stone plastic composite (SPC) or a densified foam material. In embodiments where the core layer 430 comprises a stone plastic composite material, the density of the core layer 430 may be about 1,500 kg/m3 (about 94.642 lb/ft3) to about 2,200 kg/m3 (about 137.342 lb/ft3).

Still referring to the embodiments illustrated in FIGS. 33A to 39, the overall thickness of the inventive tile 400 can vary according to the specific application. For example, the overall thickness of the tile 400 may range from about 3.5 millimeters (about 0.138 inches) to about 7 millimeters (about 0.276 inches). In embodiments of the tile 400 comprising a core layer 430, the thickness of the core layer 430 may be about 2 millimeters (about 0.079 inches) to about 3 millimeters (about 0.118 inches). The thickness of the vinyl layer 470 may generally be about 1.5 millimeters (0.059 inches) to about 3.0 millimeters (about 0.118 inches). In at least one embodiment, the thickness of the vinyl layer 470 may be about 1 millimeter (about 0.039 inches) to about 2 millimeters (about 0.079 inches). The thickness of the first wear layer 450 and/or second wear layer 440 may be in a range from about 0.1 millimeters (about 0.004 inches) to about 0.7 millimeters (about 0.028 millimeters). The thickness of the decorative layer(s) 460 and/or 490 may be about 0.05 millimeters (about 0.002 inches) to about 0.1 millimeters (about 0.004 inches). In at least some embodiments, the combined thickness of the wear layer(s) 450 and/or 440, and the decorative layer 460 and/or 490, may be about 0.07 millimeters (about 0.003 inches) to about 0.7 millimeters (about 0.028 inches).

Figure 34:
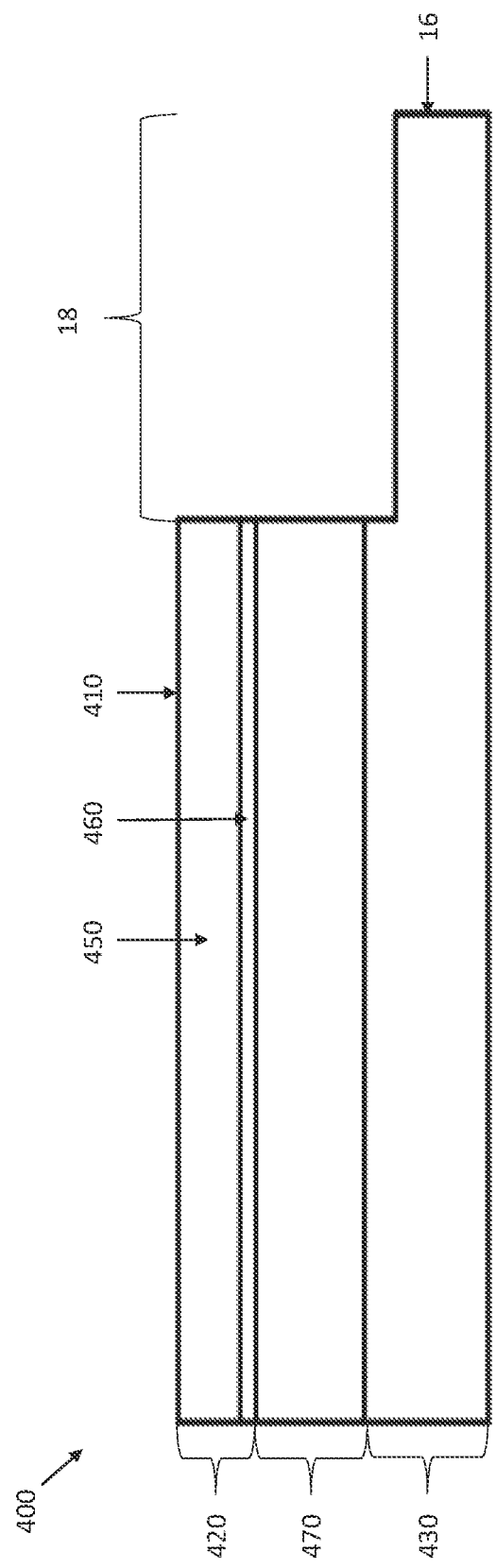
FIG. 34 is a transverse sectional view of still another embodiment of a tile according to the present invention having a vinyl layer, and an exposed portion formed on at least a portion of a core layer.
Figure 35A:
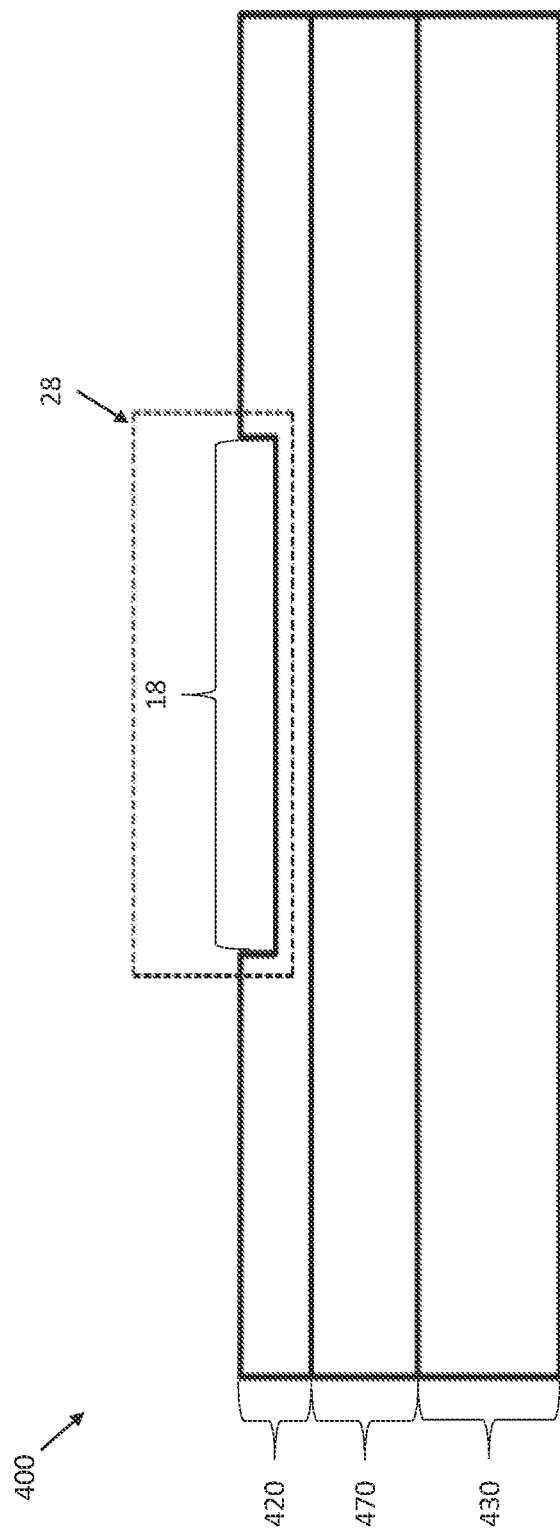
FIG. 35A is a transverse sectional view of another embodiment of a tile according to the present invention comprising a vinyl layer, and an exposed portion formed substantially across a middle section of the tile.
Figure 38:
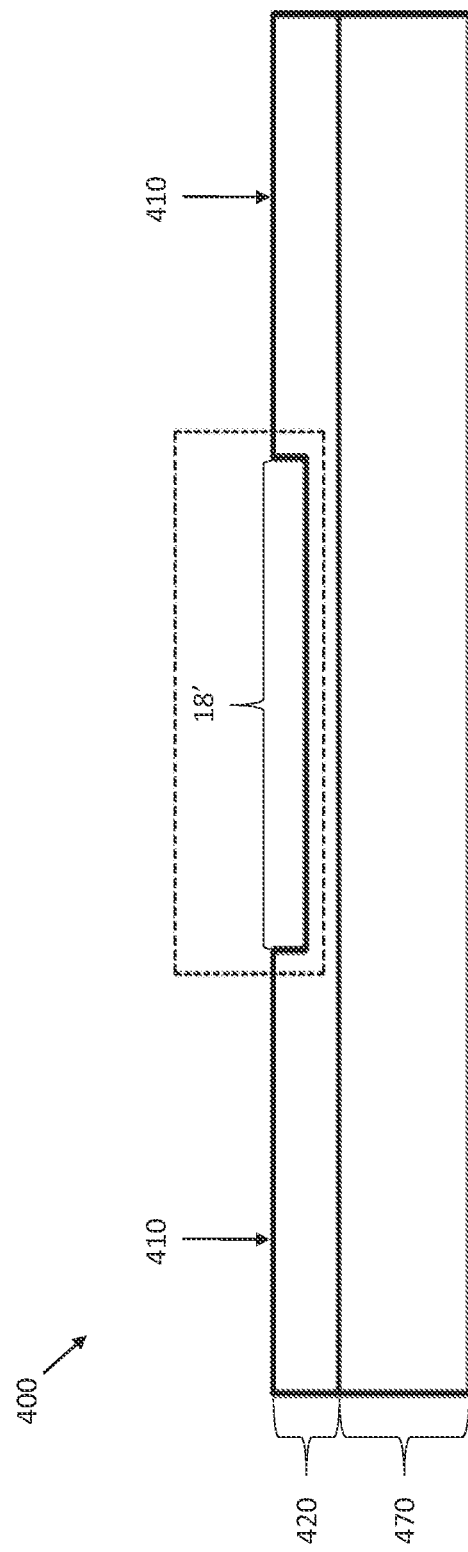
FIG. 38 is a transverse sectional view of another embodiment of a tile according to the present invention comprising a vinyl layer, and an exposed portion formed on the top section of the tile substantially across a middle section of the tile.

As shown in FIGS. 33A-35B and 38, the inventive tile 400 also comprises at least one exposed portion 18 formed on at least one of its sides 16, which, as described herein, is structured to represent an imitation grout line. However, and as shown in FIGS. 35A, 35B and 38, an exposed portion 18' may also be formed on a middle section 28 of the tile 400. Additionally, and as represented in FIGS. 33A-33B and 35A to 38, the exposed portion(s) 18 and/or 18' may be formed on the top section 420 of the tile 400. In FIGS. 33B, 35B and 36B, the exposed portion(s) 18 and/or 18' is illustrated as being formed on the second wear layer 440. This exposes at least a portion of the second wear layer 440 such that an intended grout color of the second decorative layer 490 may be observed there-through. Further, the second wear layer 440 may be configured to closely approximate the texture of a real grout line. For example, the wear layer 440 may be profiled with cutting knives, saws, or other tools, to result in a texture on the wear layer 440 that closely approximates the look and feel of a real grout line. In an alternative embodiment, as shown in FIG. 34, the exposed portion(s) 18 and/or 18' may be formed directly on the core layer 430, instead of on the top section 420.

Figure 36A:
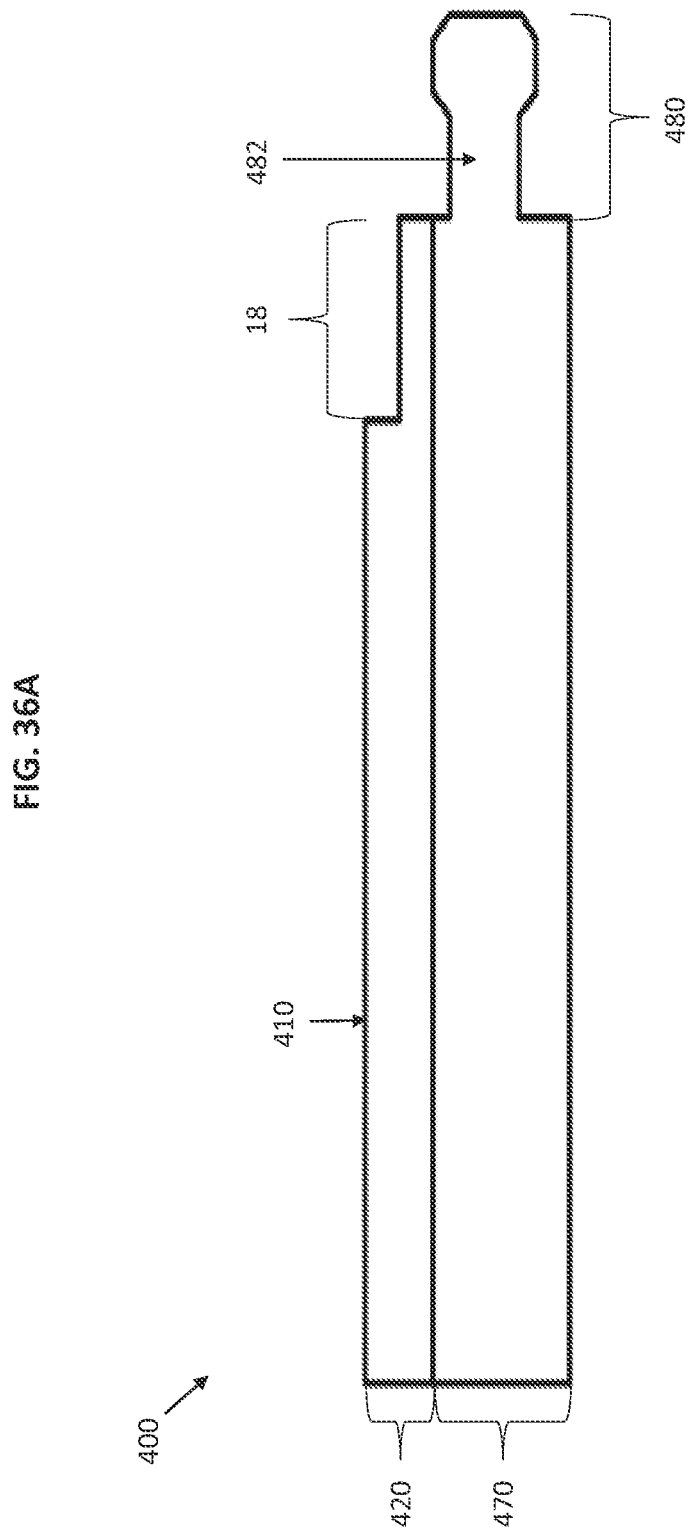
FIG. 36A is a transverse sectional view of one embodiment of a tile according to the present invention comprising a vinyl layer and a top section, as well as an exposed portion formed on the top section of the tile substantially above an interconnecting mechanism.
Figure 36B:
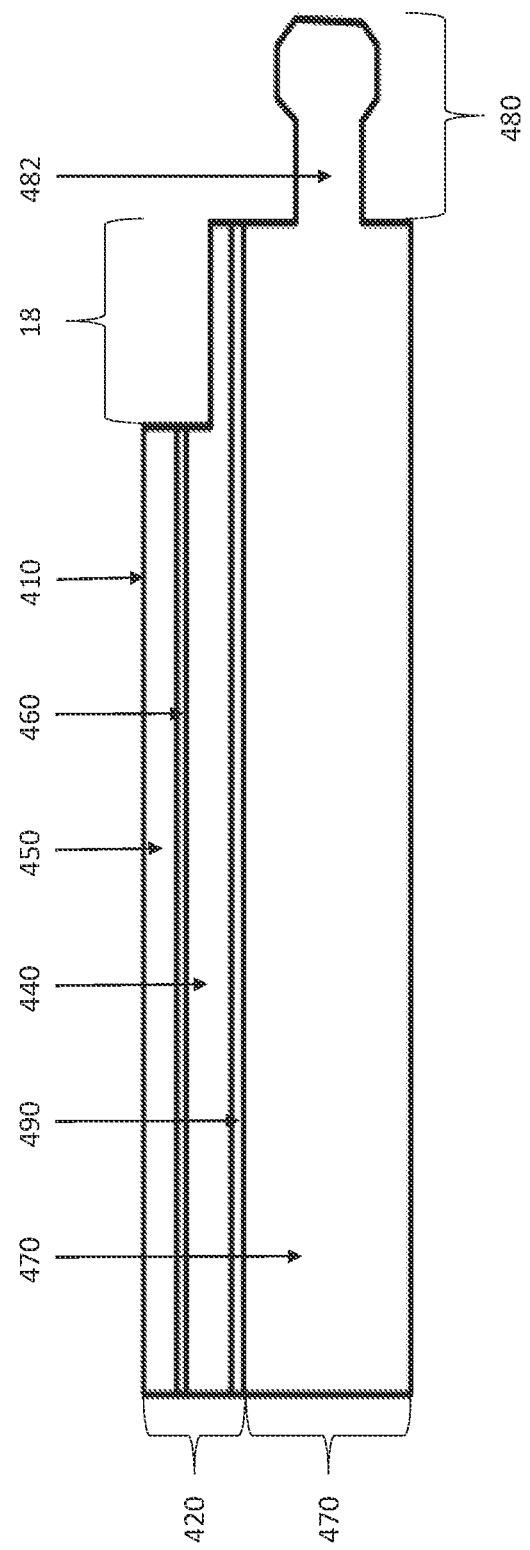
FIG. 36B is a transverse sectional view of another embodiment of a tile according to the present invention having a vinyl layer, and an exposed portion formed on a second wear layer of the top section of the tile substantially above an interconnecting mechanism comprising a male member.
Figure 37:
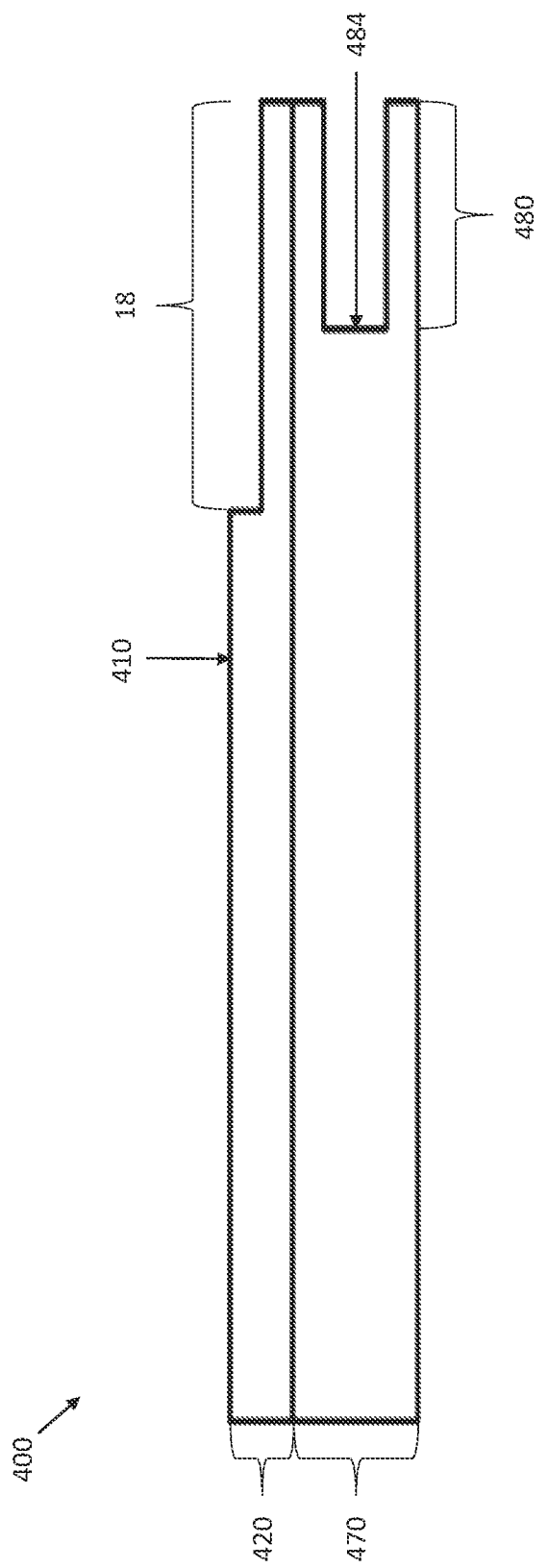
FIG. 37 is a transverse sectional view of another embodiment of a tile according to the present invention having a vinyl layer, and an exposed portion formed on the top section of the tile substantially above an interconnecting mechanism comprising a female member.

With reference now to FIGS. 36A-36B and 37, the inventive tile 400 may additional comprise an interconnecting mechanism 480. As shown in these Figures, the interconnecting mechanism 480 may be formed on the vinyl layer 470. Alternatively, the interconnecting mechanism 480 may be formed on at least a portion of the vinyl layer 470 and/or a portion of the core layer 430. In another alternative embodiment, the interconnecting mechanism 480 may be formed on at least a portion of the core layer 430. Additionally, it is within the scope of the present invention that the interconnecting mechanism 470 comprise a "click" interconnecting mechanism. As used herein, a "click" interconnecting mechanism may be defined as an interconnecting mechanism comprising a male member 482 and/or a female member 484, which may cooperatively achieve a mating engagement. In at least one embodiment, the male member 482 of one tile 400 may be inserted or otherwise slid into a correspondingly dimensioned female member 484 of another tile 400, thereby forming a mating engagement.

With reference again to FIGS. 36A-36B and 37, further features of the inventive tile 400 comprise forming the exposed portion 18 and/or 18' on a portion of the interconnecting mechanism 480. In embodiments of the inventive tile 400 that do not have a core layer 430, the exposed portion 18 and/or 18' may be formed on at least a portion the top section 420 above the interconnecting mechanism 480. For example, the illustrative embodiment of FIG. 36 shows a tile 400 with an exposed portion 18 formed on a portion of the top section 420 above the male member 482 of the interconnecting mechanism 480. As a further example, the illustrative embodiment of FIG. 37 shows a tile 400 with an exposed portion 18 formed a portion of the top section 420 above the female member 484 of the interconnecting mechanism 480.

In terms of manufacturing, the inventive tile 400 generally relies on an extrusion process. For example, the vinyl layer 470 may be formed by being extruded. Additionally, in embodiments of the tile 400 that include a core layer 430, the core layer 430 may also be extruded, but preferably, as a separate extrusion from the vinyl layer 470. Thereafter, the vinyl layer 470, the first wear layer 450 and/or second wear layer 440, and/or the decorative layer(s) 460 and/or 490, may be placed in a pressing plate and laminated together under sufficient heat and pressure to create a plank. In embodiments comprising a core layer 430, the core layer 430, the vinyl layer 470, the wear layer(s) 450 and/or 440, the decorative layer(s) 460 and/or 490, may be placed in a pressing plate and laminated together under sufficient heat and pressure to create a plank. The plank(s) may be later cut into desired sizes to create individual tiles, and/or profiled to create an exposed portion(s) 18 and/or 18'.

Additionally, it is within the scope of the present invention to "emboss" the tile 400 to provide a highly realistic natural look. Although it is possible to provide a tile 400 with a surface that imitates various types of natural materials, "embossing" generally provides a flooring tile made of other materials with a highly realistic, natural look and feel of a wood surface. The "embossing" of inventive tile 400 may also be achieved during the manufacturing process. More specifically, "embossing" of the wear layer 450 may be achieved by using a press plate configured to correspond to the pattern of the decorative layer 460. This may be referred to as an "embossed in register" effect, wherein the press plate is configured to form a plurality of "ridges" on the surface of the first wear layer 450. Collectively, the plurality of "ridges" may be configured to substantially correspond to the design pattern of the first decorative layer 460 below. This provides an advantage over other "ridge" patters that are substantially linear and may not correspond to the design pattern of the first decorative layer 460. Providing a tile 400 with a vinyl layer 470 is generally advantageous to achieve "embossing". The vinyl layer 470 may act as a substrate that is sufficiently malleable to substantially conform, along with the wear layer(s) 450 and/or 440 and the decorative layer(s) 460 and/or 490, to the profile of an intended "ridge" pattern.

With reference now to FIG. 39, the inventive tile 400 is shown in another embodiment comprising a top section 420, a vinyl layer 470, a core layer 430, and an additional vinyl layer 470'. As illustrated in FIG. 39, the additional vinyl layer 470' may be adhered or otherwise joined to the bottom of the core layer 430. In such embodiments where tile 400 includes n additional vinyl layer 470', the core layer 430 may comprise a stone plastic composite (SPC) material, as described herein. The additional vinyl layer 470' serves to enhance the structural properties of the tile 400. In embodiments of the tile 400 comprising an additional vinyl layer 470', the thickness of the vinyl layers 470 and/or 470' may be about 1 millimeter (about 0.039 inches) to about 2 millimeters (about 0.079 inches). Furthermore, in embodiments of the tile 400 comprising an additional vinyl layer 470' the density of the vinyl layers 470 and/or 470' may be generally higher to account for their thicknesses.

Since many modifications, variations and changes in detail can be made to the described preferred embodiment of the invention, it is intended that all matters in the foregoing description and shown in the accompanying drawings be interpreted as illustrative and not in a limiting sense. For example, the various ranges given herein as the density of a material or for the depth of thickness of a section of the inventive tile should not be considered as the only possibilities. As another example, when using the words "preferably" or "in a preferred embodiment" and similar language, it is intended to mean one particular embodiment, and it should be appreciated that other embodiments are possible and considered part of the invention herein. Thus, the scope of the invention should be determined by the appended claims and their legal equivalents.

Now that the invention has been described,

What is claimed is:

1. A tile comprising:
    a top section at least partially defining a top surface, said top section comprising a polyvinyl chloride (PVC) layer having a first density;
    a rigid core layer joined to said top section, said rigid core layer comprised of a densified foam material, said rigid core layer having a second density that is less than said first density of said top section;

a plurality of sides at least partially defined by said core layer; and at least one exposed portion configured to represent a grout line, said at least one exposed portion disposed along at least one of said plurality of sides.

2. The tile of claim 1, wherein said first density of said polyvinyl chloride layer is in a range of about 1,600 kg/m$^3$ (about 99.884 lb/ft$^3$) to about 2,600 kg/m$^3$ (about 162.313 lb/ft$^3$).

3. The tile of claim 1, wherein said second density of said rigid core layer is in a range of about 500 kg/m$^3$ (about 31.214 lb/ft$^3$) to about 2,000 kg/m3 (about 124.856 lb/ft$^3$).

4. The tile of claim 1, wherein said stone plastic composite material at least one exposed portion is defined within and exposing at least a portion of said top section.

5. The tile of claim 1, further comprising an interconnecting mechanism formed substantially along at least one of said plurality of sides along which said at least one exposed portion is formed.

6. The tile of claim 1, wherein said at least one exposed portion comprises a textured surface applied thereon.

7. A tile comprising:
a top section at least partially defining a top surface, said top section comprising a polyvinyl chloride (PVC) layer;
a rigid core layer joined to said top section, said rigid core layer comprised of a stone plastic composite material, said stone plastic composite material comprising polyvinyl chloride (PVC) in an amount between about 20% to 30%, calcium powder or stone dust in amount between about 70% to 80%, and a chemical agent in an amount between about 0.5% to 5%;
a plurality of sides at least partially defined by said core layer; and
at least one exposed portion configured to represent a grout line, said at least one exposed portion disposed along at least one of said plurality of sides.

8. The tile of claim 7, wherein said top section comprises both a wear layer, disposed at least partially coincident with the top surface of the tile, and a decorative layer, disposed so an upper surface thereof is connected to a lower surface of said wear layer.

9. The tile of claim 7, further comprising an interconnecting mechanism formed substantially along at least one of said plurality of sides along which said at least one exposed portion is formed.

10. The tile of claim 7, wherein said top surface comprises a first density and said rigid core layer further comprises a second density that is less than said first density.

11. The tile of claim 10, wherein said first density is in a range of about 1,600 kg/m$^3$ (about 99.884 lb/ft$^3$) to about 2,600 kg/m$^3$ (about 162.313 lb/ft$^3$).

12. The tile of claim 10, wherein said second density is in a range of about 1,500 kg/m$^3$ (about 93.642 lb/ft$^3$) to about 2,200 kg/m$^3$ (about 137.342 lb/ft$^3$).

13. A tile comprising:
a top section at least partially defining a top surface, said top section comprising a polyvinyl chloride (PVC) layer;
a rigid core layer joined to said top section, said rigid core layer composed of at least one of a stone plastic composite material or a densified foam material;
a plurality of sides at least partially defined by said core layer;
at least one exposed portion configured to represent a grout line, said at least one exposed portion disposed along at least one of said plurality of sides; and
said at least one exposed portion disposed within and exposing at least a portion of said top section.

14. The tile of claim 13, wherein said stone plastic composite material comprises a polyvinyl chloride (PVC) in an amount between 20% to 30%, calcium powder or stone dust in an amount between about 70% to 80%, and a chemical agent in an amount between about 0.5% to 5%.

15. The tile of claim 13, wherein said densified foam material comprises a wood plastic composite material.

16. The tile of claim 13, wherein said at least one exposed portion comprises a textured surface applied thereon.

17. The tile of claim 13, further comprising an interconnecting mechanism formed substantially along at least one of said plurality of sides along which said at least one exposed portion is formed.

18. The tile of claim 13, wherein said top section comprises a first density and said rigid core layer comprises a second density that is less than said first density.

19. The tile of claim 13, wherein said top section comprises both a wear layer, disposed at least partially coincident with the top surface of the tile, and a decorative layer, disposed so an upper surface thereof is connected to a lower surface of said wear layer.

20. The tile of claim 19, wherein said at least one exposed portion is disposed within and exposing at least a portion of said polyvinyl chloride (PVC) layer.

* * * * *